US007003798B2

(12) United States Patent
Yamakawa et al.

(10) Patent No.: US 7,003,798 B2
(45) Date of Patent: Feb. 21, 2006

(54) SYSTEM FOR OPERATING DEVICE FROM REMOTE LOCATION AND APPARATUS FOR USE IN THE SYSTEM

(75) Inventors: Tadashi Yamakawa, Kanagawa (JP); Eiji Kato, Kanagawa (JP); Hisao Nakagawa, Tochigi (JP); Kazuomi Oishi, Kanagawa (JP); Yoichi Kamei, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 828 days.

(21) Appl. No.: 09/978,214

(22) Filed: Oct. 17, 2001

(65) Prior Publication Data
US 2002/0087888 A1   Jul. 4, 2002

(30) Foreign Application Priority Data
Oct. 20, 2000 (JP) .............................. 2000-321678
Apr. 27, 2001 (JP) .............................. 2001-132794
Apr. 27, 2001 (JP) .............................. 2001-132795

(51) Int. Cl.
G06F 17/00 (2006.01)
(52) U.S. Cl. .............................. 726/11; 726/14; 726/30
(58) Field of Classification Search ................ 713/201, 713/200; 709/219, 203, 206; 726/11–14, 726/30
See application file for complete search history.

(56) References Cited
U.S. PATENT DOCUMENTS
5,960,177 A   9/1999 Tanno .................... 395/200.59

6,044,398 A * 3/2000 Marullo et al. ............. 709/219
6,205,474 B1 * 3/2001 Hurley ........................ 709/218
6,832,321 B1 * 12/2004 Barrett ........................ 713/201

OTHER PUBLICATIONS

A new remote configurable firewall system for home-use gateways; Mizuno, S.; Matsuura, K.; Yamada, K.; Takahashi, K.; Consumer Communications and Networking Conference, 2005. CCNC. 2005 Second IEEE Jan. 3-6, 2005 Page(s): 599-601.*
Secure remote access to an Internet Web server; Gilmore, C.; Kormann, D.; Rubin, A.D.; Network, IEEE vol. 13, Issue 6, Nov.-Dec. 1999 Page(s): 31-37.*
Security mechanisms in high-speed networks; Singhal, M.; Computer Communications and Networks, 2000. Proceedings. Ninth International Conference on Oct. 16-18, 2000 Page(s): 482.*

* cited by examiner

Primary Examiner—David Jung
(74) Attorney, Agent, or Firm—Fitzpatrick, Cella, Harper & Scinto

(57) ABSTRACT

Disclosed is a remote operating system in which even if a remote-operated apparatus is connected to a network protected by a firewall and a remote-operating apparatus exists outside of the firewall, it is possible for the remote-operating apparatus to remotely operate the remote-operated apparatus by transmitting information containing an operation designation as a response to a command, such as a stream connection request, transmitted from the remote-operated apparatus.

21 Claims, 34 Drawing Sheets

1

SYSTEM FOR OPERATING DEVICE FROM REMOTE LOCATION AND APPARATUS FOR USE IN THE SYSTEM

BACKGROUND OF THE INVENTION

1. Field of the Invention

The present invention relates to a remote operating system for operating a device from a remote location using an operating terminal, an apparatus for use in the remote operating system, and a remote operating method.

2. Related Background Art

It is currently possible to remotely operate various devices, such as televisions, air conditioners, and video recording apparatuses, using so-called remote controllers based on wireless communication techniques. There is also realized a system in which a camera server is installed on the Internet and camera operations, such as panning, tilting, and zooming, are performed at a remote location using a WWW browser, thereby allowing live videos to be watched at the remote location.

In such a system, an operating terminal remotely operates a remote operation target device installed at a remote location by performing information exchange with the remote operation target device using TCP/IP (Transmission Control Protocol/Internet Protocol) that is a standard communication protocol used on the Internet. In this system, it is possible to remotely operate the remote operation target device via the Internet from all over the world. In particular, if the system adopts a protocol called HTTP (HyperText Transfer Protocol, a protocol higher than TCP/IP) that is a standard protocol used in WWW systems, it is possible to remotely operate the remote operation target device even from an operating terminal existing inside of a local network protected by a firewall so long as it is possible for the operating terminal to browse WWW pages using a WWW browser.

Also, if a WWW proxy server is installed on the firewall, it is possible to connect to a WWW server existing on the Internet and to browse WWW pages using the WWW browser via the WWW proxy server. This is because the WWW proxy server relays HTTP commands issued inside of the network protected by the firewall to the Internet. That is, if the HTTP protocol is adopted as a communication protocol, it is possible to perform communications from the network inside of the firewall to the remote operation target device via the Internet.

However, in the case where the remote operation target device exists inside of a firewall, even if the system adopts the HTTP protocol as a communication protocol, it is impossible for the operating terminal to remotely operate the remote operation target device via the Internet.

This is because a firewall is ordinarily set so that only if a device inside of the firewall issues a stream-oriented connection (TCP connection) request to a device outside of the firewall, the connection request is allowed to pass through the firewall. This means that even if the device outside of the firewall issues a connection request to the device inside of the firewall, this connection request is not allowed to pass through the firewall. In the case of stream-oriented connection, a connection request issued from a device and a response issued from another device receiving the connection request are dealt with as a pair. Therefore, only if the authorized device inside of the firewall issues the connection request to the request receiving device outside of the firewall, the communication from the outside request receiving device to the inside is allowed to pass through the firewall. By regulating accesses from devices outside of a firewall in this manner, there is reduced the danger of receiving attacks from the outside.

Accordingly, in the case of an ordinary setting of a firewall installed to prevent attacks against a network, there was a problem in that although WWW pages can be browsed from the inside of the network, it is impossible to remotely operate a remote operation target device installed inside of the firewall via the Internet even if a remote operating system is constructed using the HTTP protocol.

SUMMARY OF THE INVENTION

An object of the present invention is therefore to enable a remote operation of a remote operation target device from an operating terminal even if the remote operation target device is installed inside of a firewall and the operating terminal exists outside of the firewall.

Another object of the present invention is to perform the remote operation with efficiency.

Further, other objects of the present invention will become apparent from the following embodiments described in conjunction with the accompanying drawings.

DESCRIPTION OF THE PREFERRED EMBODIMENTS (First Embodiment)

A remote operating system according to a first embodiment of the present invention is described below with reference to the drawings.

Figure 1:
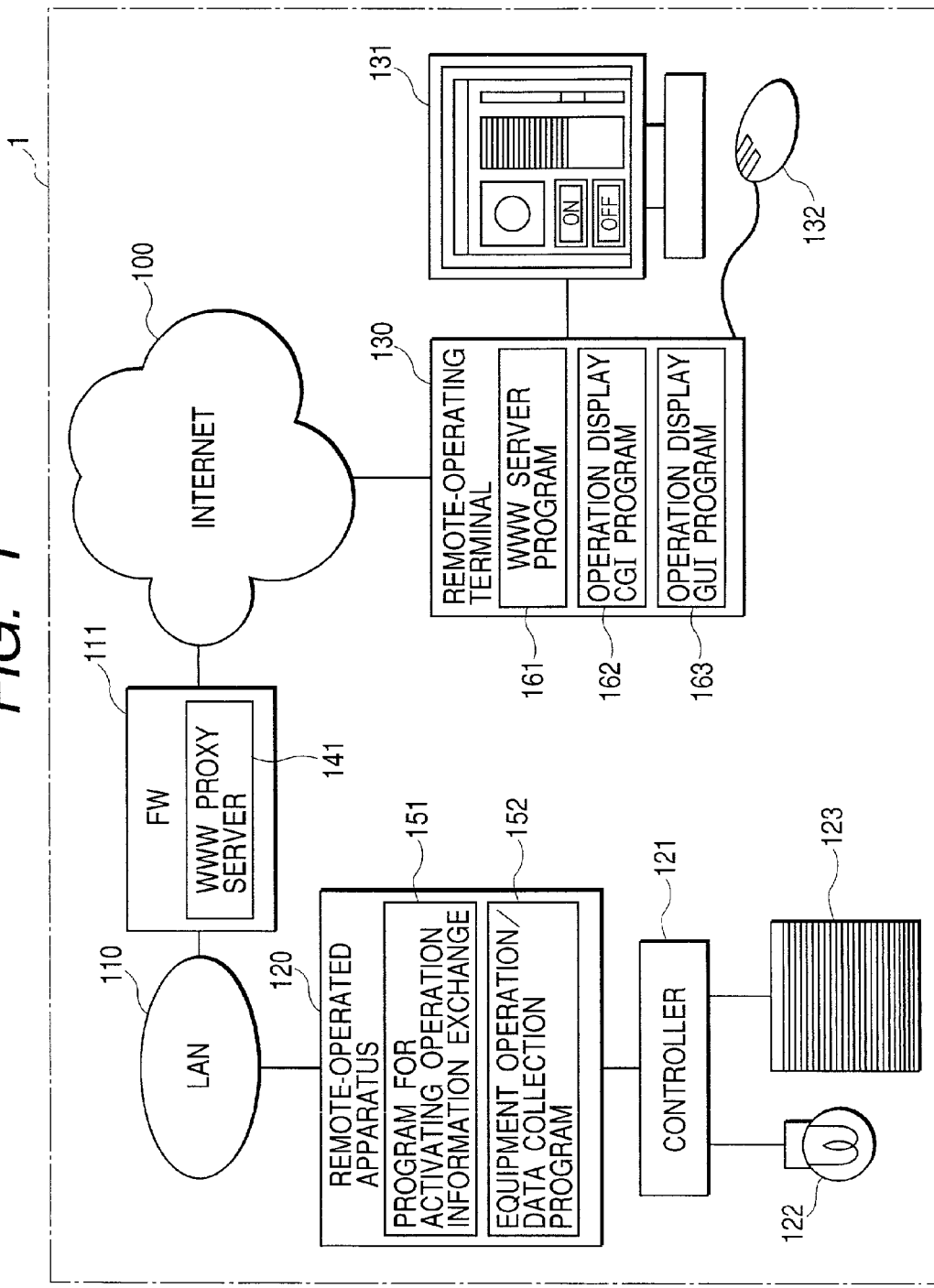
FIG. 1 shows a system construction of a remote operating system according to a first embodiment of the present invention.

FIG. 1 shows the system construction of the remote operating system according to the first embodiment of the present invention.

In FIG. 1, reference numeral 1 denotes the remote operating system according to this embodiment. This remote operating system 1 includes the Internet 100, a firewall (FW) 111, a LAN 110, a remote-operated apparatus 120, and a remote-operating terminal 130.

The remote-operating terminal 130 is directly connected to the Internet 100, while the LAN 110 is connected to the Internet 100 via the firewall 111. Also, the remote-operated apparatus 120 is connected to the LAN 110.

The remote-operated apparatus 120 is an apparatus equivalent to a computer such as a personal computer or a workstation, and includes a CPU, a memory, and a network interface. The remote-operated apparatus 120 also includes a program 151 for activating operation information exchange and an equipment operation/data collection program 152, and is connected to a controller 121. The program 151 for activating operation information exchange and the equipment operation/data collection program 152 will be described in detail below.

The controller 121 controls the turning ON/OFF of a light 122 and the opening/closing of a blind 123 in accordance with control commands sent from the remote-controlled apparatus 120. The controller 121 also sends information on the current states of the light 122 and the blind 123 to the remote-controlled apparatus 120.

The remote-operating terminal 130 is an apparatus equivalent to a computer such as a personal computer or a workstation, and includes a CPU, a memory, and a network interface. The remote-operating terminal 130 also includes a WWW server program 161, an operation display CGI program 162, and an operation display GUI program 163, and is connected to a display apparatus 131 and an operation input apparatus 132 such as a pointing device and a keyboard. The WWW server program 161, the operation display CGI program 162, and the operation display GUI program 163 will be described in detail below.

Note that a WWW proxy server 141 is installed on the firewall 111.

In this embodiment, the WWW server program 161 is running on the remote-operating terminal 130, so that this remote-operating terminal 130 functions as a so-called WWW server. Meanwhile, the program 151 for activating operation information exchange is running on the remote-operated apparatus 120, so that this remote-operated apparatus 120 periodically requests the remote-operating terminal 130 to collect operation information.

Figure 2:
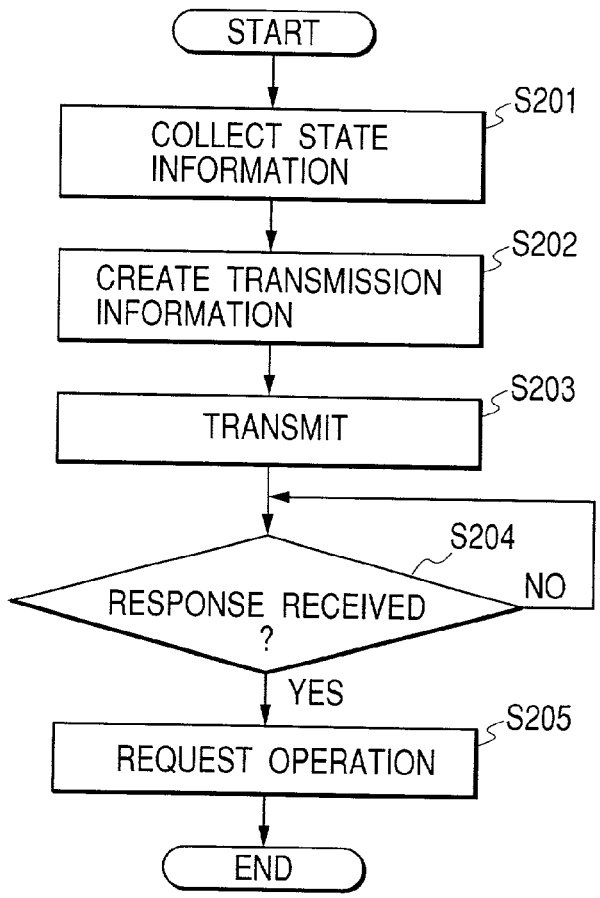
FIG. 2 is a flowchart showing operation information collecting processing performed at a remote-operating terminal according to the first embodiment.

FIG. 2 is a flowchart showing how the remote-operated apparatus 120 requests the remote-operating terminal 130 to collect operation information. The processing shown in this flowchart is realized by various programs running on the remote-controlled apparatus 120.

First, the equipment operation/data collection program 152 collects state information on the current states of the light 122 and the blind 123 from the controller 121 (step S201). Then, transmission information corresponding to the collected state information is created using a POST command of the HTTP protocol (step S202).

If the light 122 is currently turned off and the current open/close degree of the blind 123 is 70% and if the URL that should be designated for remote operation at the remote-operating terminal 130 is "HTTP://foo.com/cgi-bin/operated", for instance, there is created a command given below.
POST HTTP://foo.com/cgi-bin/operated HTTP/1.0
Content-Length: 21
light=OFF
blind=70

Following this, the POST command is transmitted from the remote-operated apparatus 120 to a transmission destination (the remote-operating terminal 130) via the WWW proxy server 141 (step S203). The transmission destination is specified by the transmission information created in step S202 by the program 151 for activating operation information exchange.

In the following description of each embodiment, it is assumed that the firewall 111 is set as follows. If an apparatus connected to the LAN 110 inside of the firewall 111 issues a connection request via the WWW proxy server 141 to an apparatus, which exists outside of the firewall 111 and is directly connected to the Internet 100, in order to establish a stream-oriented connection, the connection request is permitted to pass through the firewall 111. This enables communications from the remote-controlled apparatus 120 to the remote-operating terminal 130.

Next, after the data transmitted in step S203 is received at the remote-operating terminal 130, the state information contained in the transmitted data is written into an information exchange table shown in Table 1 (to be described later). Then, at the remote-operating terminal 130, operation information is written into the information exchange table in the manner to be described later with reference to FIG. 3, and the operation information is transmitted to the remote-operated apparatus 120 as a response. For instance, if a user inputs an operation designation in order to turn on the light 122 and to change the open/close degree of the blind 123 to 80%, the remote-operating terminal 130 sends the operation information given below to the remote-operated apparatus 120 as a response.
HTTP/1.0 200 OK
Content-Type: application/x-remote-operated
Content-Length:20
light=ON
blind=80%

After the remote-operated apparatus 120 receives this response from the remote-operating apparatus 130 ("YES" in step S204), the program 151 for activating operation information exchange requests the equipment operation/data collection program 152 to operate the light 122 and the blind 123 based on the user's operation designation shown by the response (step S205). On receiving this request, the equipment operation/data collection program 152 instructs the controller 121 to turn on the light 122 and to change the open/close degree of the blind 123 to 80%. On receiving this instruction, the controller 121 turns on the light 122 and changes the open/close degree of the blind 123 to 80%. Then, this processing is ended.

During the processing shown in FIG. 2, after receiving the POST command from the remote-operated apparatus 120, the remote-operating terminal 130 writes state information on the current states of the light 122 and the blind 123 into the information exchange table shown in Table 1. The remote-operating terminal 130 also reads operation information on how the light 122 and the blind 123 should be operated from the information exchange table and transmits the read operation information to the remote-operated apparatus 120 as a response to the received POST command. On receiving the operation information from the remote-operating terminal 130 ("YES" in step S204), the remote-operated apparatus 120 operates the light 122 and the blind 123 based on the received information. As a result, even if the remote-operated apparatus 120 is installed inside of the firewall 111, it is possible for the user to confirm the current states of the light 122 and the blind 123 and to remotely operate the light 122 and the blind 123 at the remote-operating terminal 130.

Figure 3:
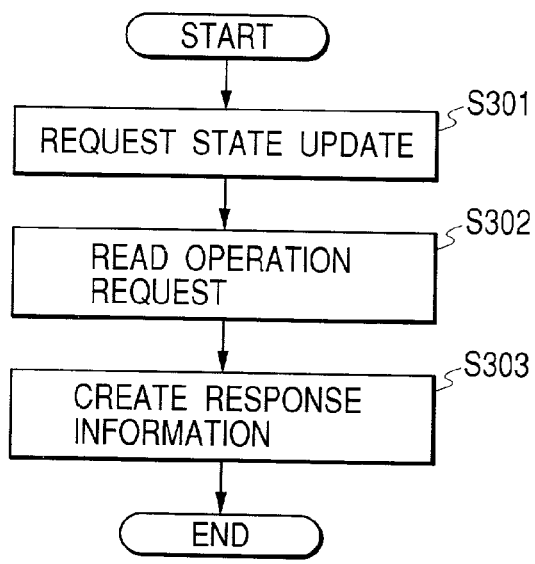
FIG. 3 is a flowchart showing response processing performed at a remote-operating terminal according to the first embodiment.

FIG. 3 is a flowchart showing response processing performed at the remote-operating terminal 130. This processing is realized by various programs running on the remote-operating terminal 130.

First, on receiving the transmission information transmitted in step S203 shown in FIG. 2, the WWW server program 161 informs the operation display CGI program 162 of a state change event in order to request the operation display CGI program 162 to perform a state update (step S301).

On being requested to perform the state update, the operation display CGI program 162 performs the following processing. First, in the manner to be described later with reference to FIG. 4, the operation display CGI program 162 writes the transmitted information into state fields of the information exchange table (see Table 1 below) that is stored in a shared memory area within the remote-operating terminal 130.

TABLE 1

| State   | light  | OFF |
|         | blind  | 70  |
| Request | light  | ON  |
|         | blind  | 80  |

The POST command received from the remote-operated apparatus 120 includes the state information showing that the light 122 is currently turned off and the current open/close degree of the blind 123 is 70%. Consequently, the state field corresponding to the light 122 is given information showing "OFF" and the state field corresponding to the blind 123 is given a value "70". Also, because the operation display GUI program 163 can also read information from and write information into the information exchange table, it is possible to perform information exchange and the like to be described later with reference to FIG. 6. Further, the information exchange table may be stored in a shared file instead of the shared memory area. Also, although the information exchange table is stored at a predetermined shared location in this embodiment, the information in this information exchange table may be shared by performing interprocess communications between the programs using communication ports.

Next, in the manner to be described later with reference to FIG. 5, the operation display GUI program 163 reads operation requests from the information exchange table (step S302). In more detail, the operation display GUI program 163 reads operation information showing operations designated by the user from the request fields of the information exchange table.

If the request field corresponding to the light 122 is given information showing "ON" and the request field corresponding to the blind 123 is given a value "80" in the information exchange table, for instance, the information read by the operation display GUI program 163 shows that the user requests to turn on the light 122 and to change the open/close degree of the blind 123 to 80%.

Then, the operation information showing the user's operation designations read in step S302 is outputted to the WWW server program 161 using a standard output. For instance, the information given below is outputted.
Content-Type: application/x-remote-operated
light=ON
blind=80

The WWW server program 161 adds other necessary information to this outputted information to create response information to be returned from the remote-operating terminal 130 to the remote-operated apparatus 120 (step S303). This response information is transmitted as a response to the transmission information created by the program 151 for activating operation information exchange, and is received by the remote-operated apparatus 120 in step S204 described above. Then, the processing shown in FIG. 3 is ended.

During the processing shown in FIG. 3, after the remote-operating terminal 130 receives the POST command from the remote-operated apparatus 120, the operation display CGI program 162 is informed of a state change event by the WWW server program 161, updates the information in the state fields of the information exchange table based on the transmission information, and then reads the information in the request fields of the information exchange table (step S302). This read information is outputted to the WWW server program 161, which then converts the outputted information into response information to be transmitted to the remote-operated apparatus 120 (step S303). This enables the stream-oriented communication between the remote-controlled apparatus 120 installed inside of the firewall 111 and the remote-operating terminal 130 connected to the Internet 100.

Figure 4:
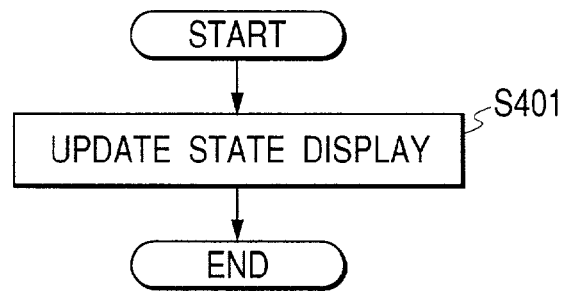
FIG. 4 is a flowchart showing state change event processing of an operation display GUI program according to the first embodiment.
Figure 5:
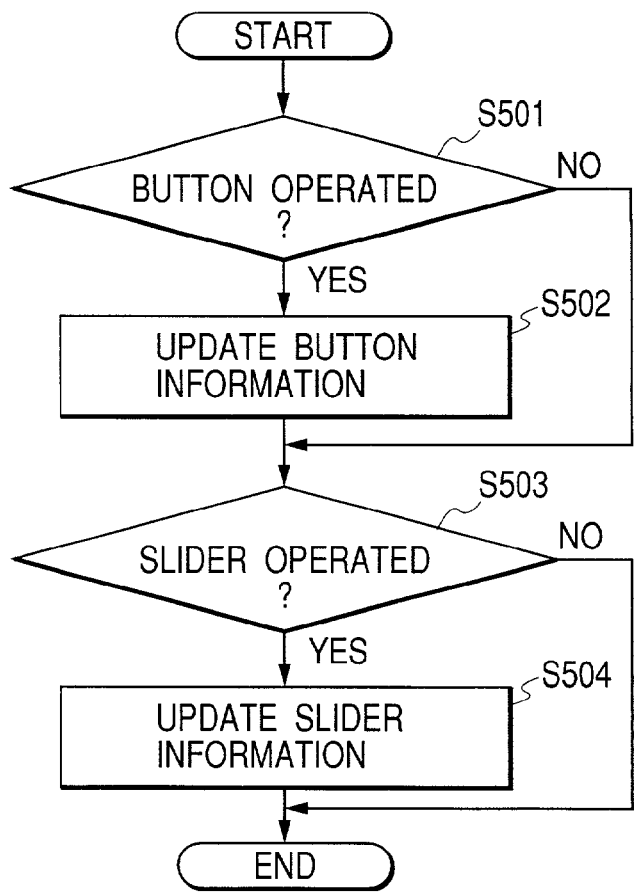
FIG. 5 is a flowchart showing input event processing of the operation display GUI program.

Meanwhile, the operation display GUI program 163 operates in an event-driven manner and performs state change event processing shown in FIG. 4 and input event processing shown in FIG. 5. The state change event processing and input event processing are described below.

FIG. 4 is a flowchart showing the state change event processing performed by the operation display GUI program 163.

The operation display GUI program 163 starts this state change event processing, on being informed of a state change event that takes place when the operation display CGI 162 described above with reference to FIG. 3 updates the state information in the information exchange table.

First, the operation display GUI program 163 compares the states of the light 122 and the blind 123 that are currently displayed by the display apparatus 131 and states of the light 122 and the blind 123 written in the state fields of the information exchange table. If it is found as a result of this comparison that the displayed states differ from the states shown by the information exchange table, the operation display GUI program 163 updates the state screen displayed by the display apparatus 131 (step S401). In more detail, the operation display GUI program 163 requests the display apparatus 131 to draw a new state screen showing the current states of the light 122 and the blind 123. Then, this state change event processing is ended.

FIG. 5 is a flowchart showing the input event processing performed by the operation display GUI program 163.

The operation display GUI program 163 starts this input event processing when the user makes changes to a GUI screen displayed by the display apparatus 131 using the operation input apparatus 132. For instance, the user performs a button operation, a slider operation, and the like using the operation input apparatus 132. In the case of the button operation, the user moves a cursor onto an ON button or an OFF button displayed by the display apparatus 131 and then pushes the button using the operation input apparatus 132. In the case of the slider operation, the user slides a slider button onto a slider knob displayed by the display apparatus 131 using the operation input apparatus 132.

First, it is judged whether the user performs the button operation (step S501). If the user performs the button operation, the processing proceeds to step S502. On the other hand, if the user does not perform the button operation, the processing skips step S502 and proceeds to step S503.

In step S502, it is judged whether the user pushes the ON button or the OFF button. Then, the pushed button is displayed in a concave shape and the other button is displayed in a convex shape. At the same time, the information written in the request field corresponding to the light 122 of the information exchange table is updated to correspond to the pushed button.

In step S503, it is judged whether the user performs the slider operation. If the user performs the slider operation, the processing proceeds to step S504. On the other hand, if the user does not perform the slider operation, the processing is ended.

In step S504, the display position of the slider knob changed by the user is converted into a value on a percentage basis with reference to the entire range in which the slider knob can be moved. Then, the value in the request field corresponding to the blind 123 of the information exchange table is changed to the value obtained in step S504, and this input event processing is ended.

During the processing shown in FIGS. 4 and 5, the operation display GUI program 163 is activated in an event-driven manner and updates the screen displayed by the display apparatus 131 at the point in time when the operation display CGI program 162 updates the information in the state fields of the information exchange table (step S401). The operation display GUI program 163 also updates the information in the request fields of the information exchange table based on the operation designation inputted by the user using the operation input apparatus 132 (steps S502 and S504). As a result, it is possible for the user to know the current states of the light 122 and the blind 123 from the displayed screen and, at the same time, to change the states of the light 122 and the blind 123 as desired by making changes to the displayed screen using the operation input apparatus 132.

(Second Embodiment)

Figure 6:
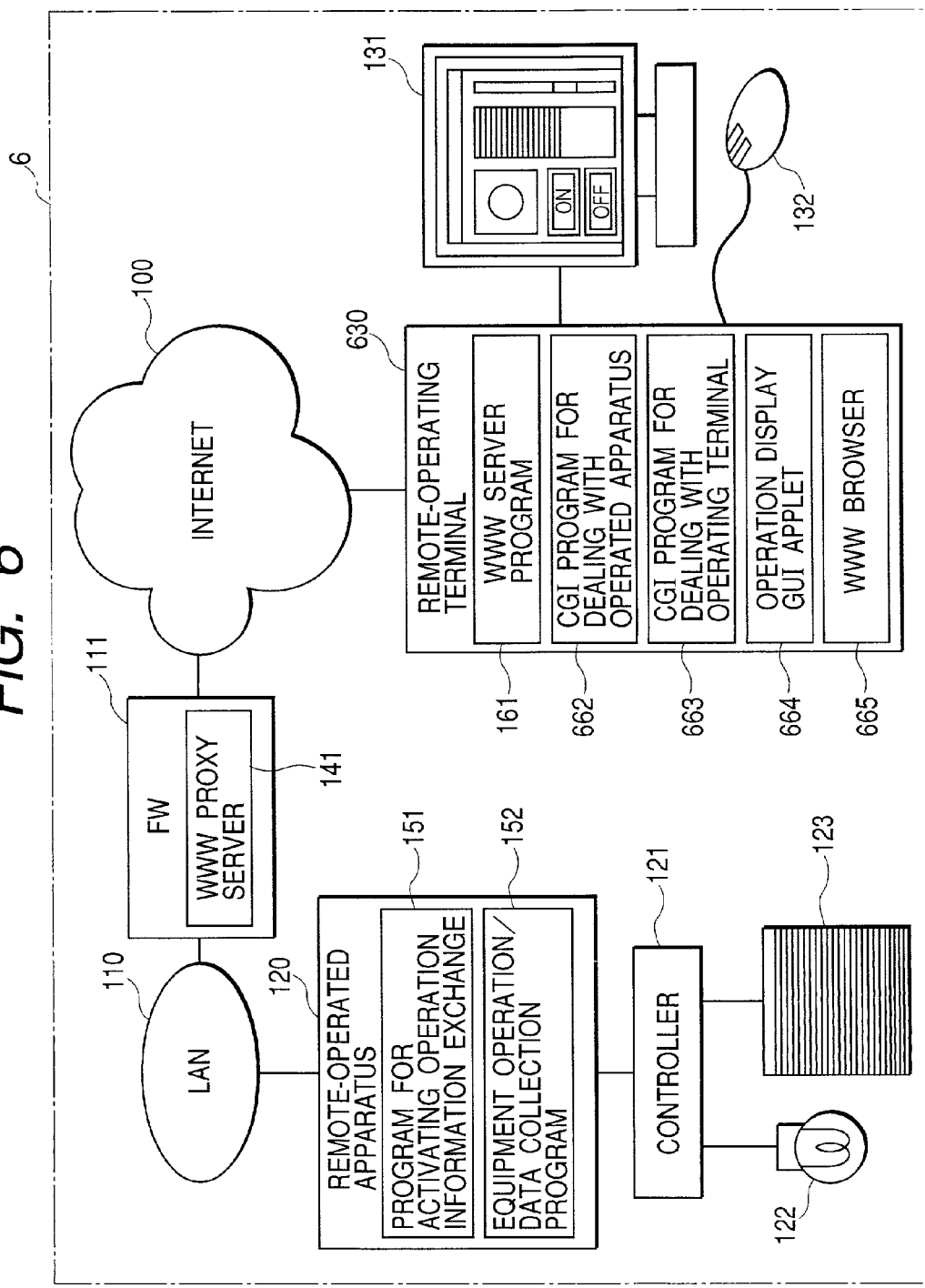
FIG. 6 shows the system construction of a remote operating system according to a second embodiment of the present invention.

FIG. 6 shows the system construction of a remote operating system according to a second embodiment of the present invention.

It should be noted that the same construction elements as in the first embodiment are given the same reference numerals.

In FIG. 6, a reference numeral 6 denotes the remote operating system according to this embodiment. This remote operating system 6 is basically the same as the remote operating system 1. However, there is the following difference between these remote operating systems. The remote-operating terminal 130 of the first embodiment performs information exchange using the CGI program that is activated when the WWW server program 161 receives information from the remote-operated apparatus 120. On the other hand, in the present embodiment, a remote-operating terminal 630 is constructed in order to realize a GUI individually so that CGI program activated when the WWW server program receives information from the remote-operated apparatus 120 performs information exchange wherein a basic GUI of the remote-operating terminal is a WWW browser 665.

Therefore, instead of the operation display CGI program 162 and the operation display GUI program 163 of the first embodiment, the remote-operating terminal 630 includes a CGI program 662 for dealing with operated apparatus, a CGI program 663 for dealing with operating terminal, an operation display GUI applet 664, and a WWW browser 665.

Like the operation performed in step S203 shown in FIG. 2 that concerns the information collection processing of the first embodiment, the equipment operation/data collection program 152 transmits a POST command from the remote-operated apparatus 120 to the remote-operating terminal 630.

If a URL path "/cgi-bin/operated" is designated by the command received by the remote-operating terminal 630, the CGI program 662 for dealing with operated apparatus is started. That is, if the remote-operating terminal 630 receives a POST command including this URL path, the CGI program 662 for dealing with operated apparatus is activated. Also, a WWW page including the operation display GUI applet 664 is stored at the location specified by a URL path "/terminal.html".

To perform remote operation with the remote-operating terminal 630, the user starts the WWW browser 665 and requests itself ("localhost") to display a page whose URL path is "/terminal.html", which is to say a page whose URL is "HTTP://localhost/terminal.html", using the WWW browser 665.

After the contents of this page is read by the WWW browser 665, an operation GUI is displayed and the processing of the operation display GUI applet 664 is started. The processing of the operation display GUI applet 664 is basically the same as the input event processing described above with reference to FIG. 5 that the operation display GUI program 163 of the first embodiment starts in an event-driven manner. However, the difference between the processing of the operation display GUI applet 664 and the input event processing of the operation display GUI program 163 is that when a user performs an operation action for a component of the GUI to input an operation designation, the operation display GUI applet 664 changes a screen displayed by the display apparatus 131, creates transmission information whose URL is "HTTP://localhost/cgi-bin/operation", and sends the transmission information back to the remote-operating terminal 630.

If the initial settings are not changed or no operation designation is inputted by the user, a command given below is transmitted. This command is also transmitted if there is detected no user's operation for a predetermined period of time.
POST/cgi-bin/operation HTTP/1.0
Content-Length: 7
NONE Also, if the user inputs an operation designation to turn on the light 122 and to change the open/close degree of the blind 123 to 80%, a command given below is transmitted.
POST/cgi-bin/operation HTTP/1.0
Content-Length:20
light=ON
blind=80

When the WWW sever program 161 receives this command, the CGI program 663 for dealing with the operating terminal is activated. The activated CGI program 663 for dealing with the operating terminal writes the contents of the command sent from the operation display GUI applet 664 into a terminal operation information shared area, reads the contents written by the CGI program 662 dealing with the operated apparatus from a target equipment state information shared area, and writes the contents into a standard output.

For instance, if the operation action made by the user with respect to a component of the GUI is the operation instruction of turning off the light 122 and changing the open/close degree of the blind 123 to 70%, information given below is written into the terminal operation information shared area.
Content-Type: application/x-remote-terminal
light=OFF
blind=70

It should be noted that if there are a plurality of functions for which the user can input an operation designation but the operation designation inputted by the user relates to only some of the functions, update of the information in the terminal operation information shared area may be performed only for the functions related to the user's operation designation. In this case, it is sufficient for the operation display GUI applet 664 to send only a command corresponding to each operation designation inputted by the user.

The WWW server program 161 adds other necessary information to the outputted information to create response information and returns the response information to the operation display GUI applet 664. On receiving this returned response information, the operation display GUI applet 664 changes the display contents of the WWW browser 665.

Meanwhile, after being activated, the CGI program 662 for dealing with the operated apparatus writes the contents of the command sent from the remote-operated apparatus 120 into the target equipment state information shared area, reads the contents of the command written by the CGI program 663 for dealing with the operating terminal from the terminal operation information shared area, and writes the commands into the standard output.

For instance, if the contents of the command written by the CGI program 663 for dealing with the operating terminal into the terminal operation information shared area designate the turning on of the light 122 and the changing of the open/close degree of the blind 123 to 80%, information given below is outputted.
Content-Type: application/x-remote-operated
light=ON
blind=80

The WWW server program 161 adds other necessary information to the outputted response information to create response information. In this case, the created response information is the same as that returned from the remote-operating terminal 130 to the remote-operated apparatus 120 in step S204 described above. Then, the WWW server program 161 transmits this operation information to the program 151 for activating operation information exchange.

As described above, in the second embodiment, the remote-operating terminal 630 performs the processing using the WWW browser 665. This increases the versatility of the remote-operating terminal 630. As a result, it is possible to use this terminal 630 not only to perform remote operation but also to be utilized in ordinary WWW page browsing. Also, in this embodiment, it is easy to add other functions to the operation screen displayed by the display apparatus 131.

(Third Embodiment)

Figure 7:
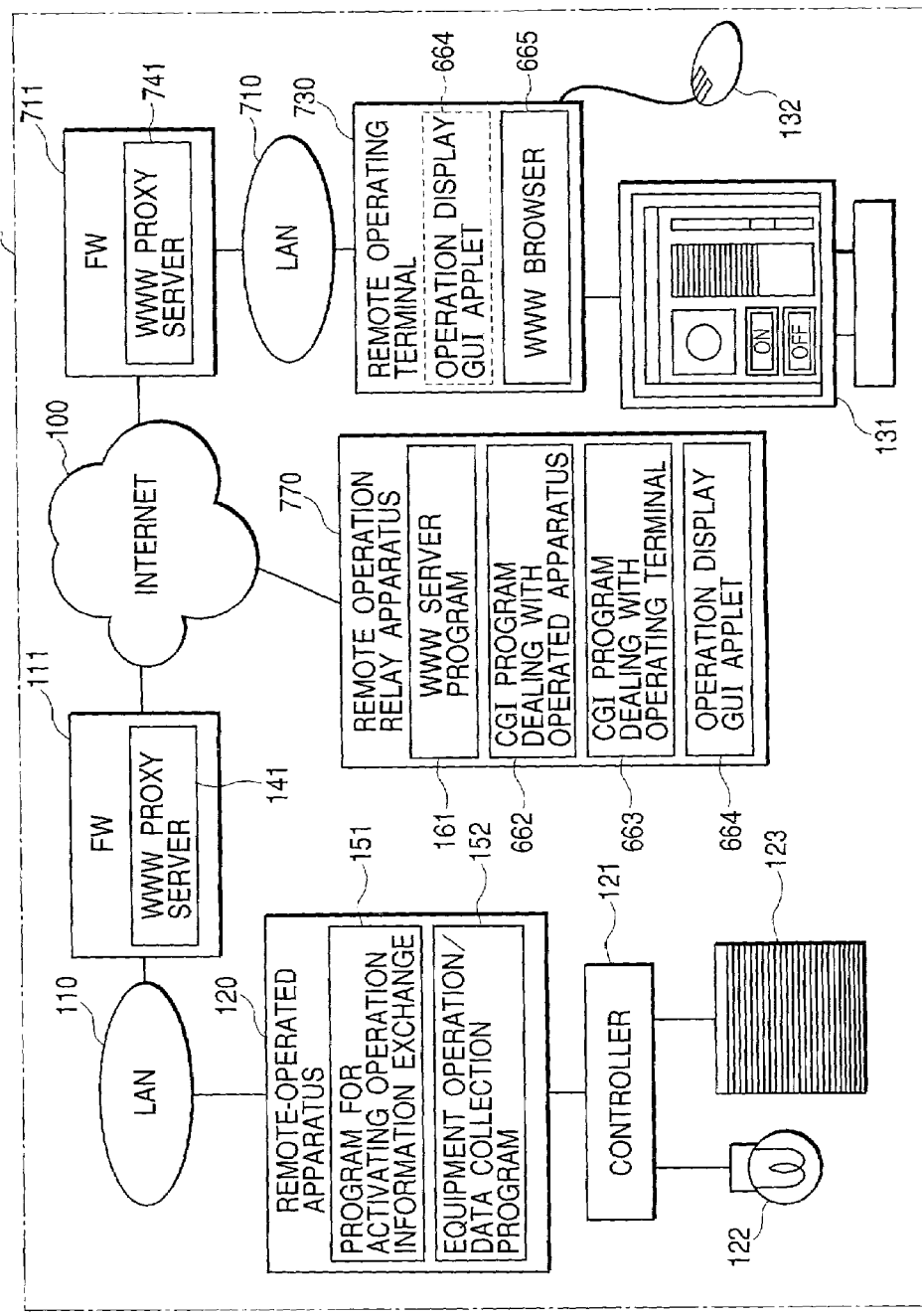
FIG. 7 shows the system construction of a remote operating system according to a third embodiment of the present invention.

FIG. 7 shows the system construction of a remote operating system according to a third embodiment of the present invention.

It should be noted that the same construction elements as in the second embodiment are given the same reference numerals.

In FIG. 7, the remote operating system 7 is basically the same as the remote operating system 6. In this embodiment, however, instead of the remote-operating terminal 630, a remote operation relay apparatus 770 is directly connected to the Internet 100. Also, a LAN 710 is connected to the Internet 100 via a firewall (FW) 711 on which a WWW proxy server 741 is installed. Further, a remote-operating terminal 730 is connected to the LAN 710.

Also, in this embodiment, the operation display GUI applet 664 is downloaded from the remote operation relay apparatus 770 and is executed by the remote-operating terminal 730 when a WWW page necessary to display an operation screen is downloaded from the remote operation relay apparatus 770 and is displayed using the WWW browser 665 of the remote-operating terminal 730.

The remote operation relay apparatus 770 is an apparatus equivalent to a computer in its configuration, such as a personal computer or a workstation, and includes a CPU, a memory, and a network interface. The remote operation relay apparatus 770 also includes the WWW server program 161, the CGI program 662 for dealing with the operated apparatus, the CGI program 663 for dealing with operating terminal, and the operation display GUI applet 664 that have been described above.

Similarly, the remote-operating terminal 730 is an apparatus equivalent to a computer in its configuration, such as a personal computer or a workstation, and includes a CPU, a memory, and a network interface. The remote-operating terminal 730 also includes the WWW browser 665 described above and is connected to the display apparatus 131 and the operation input apparatus 132.

Also, if the name of the remote operation relay apparatus 770 of this embodiment is set as "bar.com", a URL "HTTP://bar.com/cgi-bin/operated" is transmitted from the remote-operated apparatus 120 to the remote operation relay apparatus 770, instead of the URL "HTTP://foo.com/cgi-bin/operated" transmitted in the first embodiment from the remote-operated apparatus 120 to the remote-operating terminal 130.

Also, the remote-operating terminal 730 starts the WWW browser 665 and requests itself to display a page whose URL path is "/terminal.html". When doing so, the remote-operating terminal 730 specifies a URL "HTTP://bar.com/terminal.html" in place of the URL "HTTP://localhost/terminal.html" specified in the second embodiment.

Further, when the user makes any operation action with respect to a component of the GUI, the remote-operating terminal 730 changes a display screen, creates operation request information as transmission information by specifying the URL "HTTP://bar.com/cgi-bin/operation" in place of the URL "HTTP://localhost/cgi-bin/operation" specified in the second embodiment, and sends the operation request information to itself.

Also, in this embodiment, the remote-operating terminal 730 does not directly request the remote operation relay apparatus 770 to establish a communication connection but requests the WWW proxy server 741 installed on the firewall 711 to establish the communication connection. That is, the connection request is transferred to the remote operation relay apparatus 770 via the WWW proxy server 741. Also, a response to the request is sent from the remote operation relay apparatus 770 via the WWW proxy sever 741.

It should be noted that the LAN 710, the firewall 711, and the WWW proxy server 741 may be respectively the same as the LAN 110, the firewall 111, and the WWW proxy server 141.

Other processing in this embodiment is the same as that described in the second embodiment. That is, by installing the remote operation relay apparatus 770 on the Internet 100, it becomes possible to operate the remote-operated apparatus 120 (the remote operation target device in this embodiment) from a remote location using the remote-operating terminal 730 regardless of the presence or absence of a firewall.

(Fourth Embodiment)

Figure 8:
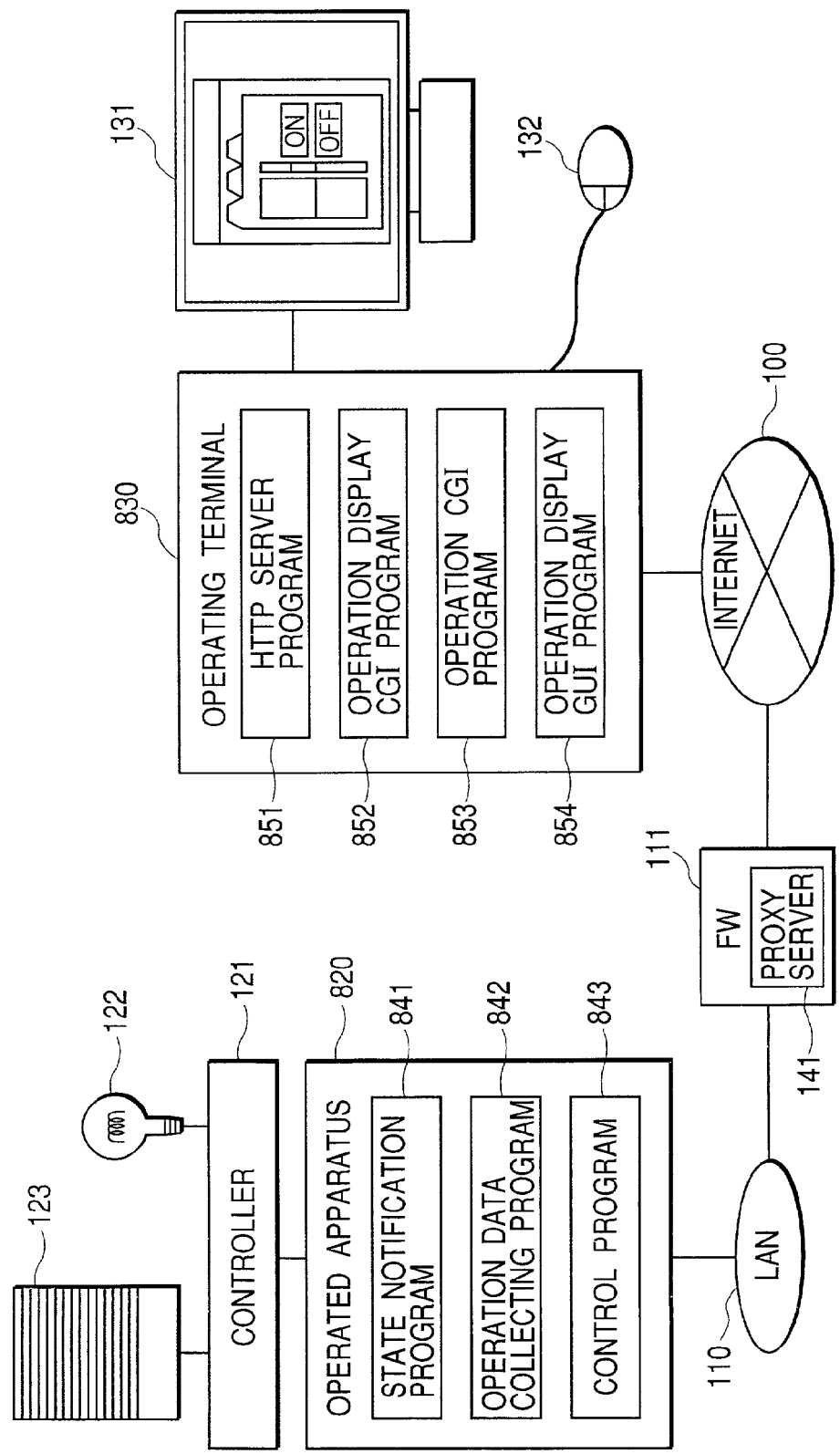
FIG. 8 shows the system construction of a remote operating system according to a fourth embodiment of the present invention.

FIG. 8 shows the system construction of a remote operating system according to a fourth embodiment of the present invention. It should be noted that the same construction elements as in the first embodiment are given the same reference numerals.

An operated apparatus 820 is an apparatus having a function equivalent to that of a computer such as a personal computer or a workstation, and includes a CPU, a memory (ROM, RAM), and a network interface. The operated apparatus 820 also includes a state notification program 841, an operation data collecting program 842, and a control program 843 (these programs will be described in detail below). Further, the operated apparatus 820 is connected to the light 122 and the blind 123 via the controller 121 and controls the turning ON/OFF of the light 122 and the open/close degree of the blind 123.

The controller 121 turns on/off the light 122 and controls the elevating/lowering of the blind 123 in accordance with control commands sent from the control program 843. The controller 121 also sends state information showing the current states of the light 122 and the open/close position of the blind 123 to the state notification program 841.

Like the operated apparatus 820, an operating terminal 830 is an apparatus having a function equivalent to that of a computer such as a personal computer or a workstation, and includes a CPU, memories (ROM and RAM), and a network interface. The operating terminal 830 also includes an HTTP server program 851, an operation display CGI program 852, an operation CGI program 853, and an operation display GUI program 854 (these programs will be described in detail below). The operating terminal 830 is connected to the display apparatus 131 and the operation input apparatus 132 such as a mouse.

The HTTP server program 851 running on the operating terminal 830 is a program having a general WWW server functions. For instance, the HTTP server program 851 is capable of issuing a response to an HTTP request and executing a CGI (common gateway interface) program. By executing the HTTP server program 851, the operating terminal 830 functions as the so-called WWW server.

Meanwhile, at the operated apparatus 820, the state notification program 841 and the operation data collecting program 842 access the HTTP server program 851, thereby issuing a state notification and an operation data collecting request to the operating terminal 830. The operation display GUI program 854 instructs the display apparatus 131 to display the states of the apparatuses sent from the operated apparatus 820, receives user's operation instructions with respect to the operation input apparatus 132, and thus generates a GUI to be sent to the operated apparatus 820.

Figure 9:
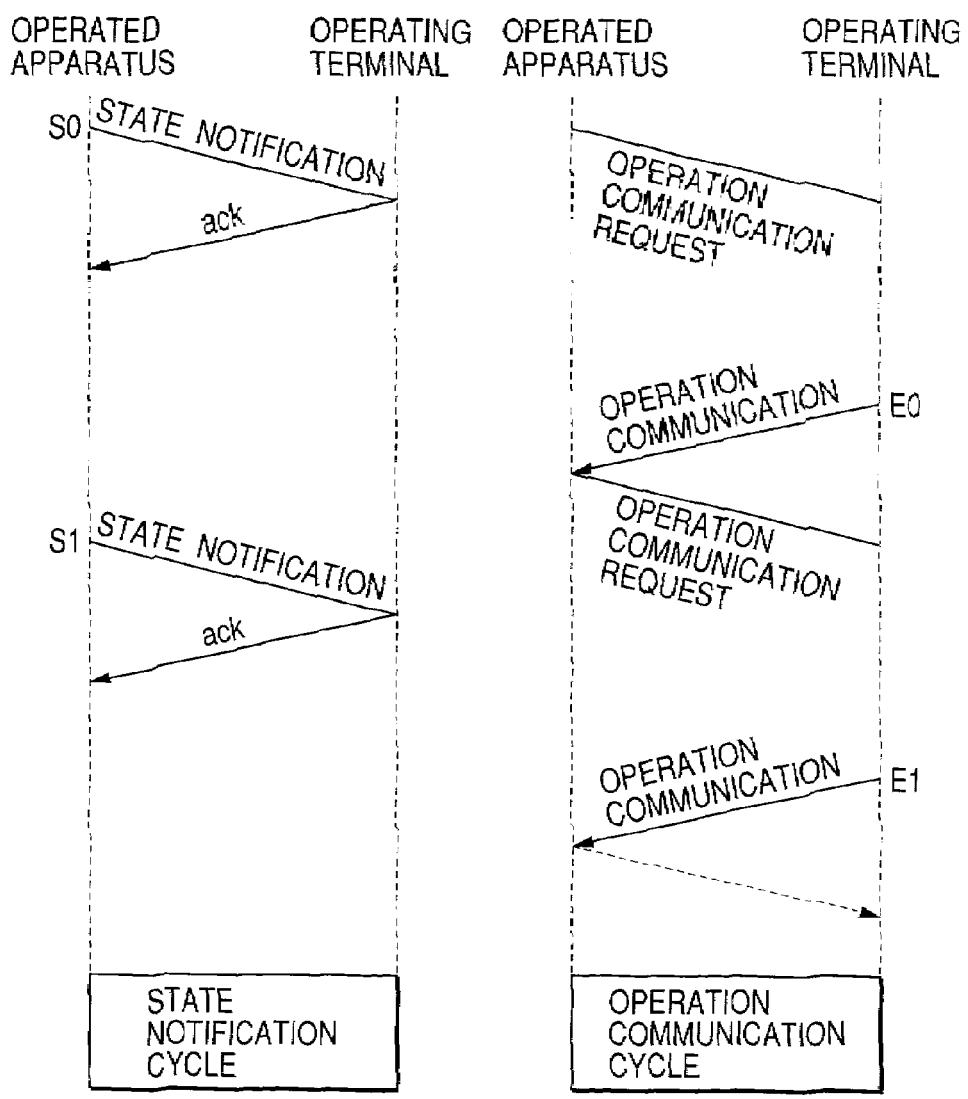
FIG. 9 is a sequence diagram showing an operation flow of the remote operating system according to the fourth embodiment.

The operation of the present remote operating system having the construction described above is shown in FIG. 9. FIG. 9 is a sequence diagram showing the operation flow of the remote operating system. In this drawing, two communication connections are established and are respectively assigned to a state notification cycle and an operation communication cycle. The notification of current states of the operation target apparatuses is transmitted using one of the communication connections and the collection of operation information from the operating terminal 830 is performed using the other of the communication connections.

In the state notification cycle, the state notification program 841 running on the operated apparatus 820 accesses the operation display CGI program 852 running on the operating terminal 830, thereby issuing a state notification. For instance, if the operated apparatus 820 sends state information S0 and S1 to the operating terminal 830, an operation screen is displayed based on these sent state information at the operating terminal 830 side.

Meanwhile, in the operation communication cycle, the operation data collecting program 842 running on the operated apparatus 820 accesses the operation CGI program 853 running on the operating terminal 830, thereby issuing an operation communication request to the operating terminal 830 from the operated apparatus 820. For instance, if operation communication information E0 and E1 is collected, the operated apparatus 820 operates the operation target apparatuses based on the collected operation communication information. The processing in the state notification cycle and the processing in the operation communication cycle are performed in parallel.

(State Notification Program 841)

Figure 10:
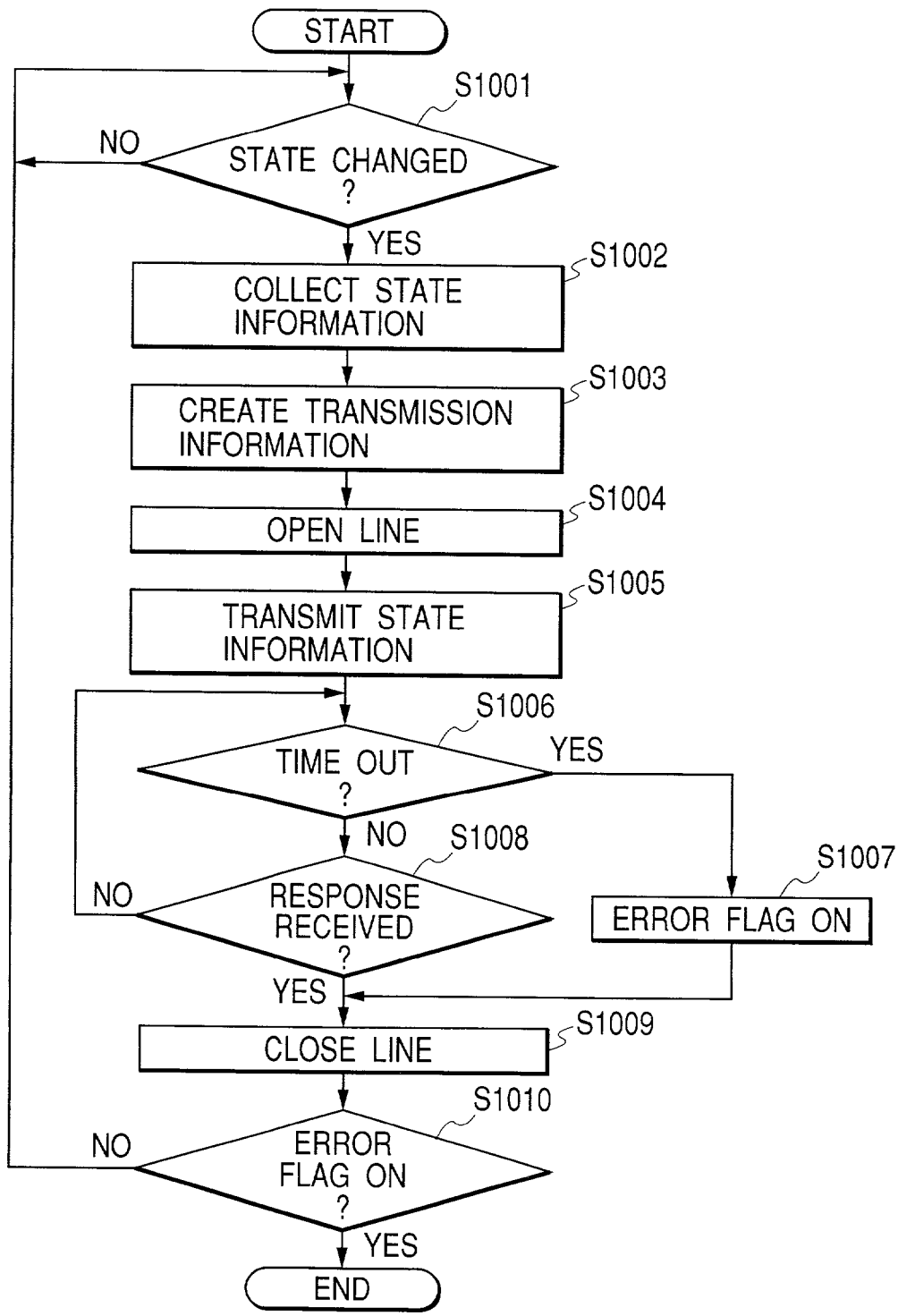
FIG. 10 is a flowchart showing a processing procedure of a state notification program according to the fourth embodiment.

Next, the processing performed in the state notification cycle at the operated apparatus 820 is described with reference to FIG. 10. FIG. 10 is a flowchart showing the processing procedure of the state notification program 841. The processing shown in this drawing is performed by a CPU (not shown) that is provided in the operated apparatus 820 and executes the state notification program 841 stored in a ROM (not shown) that is also provided in the operated apparatus 820.

First, it is checked whether there occurs any change of the states of the operation target apparatuses (step S1001). For instance, during this operation, the control program 843 sets a state change flag (not shown) stored in a shared memory area when there occurs any change of the states of the operation target apparatuses. The state notification program 841 monitors this state change flag to detect a state change. After detecting the state change, the state notification program 841 resets the state change flag. Note that the state change flag may be stored in a shared file in place of the shared memory area. Also, the state change flag may be shared by performing interprocess communications between the programs using communication ports.

If any state change is detected in step S1001, state information showing a current state of the light 122 and the open/close position of the blind 123 is collected (step S1002). This processing is realized by issuing a state information input request to the control program 843 for inputting the state of the controller 121. Note that this processing may be alternatively realized as follows. If there occurs any change of the states of the operation target apparatuses, the control program 843 reserves a buffer for storing the state information showing the state change, and the state notification program 841 monitors this buffer.

Then, transmission information corresponding to the state information is created using a POST command of the HTTP protocol (step S1003). For instance, if the light 122 is currently turned off, the current open/close degree of the blind 123 is 70%, and if the URL assigned to the operation display CGI program 852 of the operating terminal 830 is "HTTP://foo.bar.co.jp/CGI-bin/newstatus", for instance, there is created a command given below.
POST HTTP://foo.bar.co.jp/CGI-bin/newstatus HTTP/1.0
Content-Length:21
¥r¥n
light=OFF¥r¥n
blind=70¥r¥n Then, a communication line is secured (step S1004) and the created information is transmitted to the HTTP server program 851 running on the operating terminal 830 (step S1005). On receiving this information, the HTTP server program 851 starts the operation display CGI program 852. Based on the received information, the operation display CGI program 852 requests the update of the operation screen showing the states of the operation target apparatuses and returns a response immediately. This will be described in detail below.

The state notification program 841 waits for this response to be received for a predetermined period of time (steps S1006 and S1008). If no response is received even after the predetermined period of time has passed, an error flag is on (step S1007). If the error flag is on or if a response from the operation display CGI program 852 is received within the predetermined period of time, the line is closed (step S1009).

Then, it is judged whether the error flag is on (step S1010). If the error flag is on, this program is ended. On the other hand, if the error flag is not on, the processing returns to step S1001 to wait for other state change to occur.

(Operation Display CGI Program 852)

Next, the processing performed in the state notification cycle at the operating terminal 830 is described. A setting has been made in advance so that the operation display CGI program 852 is activated when the HTTP server program 851 running on the operating terminal 830 receives a request of designating a URL path "/CGI-bin/newstatus". Consequently, when the above-mentioned request is received from the operated apparatus 820, the operation display CGI program 852 is activated.

Figure 11:
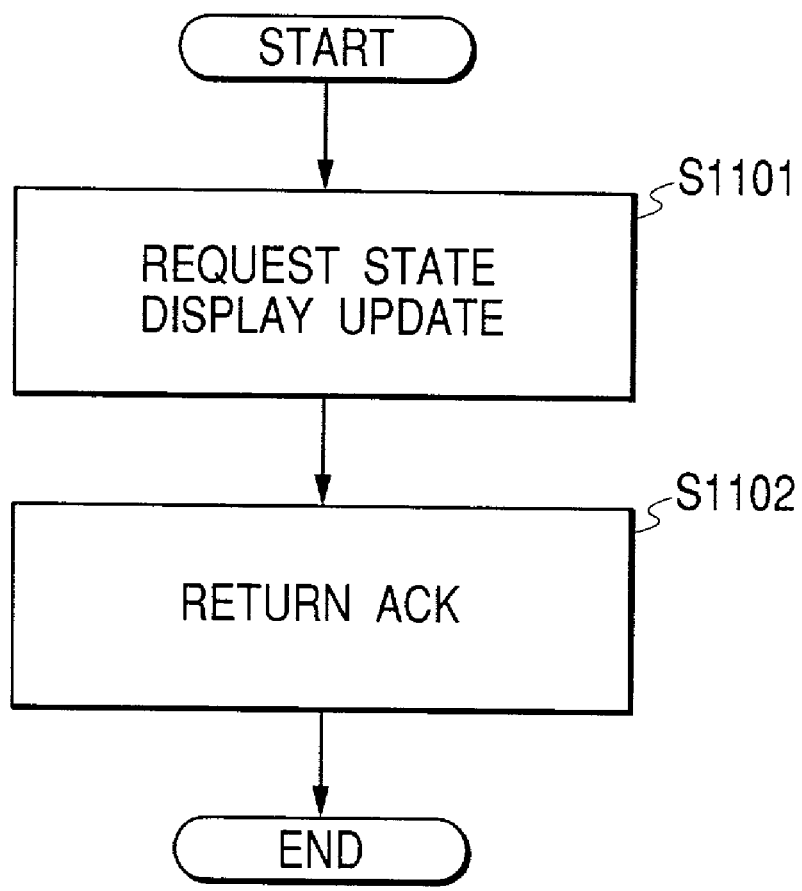
FIG. 11 is a flowchart showing a processing procedure of an operation display CGI program according to the fourth embodiment.

FIG. 11 is a flowchart showing the processing procedure of the operation display CGI program 852. The processing shown in this drawing is performed by a CPU (not shown) that is provided in the operating terminal 830 and executes the operation display CGI program 852 stored in a ROM (not shown) that is also provided in the operating terminal 830.

First, the state information sent from the operated apparatus 820 is read and written into the state fields of the information exchange table (see Table 1) stored in the shared memory area (step S1101). In this embodiment, the light 122 is currently turned off and the open/close degree of the blind 123 is currently set as 70%. Consequently, the state field corresponding to the light 122 is given information of "OFF" and the state field corresponding to the blind 123 is given a value of "70".

It is possible for the operation display GUI program 854 to read information from and write information into the information exchange table. The operation screen is updated by requesting the operation display GUI program 854 to perform an operation display update request. Note that the information exchange table may be stored in a shared file in place of the shared memory area. Also, information in the information exchange table may be shared by performing interprocess communications between the programs using communication ports. Further, instead of using the operation display GUI program 854, the operation display CGI program 852 may be provided with a function of displaying and updating of the operation screen.

Then, ACK response information is created and is outputted to a standard output (step S1102). That is, the HTTP server program 851 returns a response to the state notification program 841 of the operated apparatus 820. For instance, the response information given below is outputted to the standard output.
Content-Type: application/x-newstatus
¥r¥n
ok¥r¥n As a result of this operation, other necessary information is added to the outputted information by the HTTP server program 851. Consequently, in this example, the response given below is returned.
HTTP/1.0 200 OK
Content-Type: application/x-newstatus
Content-Length:4
¥r¥n
ok¥r¥n (Operation Data Collecting Program 842)

Figure 12:
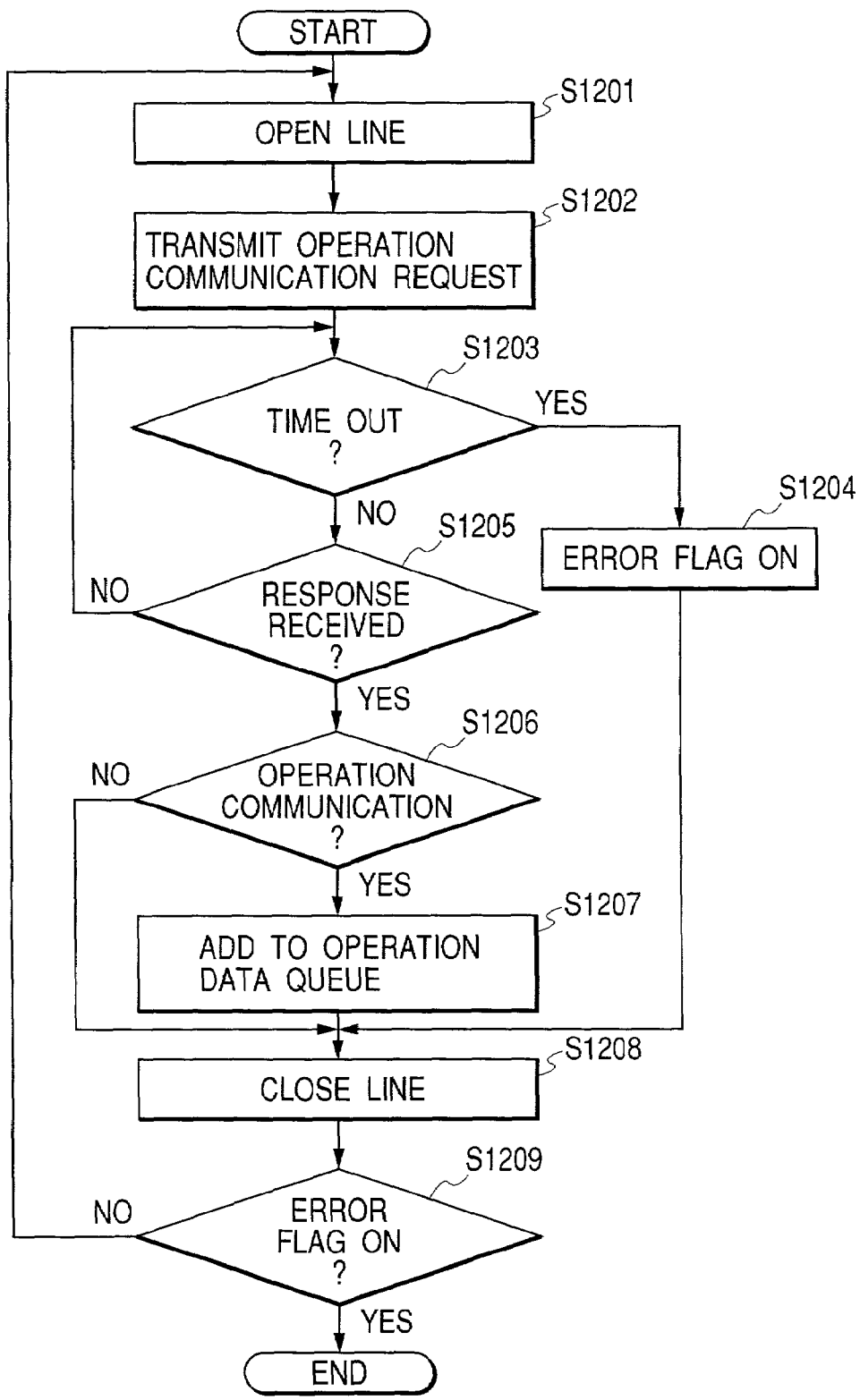
FIG. 12 is a flowchart showing a processing procedure of an operation data collecting program according to the fourth embodiment.

Next, the processing performed in the operation communication cycle at the operated apparatus 820 is described with reference to FIG. 12. FIG. 12 is a flowchart showing the processing procedure of the operation data collecting program 842. The processing shown in this drawing is performed by a CPU (not shown) that is provided in the operated apparatus 820 and executes the operation data collecting program 842 stored in a ROM (not shown) that is also provided in the operated apparatus 820.

First, a line is secured (step S1201) and an operation communication request command is issued to the HTTP server program 851 of the operating terminal 830 (step S1202). If the URL of the operation CGI program 853 of the operating terminal 830 is "HTTP://foo.bar.co.jp/CGI-bin/getoperation", for instance, a command given below is transmitted.
POST HTTP://foo.bar.co.jp/CGI-bin/getoperation HTTP/1.0
Content-Length:6
¥r¥n
none¥r¥n On receiving this command, the HTTP server program 851 calls the operation CGI program 853. The operation CGI program 853 waits for any operation event to take place, and if an operation event occurs, it returns operation information. This will be described in more detail below.

The operation data collecting program 842 waits for this response to be received for a predetermined period of time (steps S1203 and S1205). If no response is received even after the predetermined period of time has passed, an error flag is on (step S1204) and the processing proceeds to the operation of step S1208.

On the other hand, if a response from the operation CGI program 853 is received within the predetermined period of time, the operation data collecting program 842 checks the received data to judge whether the data is operation communication information or not (step S1206). If the received data is the operation communication information, the operation data collecting program 842 adds the operation information to an operation data queue (not shown) (step S1207). For instance, if the user's instruction inputted at the operating terminal specifies the turning on of the light 122 and changing of the open/close degree of the blind 123 to 80%, the response given below is received.
HTTP/1.0 200 OK
Content-Type: application/x-getoperation
Content-Length:20
¥r¥n
light=ON¥r¥n
blind=80¥r¥n At the operated apparatus 820, the control program 843 is activated in an event driven manner and an operation request event takes place if information in the operation data queue is rewritten by the operation data collecting program 842. In this embodiment, after being activated by the operation request event, the control program 843 fetches the operation information showing that the light 122 should be turned off and the open/close degree of the blind 123 should be set as 80% from the operation data queue. The control program 843 then instructs the controller 121 to change the states of the light 122 and the blind 123 based on the user's operation requests given by the operation information.

Then, the operation data collecting program 842 closes the line (step S1208) and judges whether the error flag is on or not (step S1209). If the error flag is on, this program is ended; if not, the processing returns to step S1201 to repeat the same operations as described above.

(Operation CGI Program 853)

Next, the processing performed in the operation communication cycle at the operating terminal 830 will be described. Similar to the state notification cycle, a setting has been made in advance so that the operation CGI program 853 is activated when the HTTP server program 851 running on the operating terminal 830 receives a request designating a URL path "/CGI-bin/getoperation". Consequently, when this request is received from the operated apparatus 820, the operation CGI program 853 is activated.

Figure 13:
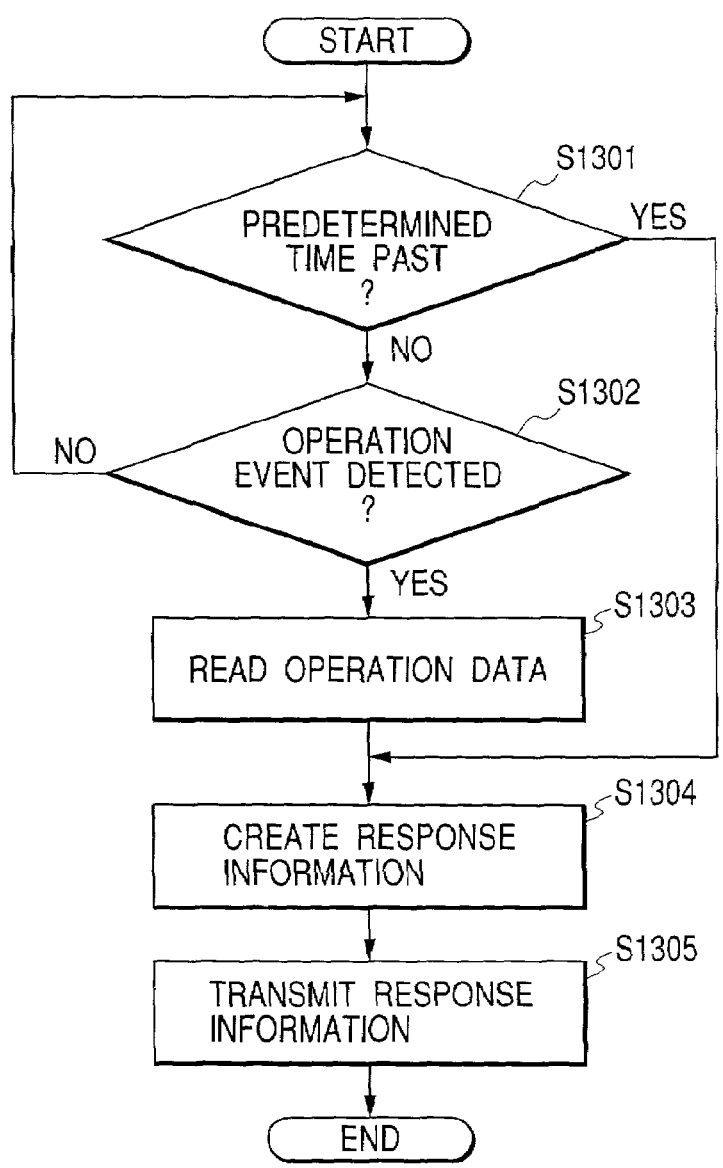
FIG. 13 is a flowchart showing a processing procedure of an operation CGI program according to the fourth embodiment.

FIG. 13 is a flowchart showing the processing procedure of the operation CGI program 853. The processing shown in this drawing is performed by a CPU (not shown) that is provided in the operating terminal 830 and executes the operation CGI program 853 stored in a ROM (not shown) that is also provided in the operating terminal 830.

Although the operation display CGI program 852 returns a response to the operated apparatus 820 immediately, the operation CGI program 853 is made to wait for an operation event to take place until a predetermined period of time, which is the maximum time before a line is closed in the state notification cycle due to the elapse of a time-out period of an HTTP request.

First, the operation CGI program 853 judges whether the predetermined period of time has passed (step S1301). If the judgement result is negative, operation is performed, and the operation CGI program 853 waits the request field of the information exchange table to be updated (step S1302). For instance, the predetermined period of time during which the operation CGI program 853 waits for an operation event to take place is set shorter than a time obtained by subtracting a round-trip network delay time from the time-out period of the HTTP request.

If an operation event is detected in step S1302, the operation CGI program 853 reads updated request from the request fields of the information exchange table (step S1303). For instance, the operation CGI program 853 reads information indicating that the light 122 should be turned on and the open/close degree of the blind 123 should be set as 80%. The operation CGI program 853 also creates response information based on the read operation request information and outputs the response information to a standard output (step S1304). Then, the HTTP server program 851 transmits the response information to the operation data collecting program 842 running on the operated apparatus 820 (step S1305). For instance, the response information given below is outputted to the standard output.

Content-Type: application/x-getoperation
¥r¥n
light=ON¥r¥n
blind=80¥r¥n

The HTTP server program 851 adds other necessary information to the response information, and returns such information as that shown in the description of the operation data collecting program 842.

On the other hand, if no operation event takes place within the predetermined period of time in step S1301, that is, if the user does not input any operation designation within the predetermined period of time, the operation request information is set as "none" and the response information given below is outputted to the standard output.

Content-Type: application/x-getoperation
¥r¥n
none¥r¥n

The remote operating system in this embodiment has the configuration as described above. Therefore, in this embodiment, even if the operated apparatus 820 is installed inside of the firewall, it is possible to remotely operate the operated apparatus 820 (the remote operation target device in this embodiment) from the operating terminal 830 connected to the Internet 100.

Also, in this embodiment, a response to a state notification is returned immediately to prepare for the next state change notification. Also, if an operation communication request is issued, a response is not immediately returned and it is checked whether any operation event takes place. As a result, it is possible to transmit operation information immediately after an operation designation is inputted by the user.

(Fifth Embodiment)

In the fourth embodiment, there are provided two exclusive communication connections that are respectively assigned to the state notification processing and the operation communication processing. However, the present invention is not limited to this. In a fifth embodiment, a case is shown in which each communication connection is shared by the state notification processing and the operation communication processing.

The remote operating system of the present embodiment is realized by changing the system construction described in the fourth embodiment with reference to FIG. 8 as follows. The state notification program 841 and the operation data collecting program 842 are replaced by an operation information exchange program 8411 (not shown). Also, the operation display CGI program 852 and the operation CGI program 853 are replaced by an operation display response CGI program 8521 (not shown). Note that the same construction elements and processing as in the fourth embodiment are given the same reference numerals and are not described in this embodiment.

Figure 14:
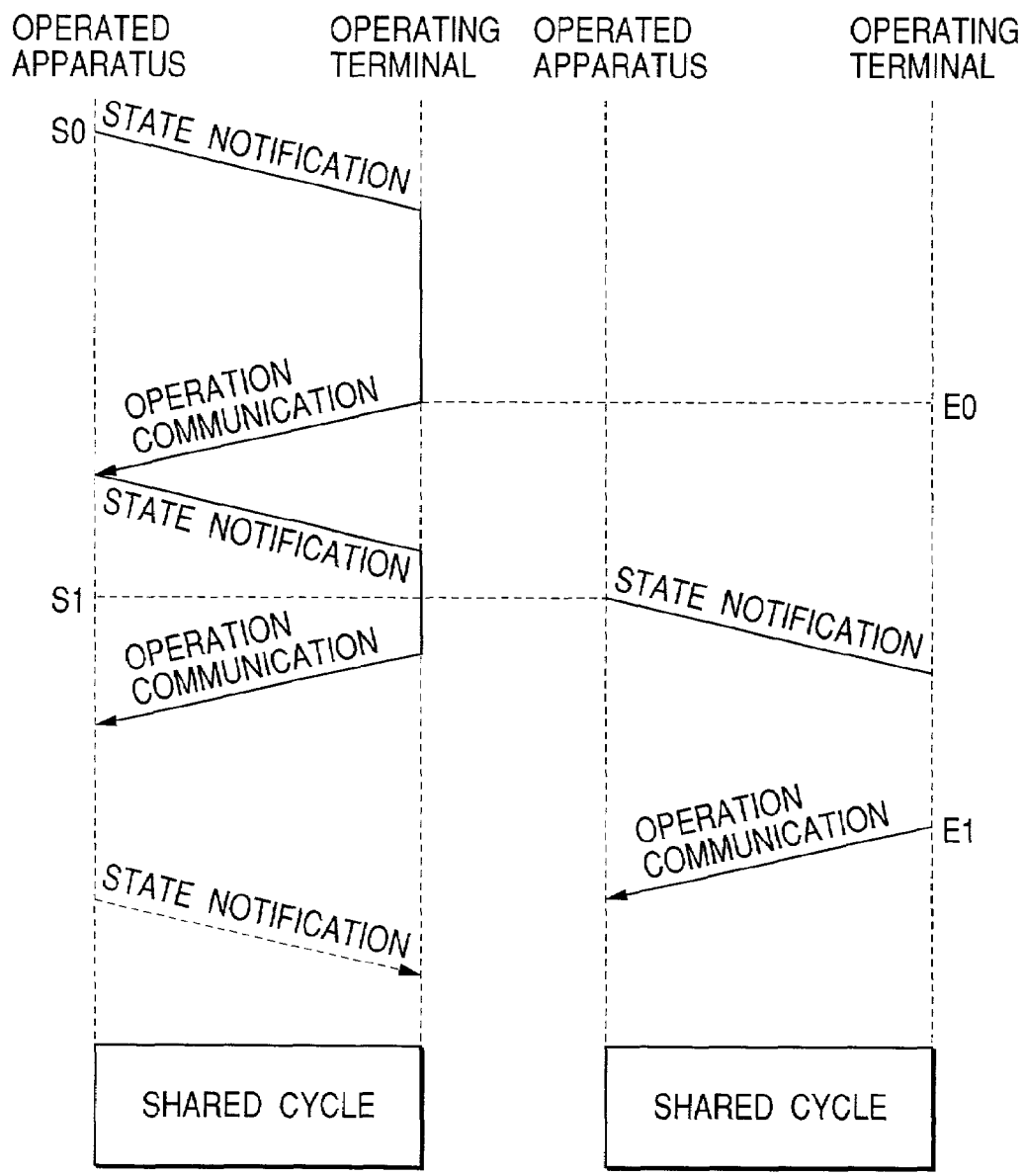
FIG. 14 is a sequence diagram showing an operation flow of a remote operating system according to a fifth embodiment of the present invention.

FIG. 14 is a sequence diagram showing the operation flow in the present embodiment. There are established two communication connections that are each shared by the state notification processing and the operation communication processing. That is, each shared communication connection is used for both of the transmission of a state notification concerning the equipment 122 and 123 and the collection of operation information from the operating terminal 830.

This embodiment differs from the fourth embodiment in that both of the state notification processing and the operation communication processing can be performed even with a single communication connection. That is, if a state change (S0, for instance) is detected at the operated apparatus 820, a state notification is transmitted to the operating terminal 830 using a communication connection (hereinafter referred to as "first communication connection") that is currently waiting for any state change to be made. Then, the first communication connection waits for an operation to be made at the operating terminal 830. If an operation event is detected, operation information (E0, for instance) is also returned using the first communication connection.

At the operated apparatus 820, when either communication connection is waiting for the state change to be made, after the operation information is received, a state notification is transmitted even if there occurs no state change. In more detail, if no state change is made at the operated apparatus 820, a state notification (hereinafter referred to as "non-state change notification") showing that "no state change occurs" is transmitted. Then, the light 122 and the blind 123 are operated based on the collected operation information.

If a new state change (S1, for instance) is detected at the operated apparatus 820 while the first communication connection is waiting for an operation designation to be inputted, a new communication connection (hereinafter referred to as "second communication connection") is established to transmit a state notification concerning the new state change. At the operating terminal 830, after the state notification concerning the new state change is received, operation information (hereinafter referred to as "non-operation information") showing that "no operation designation is inputted" is returned using the first communication connection and the second communication connection is used to continuously wait for an operation designation to be inputted. The first communication connection used to return the non-operation information waits for a state change to take place at the operated terminal 820 until the second communication connection receives operation information, which shows that an operation designation is inputted, or the non-operation information.

(Operation Information Exchange Program 8411)

Figure 15:
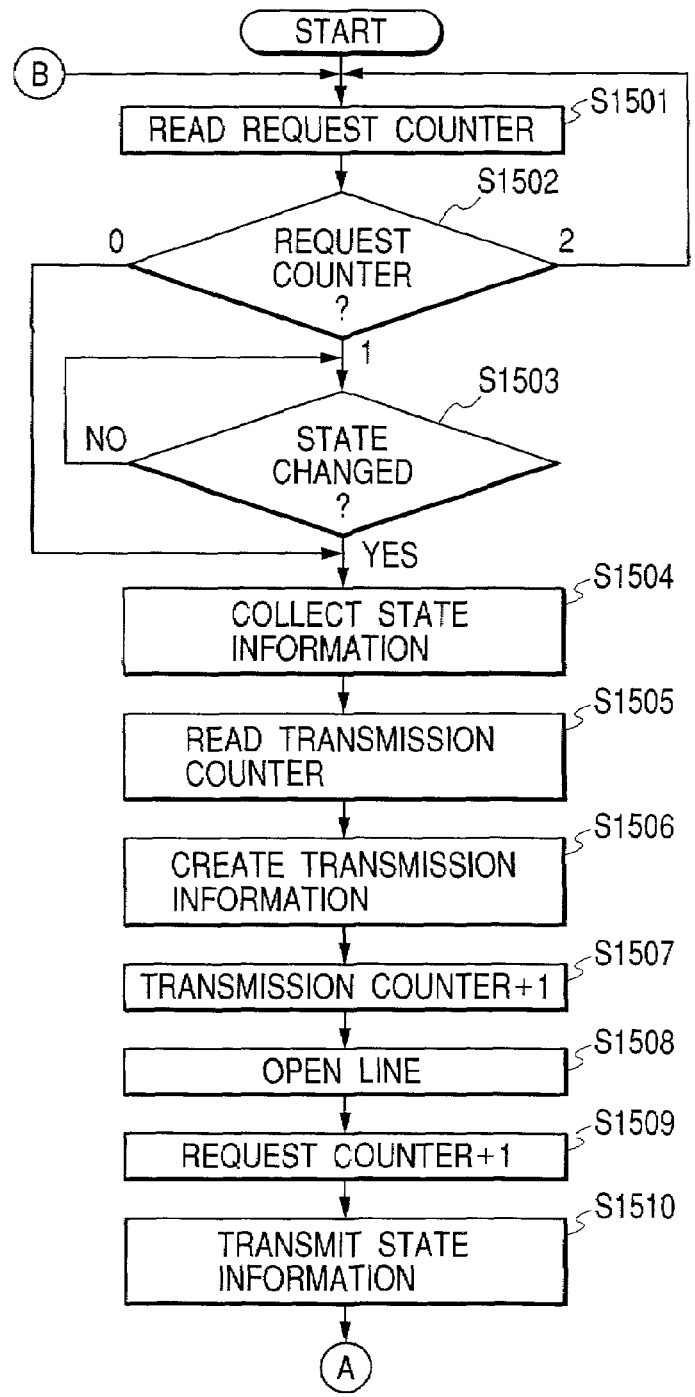
FIG. 15 is the first half of a flowchart showing a processing procedure of an operation information exchange program according to the fifth embodiment.
Figure 16:
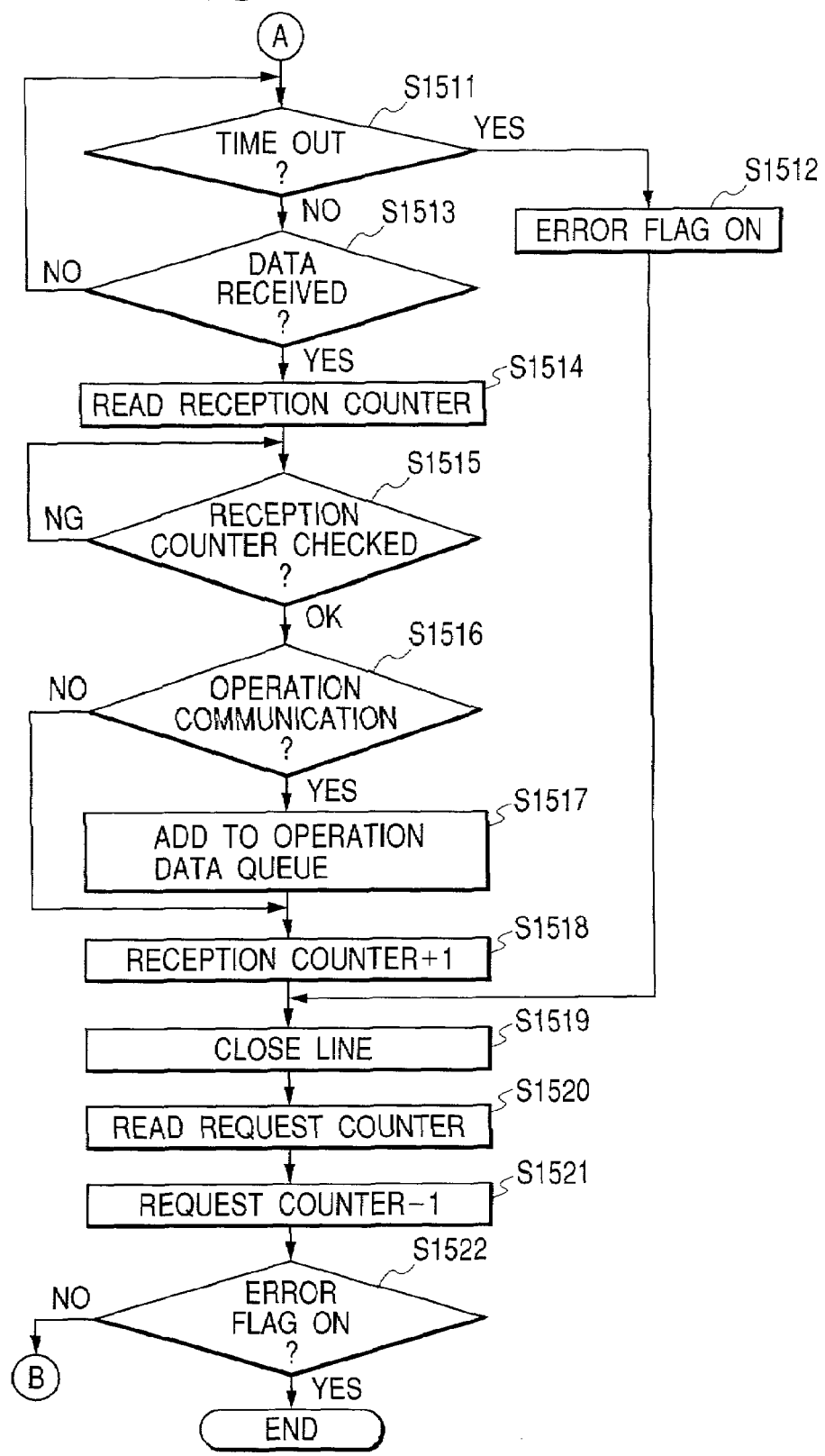
FIG. 16 is the latter half of the flowchart showing a processing procedure of the operation information exchange program according to the fifth embodiment.

Next, the processing performed at the operated apparatus 820 is described with reference to FIGS. 15 and 16. FIGS. 15 and 16 are flowcharts showing the processing procedure of the operation information exchange program 8411. The processing shown in each of these drawings is performed by a CPU (not shown) that is provided in the operated apparatus 820 and executes the operation information exchange program 8411 stored in a ROM (not shown) that is also provided in the operated apparatus 820.

Figure 17:
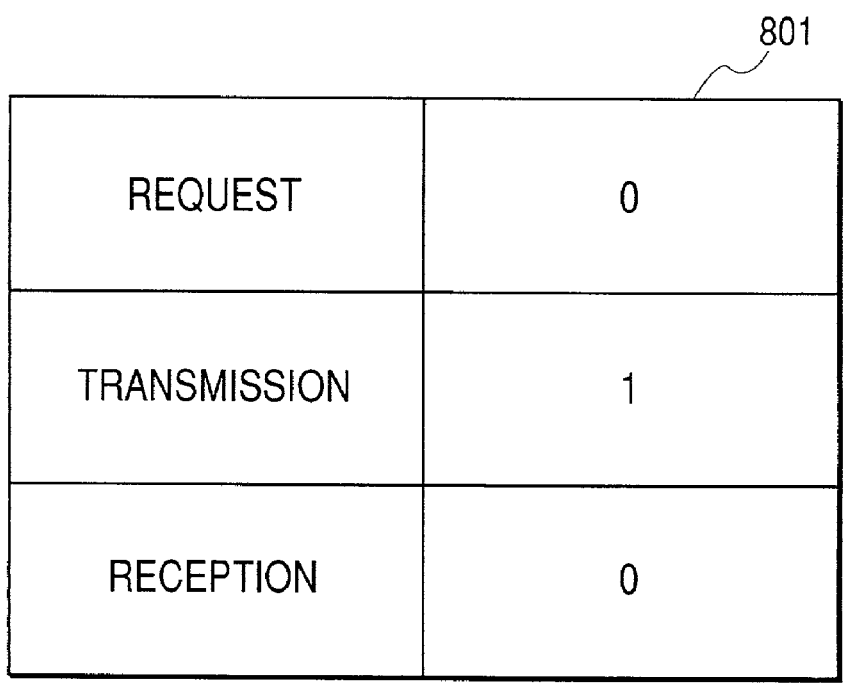
FIG. 17 shows a counter table according to the fifth embodiment.

The operation information exchange program 8411 includes three counters (not shown). FIG. 17 shows a counter table concerning these counters. The first counter is used to count the number of HTTP requests that have been issued by the operation information exchange program 8411 but have not yet received responses from the HTTP server program 851. The initial value of this counter is "0". This counter is hereinafter referred to as "request counter".

The second counter is used to control the transmission order of HTTP requests and a data number related to this counter is embedded in each piece of request data. The initial value of this counter is "0". This counter is hereinafter referred to as "transmission counter".

The third counter is used to control the processing order of HTTP responses received from the operating terminal 830 and a data number related to this counter is embedded in each piece of response data. The initial value of this counter is "0". This counter is hereinafter referred to as "reception counter".

In this embodiment, the operation information exchange program 8411 is activated with two execution processes that are performed in parallel. First, the value of the request counter is read from the counter table 801 stored in a shared memory area (step S1501). In addition to the value of the request counter, the counter table 801 gives values of the transmission counter and the reception counter to be described in detail below. The request field of the counter table 801 gives the number of communication connections that have issued state notifications but have not yet received operation communications. That is, if the request counter is currently set as "0", the two execution processes of operation information exchange program 8411 are both waiting for any state change to be made. If the request counter is currently set as "1", one of the execution processes of the operation information exchange programs 8411 has issued a state notification and is waiting for an operation designation to be inputted. Note that the request counter, the transmission counter, and the reception counter may be separately managed. Also, the counter table may be stored in a shared file in place of the shared memory area.

The current value of the request counter is checked (step S1502). If the request counter is currently set as "1", it is judged whether any state change takes place (step S1503). On the other hand, if the request counter is currently set as "0" or if any state change is detected in step S1503, state information showing the current states of the light 122 and the blind 123 is collected (step S1504), as in the fourth embodiment. Then, the value of the transmission counter is read from the counter table 801 (step S1505).

Next, transmission information is created (step S1506). The number of transmissions of state notification information is set in the transmission field of the counter table 801. If the current value of the transmission counter is "1", for instance, the command given below is created.
POST HTTP://foo.bar.co.jp/CGI-bin/newstatus HTTP/1.0
Content-Length:37
¥r¥n
send_counter=1¥r¥n
light=OFF¥r¥n
blind=70¥r¥n Then, the value of the transmission counter is incremented by one (step S1507). As a result, a value "2" is written into the transmission field of the counter table 801. Following this, a communication line is opened (step S1508), the value of the request counter is incremented by one (step S1509), and the current value of the request counter is written into the request field of the counter table.

Note that, in this embodiment, two execution processes of the operation information exchange program 8411 are running in parallel, as described above. Therefore, during the operations in steps S1504 to S1507, there is performed exclusive control such as the locking of the information exchange table and the counter table 801. By doing so, a situation is prevented where the same information is collected twice, the value of any counter is not changed even if the changing is necessary, or the value of the same counter is unnecessarily changed. During the response reception processing to be described later, similar exclusive control is performed.

After the operation in step S1509, the state information is transmitted to the HTTP sever program 851 of the operating terminal 830 (step S1510). Note that by setting the initial value of the request counter at "0", it becomes possible to notice the operating terminal 830 of the initial states of the equipment 122 and 123 without waiting for any state change to be made when the operation information exchange program 8411 is activated for the first time.

On receiving the state information, the HTTP server program 851 starts the operation display response CGI program 8521. Based on the received state information, the operation display response CGI program 8521 updates the operation screen through which operations of the equipment 122 and 123 are designated by the user. This will be described in detail below.

The operation information exchange program 8411 waits for a response to be received from the operation display response CGI program 8521 for a predetermined period of time (step S1511). If no response is received within the predetermined period of time, the error flag is on (step S1512) and the processing proceeds to the operation in step S1519.

On the other hand, if a response is received from the operation display response CGI program 8521 within the predetermined period of time, the value of the reception counter is read from the counter table 801 (step S1514) and the read value is checked (step S1515). The reception field of the counter table 801 gives a value showing the number of pieces of reception data that have already been received, that is, a value obtained by subtracting one from the data number embedded in data to be processed next. Here, if the data number written in the data to be processed next is greater than the value of the reception counter by two or more, it is determined that there occurs a loss of data. As a result, data reception is performed using the remaining communication connection until the value of the reception counter is updated.

On the other hand, if it is found that the data number of the data to be processed next is correct in step S1515, it is judged whether this data is operation request information or non-operation information (step S1516). If the data is operation request information, this operation request information is added to an operation data queue (not shown) (step S1517). For instance, the response given below is received.
HTTP/1.0 200 OK
Content-Type: application/x-getoperation
Content-Length:39
¥r¥n
receive_counter=1¥r¥n
light=ON¥r¥n
blind=80¥r¥n Then, the value of the reception counter is incremented by one (step S1518). In this embodiment, a value "1"is written into the reception field of the counter table 801. Note that during the operations in steps S1516 to S1518, there is performed exclusive control that is similar to the exclusive control described above. Also, the operation of the control program 843 is the same as that described in the fourth embodiment.

Following this, the operation information exchange program 8411 closes the line (step S1519), reads the value of the request counter again (step S1520), decrements the value of the request counter by one, and updates the information in the request field of the counter table 801 (step S1521). Then, it is judged whether the error flag is on (step S1522). If the error flag is on, this processing is ended; if not, the processing returns to step S1501 and the operations described above are repeated.

(Operation Display Response CGI Program 8521)

Next, the processing performed at the operating terminal 830 is described. As in the fourth embodiment, a setting was made in advance so that the operation display response CGI program 8521 is activated when the HTTP server program 851 running on the operating terminal 830 receives a request designating a URL path "/CGI-bin/newstatus". Consequently, when this request is received from the operated apparatus 820, the operation display response CGI program 8521 is activated.

In this embodiment, as described above, the operation information exchange program 8411 is activated twice to run two execution processes in parallel. Therefore, there may be cases where the operation display response CGI program 8521 receives two requests at a time. In such cases, the operation display response program 8521 is activated each time a request is received, thereby starting two execution processes to be performed in parallel.

Figure 18:
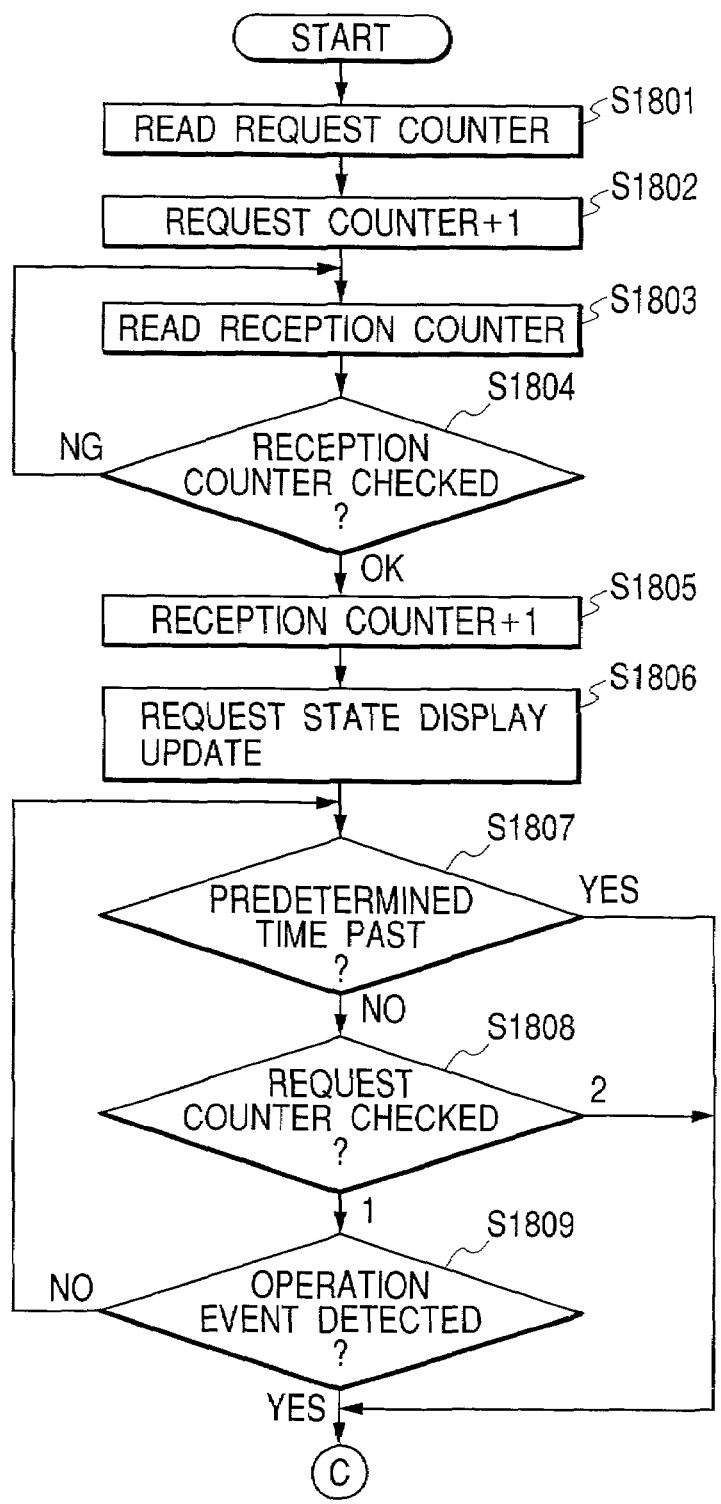
FIG. 18 is the first half of a flowchart showing a processing procedure of an operation display response CGI program according to the fifth embodiment.
Figure 19:
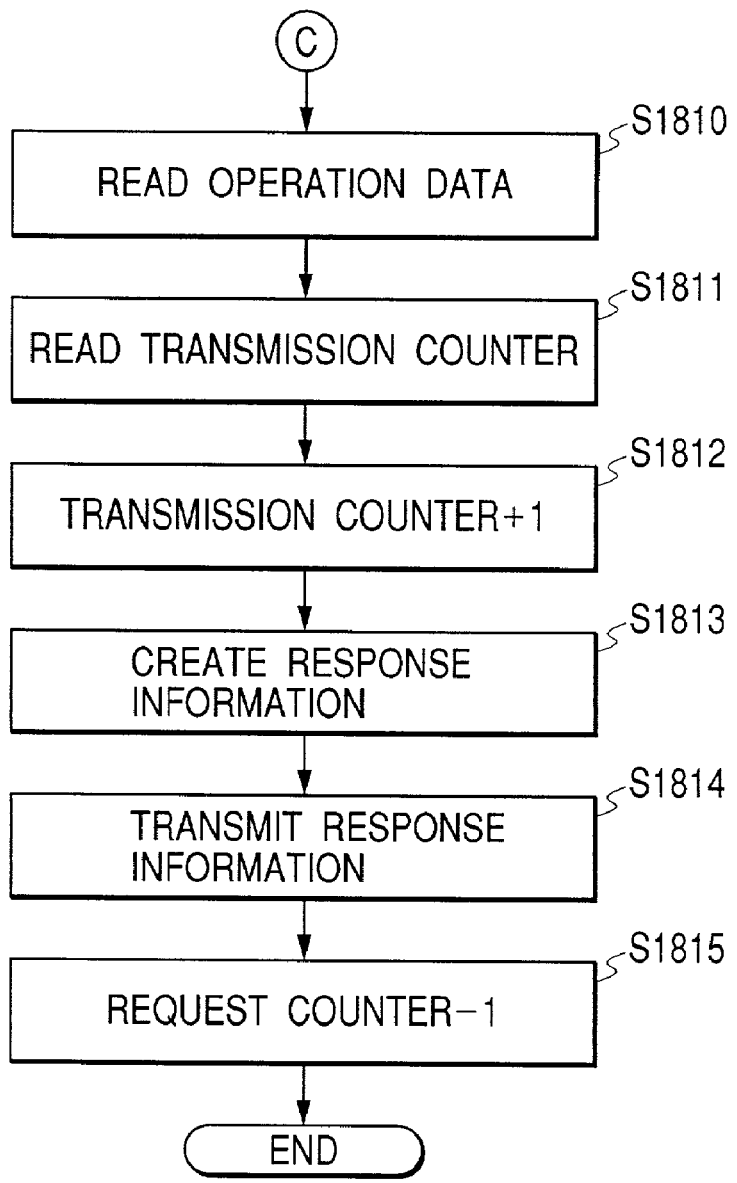
FIG. 19 is the latter half of the flowchart showing the processing procedure of the operation display response CGI program according to the fifth embodiment.

FIGS. 18 and 19 are a flowchart showing the processing procedure of the operation display response CGI program 8521. This operation display response CGI program 8521 includes three counters (not shown).

The first counter is used to count the number of execution processes of the operation display response CGI program 8521 activated by HTTP requests sent from the operation information exchange program 8411. The initial value of this counter is "0". This counter is hereinafter referred to as "request counter".

The second counter is used to check the processing order of state information received from the operated apparatus 820, and is paired with the transmission counter of the operation information exchange program 8411. The initial value of this counter is "0" and a data number related to this counter is embedded in each piece of request data. This counter is hereinafter referred to as "transmission counter".

The third counter is used to control the processing order of HTTP responses to be transmitted, and is paired with the reception counter of the operation information exchange program 8411. The initial value of this counter is "0" and a data number related to this counter is embedded in each piece of response data. This counter is hereinafter referred to as "reception counter".

First, the value of the request counter is read from a counter table (not shown) that is equivalent to the foregoing counter table 801 and is stored in a shared memory area (step S1801). Like the counter table 801, in addition to the value of the request counter, this counter table gives values of the transmission counter and reception counter to be described later. The number of execution processes of the operation display response CGI program 8521 that are currently running is written in the request field of the counter table. Then, the value of the request counter is incremented by one (step S1802).

Following this, the value of the reception counter is read (step S1803) and it is judged whether the state information sent from the operated apparatus 820 should be processed by comparing the data number embedded in the state information with the value of the reception counter (step S1804). If the judgement result is affirmative, the value of the reception counter is incremented by one (step S1805).

Then, as in the fourth embodiment, an operation display update request is issued to the operation display GUI program 854 (step S1806). Note that the exclusive control described above is performed in steps S1805 and S1806, thereby preventing a situation where the same step of the execution processes of the operation display CGI program 8521 that are running in parallel is performed at the same time during the processing. Also, the processing of the operation display GUI program 8521 is the same as that described in the fourth embodiment.

Following this, it is judged whether a predetermined period of time has passed (step S1807). If it is judged that the predetermined period of time has passed, the processing proceeds to step S1810. On the other hand, if it is not judged that the predetermined period of time has passed, the value of the request counter is checked (step S1808). If the value of the request counter is "2", the processing proceeds to step S1810. On the other hand, if the value of the request counter is "1", it is judged whether any operation event is detected (step S1809). If no operation event is detected, the processing returns to step S1807; if any operation event is detected, the processing proceeds to step S1810.

By checking the value of the request counter until the predetermined period of time has passed in this manner, the processing waits for an operation designation to be inputted, that is, waits for the information in the request field of an information exchange table (not shown) that is the same as the information exchange table of the fourth embodiment to be updated.

If an operation event is detected in step S1809, updated request information is read from the request field of the information exchange table (step S1810). Note that if no operation event takes place within the predetermined period of time, non-operation information is generated.

Then, the value of the transmission counter is read (step S1811) and the value of the transmission counter is incremented by one (step S1812). Note that during the operations in steps S1810 to S1812, the aforementioned exclusive control is performed.

Response information is created based on the read operation information and is outputted to the standard output (step S1813). Then, the HTTP server program 851 returns a response to the operation information exchange program 8411 running on the operated apparatus 820 (step S1814). For instance, the response information given below is outputted to the standard output.

Content-Type: application/x-getoperation
¥r¥n
receive_counter=1¥r¥n
light=ON¥r¥n
blind=80¥r¥n The HTTP server program 851 adds other necessary information to the response information and returns information. In this case, the returned information is the same as the foregoing response information received by the operation information exchange program 8411.

On the other hand, if it is judged that the predetermined period of time has passed in step S1807 (that is, if no operation designation is inputted by the user within the predetermined period of time) or if a plurality of operation waiting states are detected in step S1808, response information given below (giving "none" which means that no operation designation is inputted) is outputted to the standard output.

Content-Type: application/x-getoperation
¥r¥n
receive_counter=1¥r¥n
none¥r¥n

Following this, the value of the request counter is decremented by one (step S1815).

Note that this embodiment concerns a case where two communication connections are used, although three or more communication connections may be used. In the above description, the request counter check operation in step S1502 shown in FIG. 15 is performed as follows. If the value of the request counter is set as "0", a state notification is transmitted even if no state change is made. If the value of the request counter is set as "1", the processing waits for any state change to be made. If the value of the request counter is set as "2", the processing waits for one of the communication connections to be cut. For example, in the case where "n" communication connections are used and "m (m<n)" execution processes are waiting for operation events to take place, the request counter check operation in step S1502 is performed as follows. If the value of the request counter is in a range of from "0" to "m−1", a state notification is transmitted even if no state change is made. If the number of requests waiting for responses is in a range of from "m" to "n−1", the processing waits for any state change to be made. If the number of request is "n", the processing waits for any of the communication connections to be cut.

Also, in the above description, the operation in the request counter check operation in step S1808 shown in FIG. 18 is performed as follows. If the value of the request counter is set as "1", the processing waits for any operation event to take place. If the value of the request counter is set as "2", the processing exits from the operation waiting loop. If the value of the request counter is set in a range of from "1" to "m−1", the processing waits for any operation event to take place. If the value of the request counter is set as "m", the processing exits from the operation waiting loop.

The remote operating system of this embodiment has the construction described above. Therefore, in this embodiment, even if the operated apparatus 820 is installed inside of the firewall, it is possible to remotely operate the operated apparatus 820 (the remote operation target device in this embodiment) from the operating terminal 830 connected to the Internet 100.

Also, in this embodiment, even with a single communication connection, it is possible to perform both of the state notification processing and the operation communication processing. Further, even if two or more communication connections are used, each communication connection other than the communication connection that was first established (the first communication connection in the above description) is established only when the communication connection is required. This reduces the load on the network.

(Sixth Embodiment)

In the fourth embodiment, one communication connection is assigned to each of the state notification cycle and the operation communication cycle. However, the present invention is not limited to this. In a sixth embodiment, a plurality of communication connections are assigned to either or both of the state notification cycle and the operation communication cycle. This makes it possible to deal speedily with state changes that are successively made or operation requests that are continuously issued.

The remote operating system of the present embodiment is realized by changing the system construction described in the fourth embodiment. In more detail, the processing of the state notification program 841, the operation data collecting program 842, the operation display CGI program 852, and the operation CGI program 853 are changed. Note that the same construction elements and processing as in the fourth embodiment are given the same reference numerals and are not described in this embodiment.

(State Notification Program 841)

Figure 20:
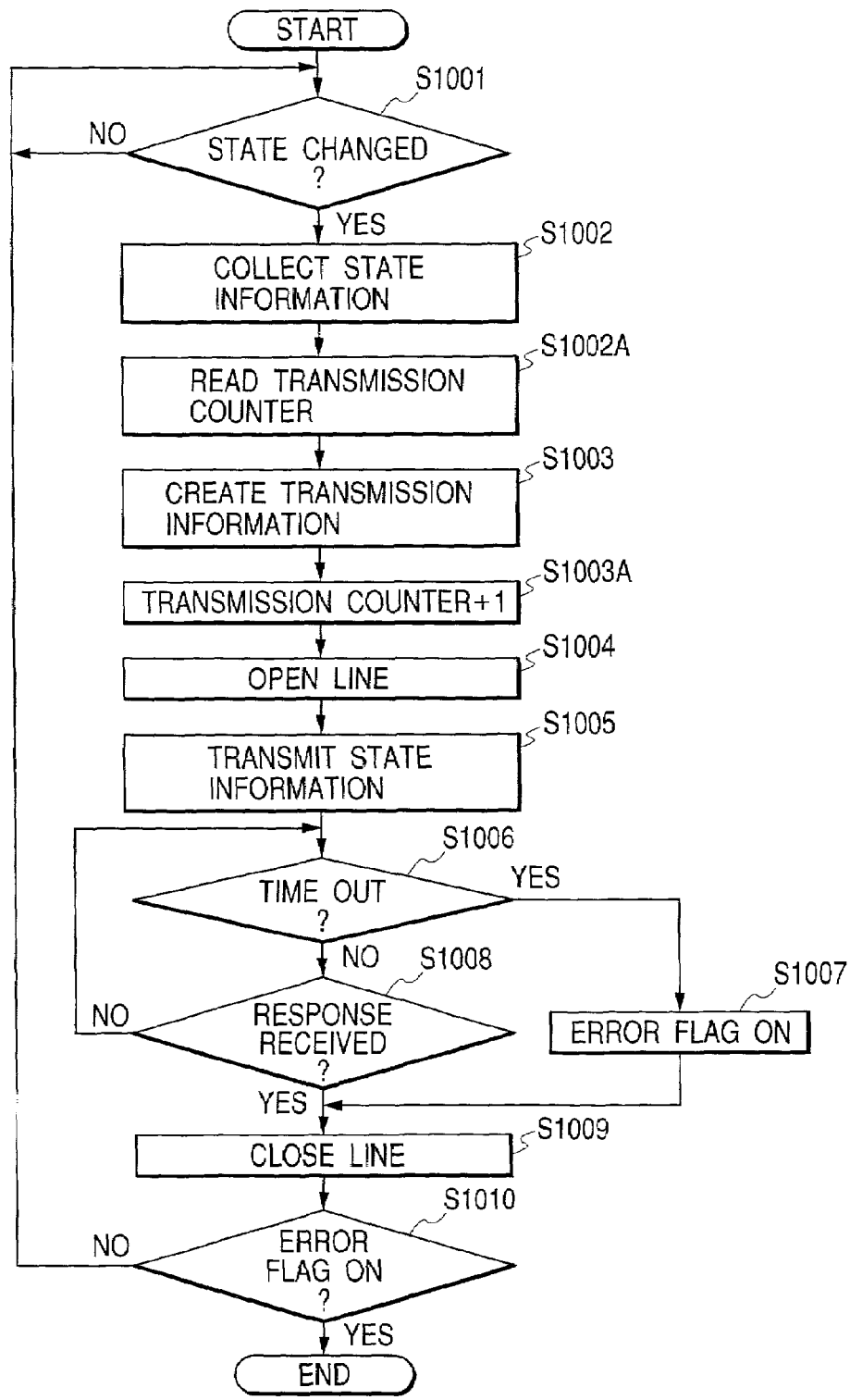
FIG. 20 is a flowchart showing a processing procedure of a state notification program according to a sixth embodiment of the present invention.

The processing performed in the state notification cycle at the operated apparatus 820 is described below with reference to FIG. 20. This drawing is a flowchart showing the processing procedure of the state notification program 841 of the present embodiment. The processing shown in this drawing is performed by a CPU (not shown) that is provided in the operated apparatus 820 and executes the state notification program 841 stored in a ROM (not shown) that is also provided in the operated apparatus 820.

In this embodiment, the state notification program 841 simultaneously starts two or more execution processes to be performed in parallel. The state notification program 841 of this embodiment is the same as that of the fourth embodiment except for that the present state notification program 841 additionally performs a transmission counter reading operation (step S1002A) and a transmission counter incrementing processing (step S1003A) that are respectively similar to the operations in steps S1505 and S1507 described in the fifth embodiment. Also, during the operations in steps S1002 to S1003A, there is performed the exclusive control described in the fifth embodiment.

Consequently, even if the state notification program 841 starts a plurality of execution processes that are performed in parallel, there occurs no problem during processing. That is, each piece of transmission data is given a data number, so that even if a plurality of pieces of transmission data reach the operating terminal 830 in inverse order, it is possible for the operation display CGI program 852 described below to process these transmission data in a correct order.

(Operation Display CGI Program 852)

Next, the processing performed in the state notification cycle at the operating terminal 830 is described. As in the fourth embodiment, a setting was made in advance so that the operation display CGI program 852 is activated when the HTTP server program 851 running on the operating terminal 830 receives a request designating a URL path "/CGI-bin/newstatus". Consequently, when this request is received from the operated apparatus 820, the operation display CGI program 852 is activated.

Figure 21:
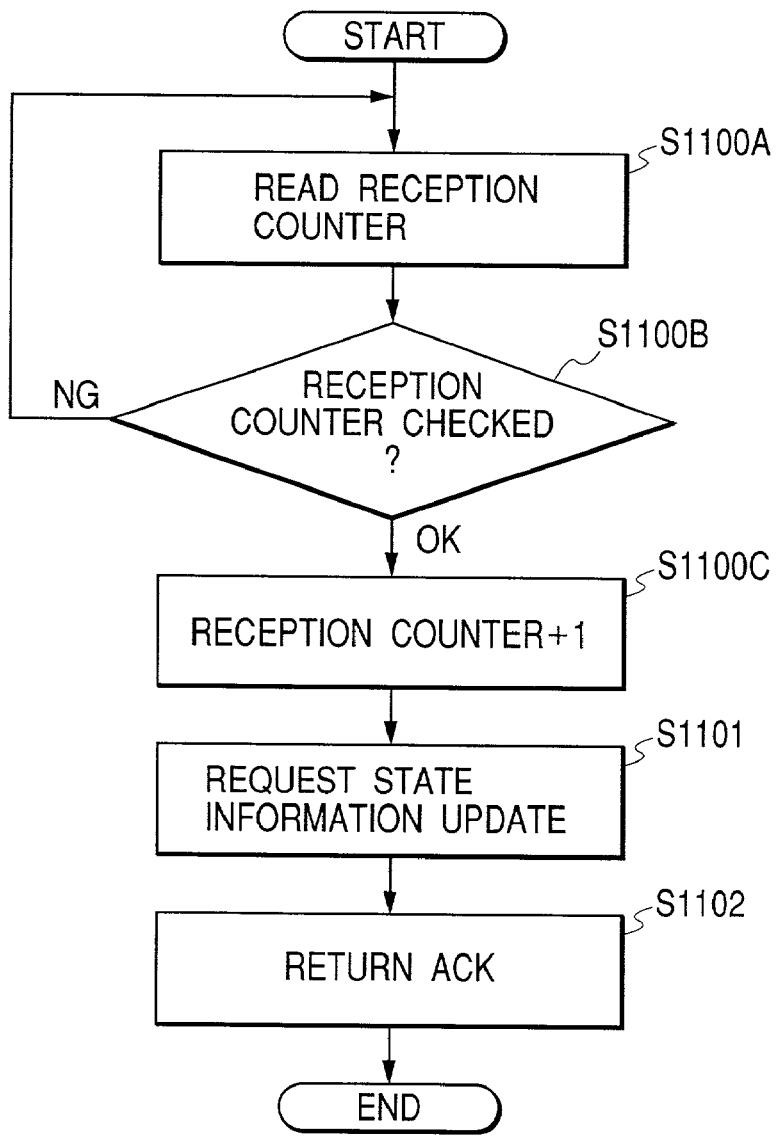
FIG. 21 is a flowchart showing a processing procedure of an operation display CGI program according to the sixth embodiment.

FIG. 21 is a flowchart showing the processing procedure of the operation display CGI program 852 of this embodiment. The processing shown in this drawing is performed by a CPU (not shown) that is provided in the operating terminal 830 and executes the operation display CGI program 852 stored in a ROM (not shown) that is also provided in the operating terminal 830.

In this embodiment, the state notification program 841 starts a plurality of execution processes that are performed in parallel. Therefore, there may be cases where the operation display CGI program 852 receives two or more requests at a time. In such cases, the operation display CGI program 852 is activated each time a request is received, thereby starting a plurality of execution processes to be performed in parallel.

The operation display CGI program 852 is the same as that of the fourth embodiment except for that the present operation display CGI program 852 additionally performs a reception counter reading operation (step S1100A), a reception counter check operation (step S1100B), and a reception counter incrementing operation (step S1100C) that are respectively similar to the operations in steps S1803, S1804, and S1805 of the fifth embodiment.

Note that the exclusive control described above is performed during the operations in steps S1100C and S1101 to prevent a situation where the same step of the execution processes of the operation display CGI program 852 that are running in parallel is executed at the same time during the processing.

As a result of this exclusive control, even if the operation display CGI program 852 performs a plurality of execution processes in parallel, it is possible to perform the processing in a correct order by managing the reception counter and checking the data number embedded in each piece of reception data.

(Operation Data Collecting Program 842)

Figure 22:
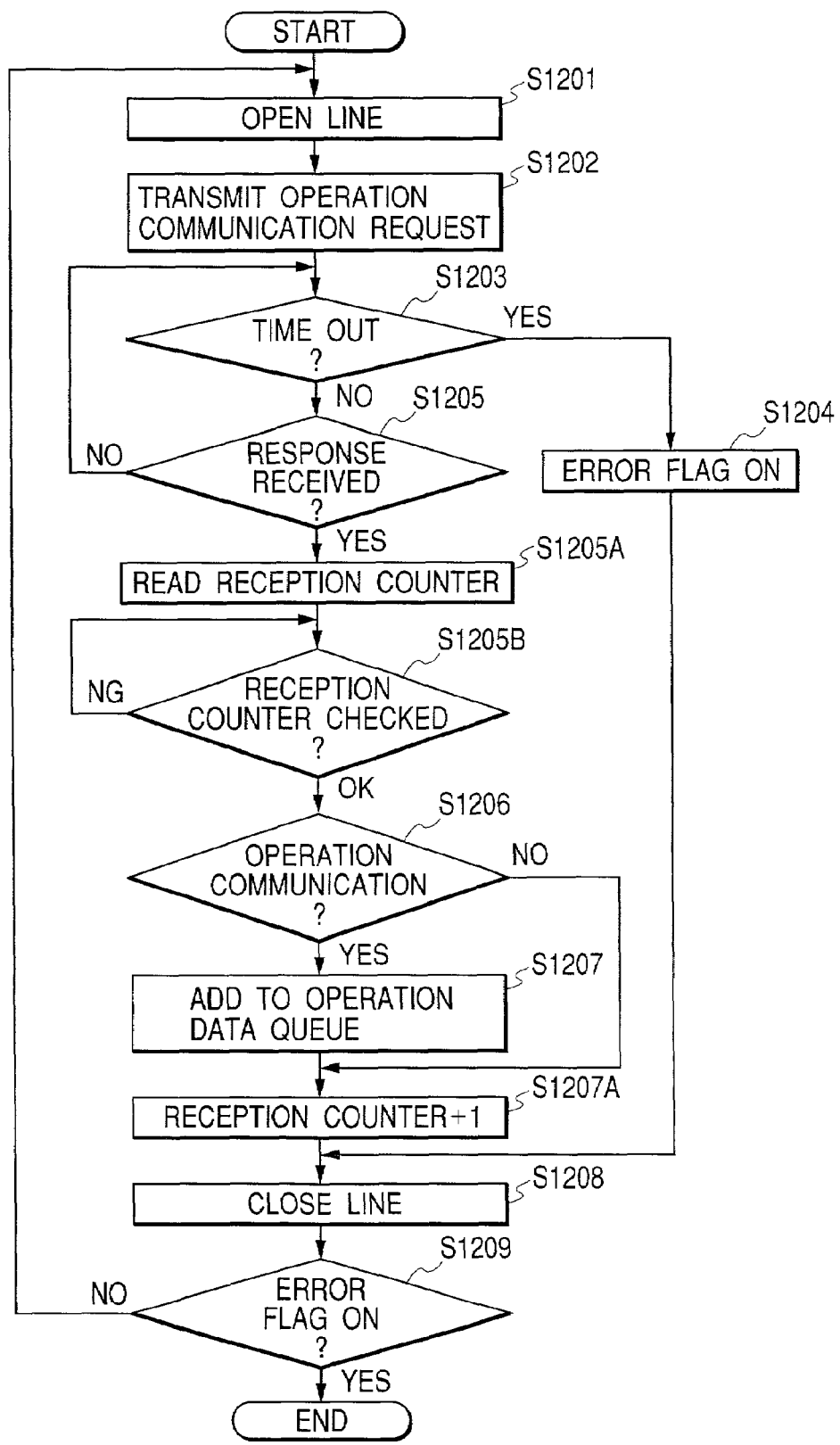
FIG. 22 is a flowchart showing a processing procedure of an operation data collecting program according to the sixth embodiment.

Next, the processing performed in the operation communication cycle at the operated apparatus 820 is described. FIG. 22 is a flowchart showing the processing procedure of the operation data collecting program 842. The processing shown in this drawing is performed by a CPU (not shown) that is provided in the operated apparatus 820 and executes the operation data collecting program 842 stored in a ROM (not shown) that is also provided in the operated apparatus 820.

In this embodiment, the operation data collecting program 842 starts two or more execution processes to be performed in parallel.

The operation data collecting program 842 of this embodiment is the same as that of the fourth embodiment except for that the present operation data collecting program 842 additionally performs a reception counter reading operation (step S1205A), a reception counter check operation (step S1205B), and a reception counter incrementing operation (step S1207A) that are respectively similar to the operations in steps S1514, S1515, and S1518 of the fifth embodiment. Note that during the operations in steps S1206 to S1207A, the exclusive control described in the fifth embodiment is performed.

As a result of this exclusive control, even if the operation data collecting program 842 performs a plurality of execution processes in parallel, it is possible to perform the processing in a correct order by managing the reception counter and checking the data number embedded in each piece of reception data.

(Operation CGI Program 853)

Next, the processing performed in the operation communication cycle at the operating terminal 830 is described. Similar to the fourth embodiment, a setting has been made so that the operation CGI program 853 is executed when the HTTP server program 851 running on the operating terminal 830 receives a request designating a URL path "/CGI-bin/getoperation". Consequently, when this request is received from the operated apparatus 820, the operation CGI program 853 is activated.

Figure 23:
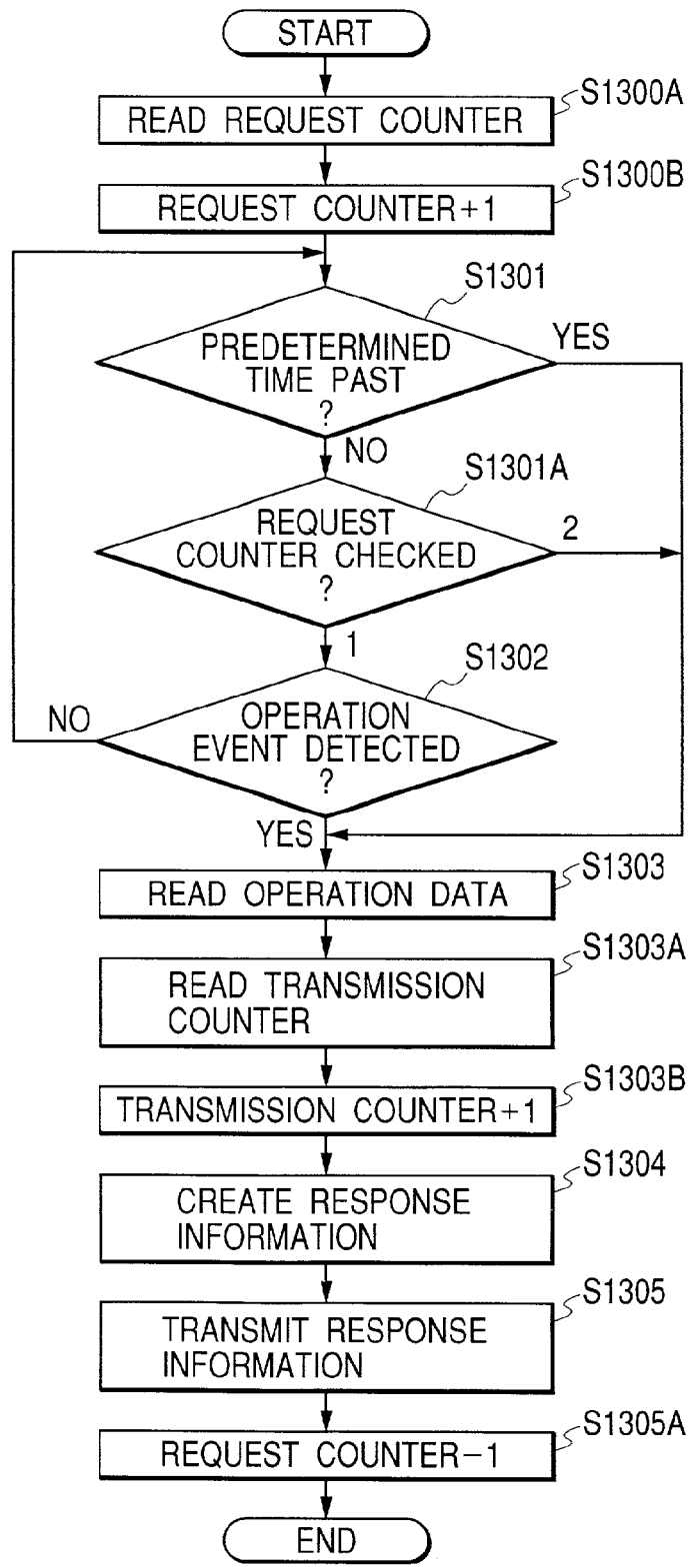
FIG. 23 is a flowchart showing a processing procedure of an operation CGI program according to the sixth embodiment.

FIG. 23 is a flowchart showing the processing procedure of the operation CGI program 853. The processing shown in this drawing is performed by a CPU (not shown) that is provided in the operating terminal 830 and executes the operation CGI program 853 stored in a ROM (not shown) that is also provided in the operating terminal 830.

In this embodiment, as described above, the operation data collecting program 842 starts a plurality of execution processes that are performed in parallel. Therefore, there may be cases where the operation CGI program 853 receives two or more requests at a time. In such cases, the operation CGI program 853 is activated each time a request is received, thereby starting a plurality of execution processes to be performed in parallel.

The operation CGI program 853 is the same as that of the fourth embodiment except for that the present operation CGI program 853 additionally performs a request counter reading operation (step S1300A), a request counter incrementing operation (step S1300B), a request counter check operation (step S1301A), a transmission counter reading operation (step S1303A), a transmission counter incrementing operation (step S1303B), and a request counter decrementing operation (step S1305A) that are respectively similar to the operations in steps S1801, S1802, S1808, S1811, S1812, and S1815 of the fifth embodiment. Note that during the operations in steps S1303 to S1303B, the exclusive control described in the fifth embodiment is performed.

As a result of this exclusive control, even if the operation CGI program 853 performs a plurality of execution processes in parallel, there occurs no problem during the processing. That is, each piece of transmission data is given a data number, so that even if a plurality of pieces of transmission data reach the operated apparatus 820 in inverse order, it is possible for the operation data collecting program 842 described above to process these transmission data in a correct order.

The remote operating system of this embodiment has the construction described above. Therefore, in this embodiment, it is possible to use a plurality of communication connections in either or both of the state notification cycle and the operation communication cycle. As a result, even if state changes are successively made in a short time or even if operation requests are continuously issued in a short time, it is possible to perform the state notification processing and the operation communication processing immediately.

(Seventh Embodiment)

A seventh embodiment differs from the fifth embodiment in that a program for performing communications with the operating terminal is installed as a separate program in the operated apparatus and processing is performed using continuous communication connections.

Figure 24:
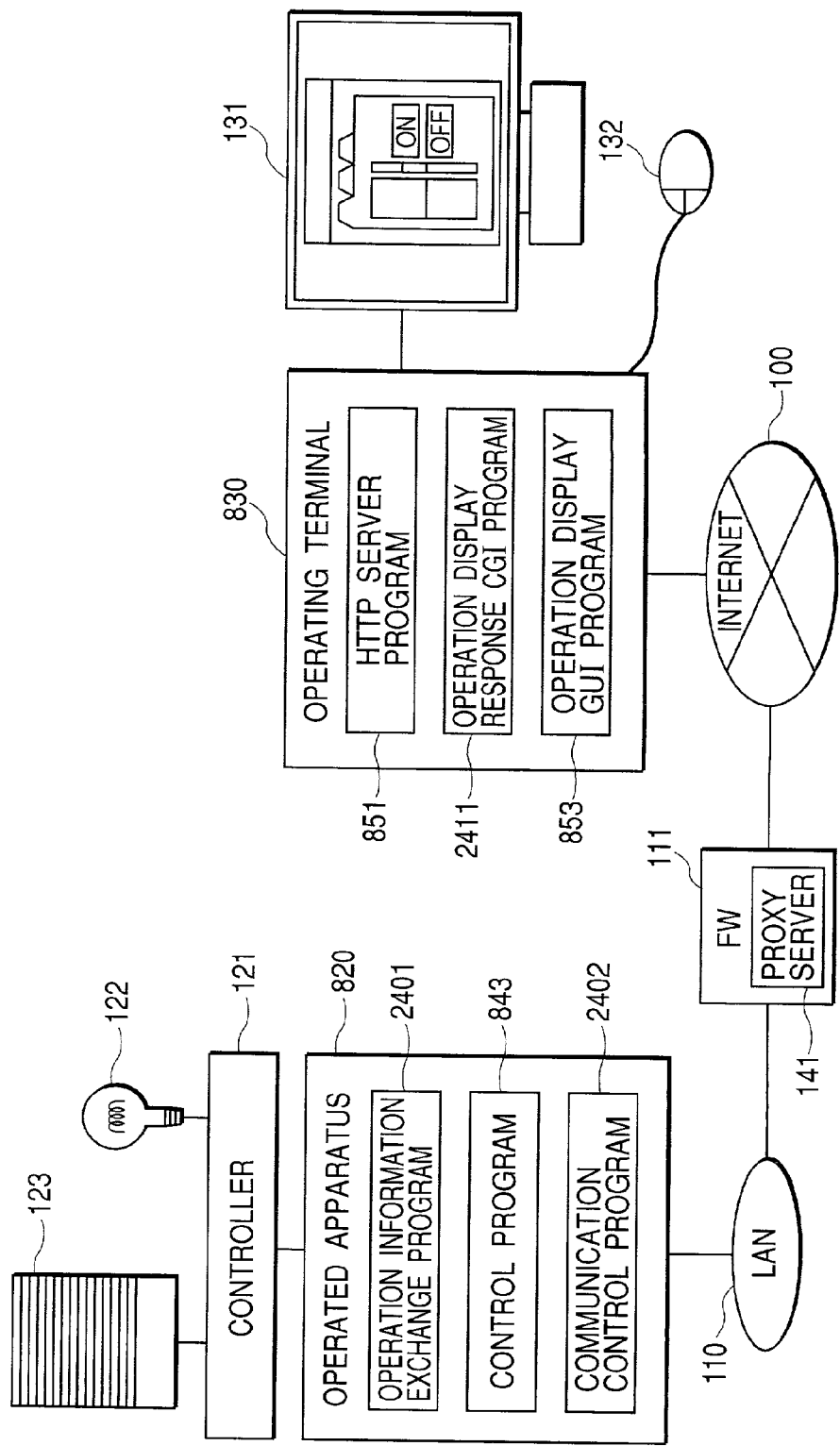
FIG. 24 shows a system construction of a remote operating system according to the seventh embodiment of the present invention.

FIG. 24 shows the system construction of a remote operating system according to the seventh embodiment. In this drawing, the construction elements numbered 100, 110, 111, 141, 121 to 123, 131, 132, 820, 843, 830, 851, and 853 are the same as those of the fifth embodiment and therefore are not described in this embodiment. Here, the HTTP server program 851 of this embodiment supports continuous communication connections and pipeline processing. In particular, the HTTP server program 851 has a function of ensuring, during the pipeline processing, that responses to requests are returned in the order of receipt of the requests according to the HTTP specification.

Also, in the present embodiment, an operation information exchange program 2401 is typically used in place of the operation information exchange program 8411 of the fifth embodiment. The operation information exchange program 2401 is installed in the operated apparatus 820 and runs thereon. A communication control program 2402 is additionally installed in the operated apparatus 820 and runs thereon.

On the other hand, the construction of the operating terminal 830 is changed as follows. In the present embodiment, an operation display response CGI program 2411 is typically used in place of the operation display response CGI program 8521 of the fifth embodiment. This operation display response CGI program 2411 is installed in the operating terminal 830 and runs thereon. The operation information exchange program 2401, the communication control program 2402, and the operation display response CGI program 2411 are described in detail below.

(Communication Control Program 2402)

The communication control program 2402 activates and manages the operation information exchange program 2401 as its child process. The communication control program 2402 also establishes and maintains continuous connections with the HTTP server program 851 running on the operating terminal 830, and controls the transmission of state information and operation information over the continuous connections. The communication control program 2402 further includes two timers, one counter, and two state flags, and holds time-out values of the timers.

The first timer is used to prevent a situation where a continuous connection is cut because the time-out period of the continuous connection has passed. To do so, the first timer checks a time period from the reception of an HTTP response to the next transmission of an HTTP request. The time-out value of this timer is slightly shorter than the time-out period of a continuous connection used by a general proxy server program. Each continuous connection established by the communication control program 2402 is assigned one first timer. This timer is hereinafter referred to as "continuous connection time-out timer" or "timer of continuous connection".

The second timer is used to prevent a situation where the communication control program 2402 falls into an infinite waiting state when there occurs a fault in any of the HTTP server program 851, the proxy server 141, and the network. In more detail, the second timer checks a time period from the transmission of state information as an HTTP request to the reception of a response corresponding to the HTTP request. The time-out value for this counter is set as a fixed value equal to a time-out period that is generally used for the HTTP protocol. Each HTTP request is assigned one second timer. More specifically, the second timer is assigned when a request is transmitted, and the assignment of this timer is canceled when a response corresponding to the request is received. The second timer is hereinafter referred to as "HTTP time-out timer".

The counter counts the number of HTTP requests that have been issued by the communication control program 2402 but have not yet received responses from the HTTP server program 851. The initial value of this counter is "0". This counter is hereinafter referred to as "response waiting counter".

The two state flags secured in a shared memory area accessible by the programs are used to control the issuance of data transmission requests and data reception requests in execution processes (child processes) between the operation information exchange program 2401. The initial values of these state flags are both "0". These state flags are hereinafter referred to as "transmission waiting flag" and the "reception waiting flag", respectively.

Figure 25:
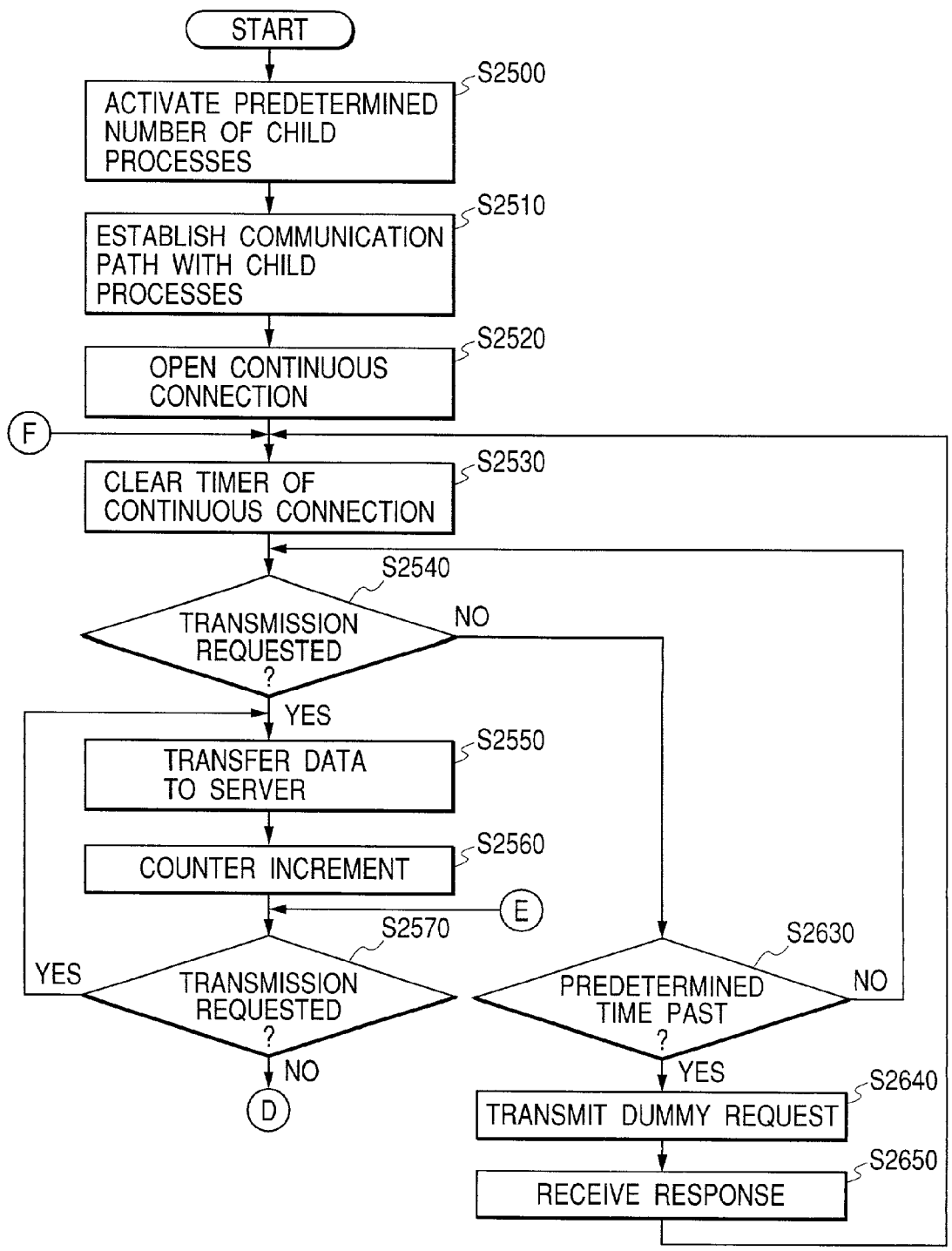
FIG. 25 is the first half of a flowchart showing a processing procedure of a communication control program according to a seventh embodiment.
Figure 26:
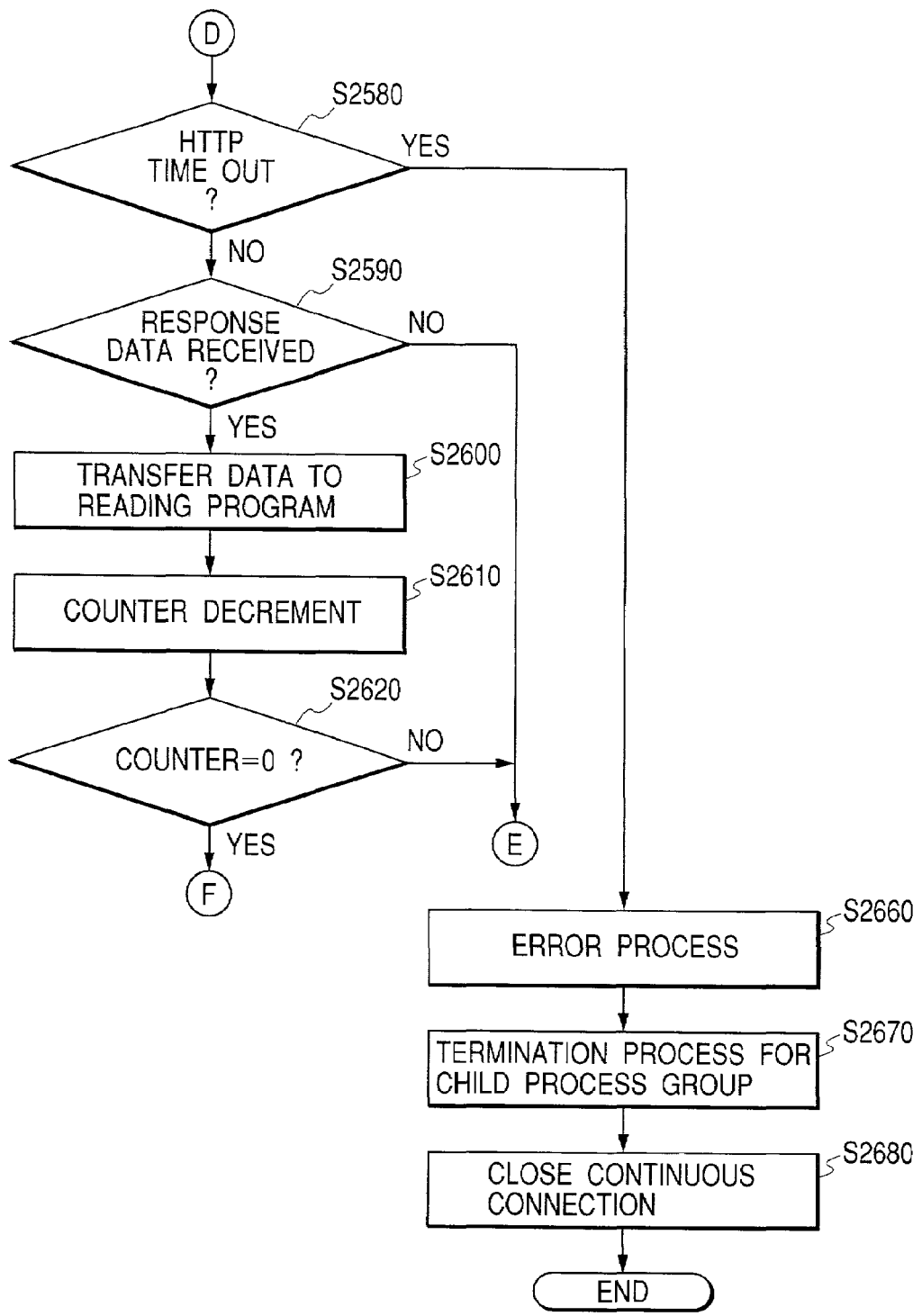
FIG. 26 is the latter half of the flowchart showing the processing procedure of the communication control program according to the seventh embodiment.

FIGS. 25 and 26 are a flowchart showing the processing procedure of the communication control program 2402. The processing shown in these drawings is performed by a CPU (not shown) that is provided in the operated apparatus 820 and executes the communication control program 2402 stored in a ROM (not shown) that is also provided in the operated apparatus 820.

After being activated, the communication control program 2402 activates the operation information exchange program 2401 a predetermined number of times to start its child processes (step S2500). In this embodiment, there is described a case where the communication control program 2402 activates "n" child processes (n is an integer at least equal to two). The communication control program 2402 then establishes interprocess communication paths with the child processes (step S2510).

Next, the communication control program 2402 establishes a continuous connection with the HTTP server program 851 (step S2520). In this embodiment, the continuous connection is established using a method corresponding to the HTTP version used in this system.

Note that this continuous connection is established between the communication control program 2402 and the proxy server 141 installed on the firewall 111, and the proxy server 141 establishes a different continuous connection with the HTTP server program 851.

Following this, the continuous connection time-out timer is cleared (step S2530).

The communication control program 2402 completes the initial settings by performing the stated operations. Following this, the communication control program 2402 controls data exchange between the operation information exchange program 2401 (child processes) and the HTTP server program 851. First, it is checked whether any of the child processes requests a data transmission to the HTTP server 851 (step S2540). In brief, during the operation in step S2540, the value of the transmission waiting flag is checked and, if the value is not "0", it is determined that a child process having the process ID represented by the value of this flag is requesting a data transmission. This operation will be described in more detail in the description of the operation information exchange program 2401.

If no transmission request is detected, the communication control program 2402 judges whether the value of the continuous connection time-out timer has reached a predetermined period of time-out period (step S2630). If the judgement result is affirmative, the communication control program 2402 creates a dummy HTTP request and transmits this request to the HTTP server 851, thereby preventing a situation where the continuous connection is cut (step S2640). The communication control program 2402 then receives a response to the HTTP request (step S2650). Then, the processing returns to step S2540.

Any HTTP request may be transmitted as the dummy request so long as the HTTP sever program 851 running on the operating terminal 830 returns a response. However, it is preferable that the dummy request transmitted to the HTTP server 851 has a small data amount. Therefore, for instance, a request "HEAD HTTP://foo.bar.co.jp/HTTP/1.0" is transmitted as the dummy request. The data received as a response from the HTTP server program 851 is unnecessary, so that the communication control program 2402 discards this data. Then, after receiving the response, the processing returns to step S2530. On the other hand, if it is not determined that the value of the continuous connection time-out timer has reached the predetermined period of time-out period in step S2630, the processing returns to step S2540.

On the other hand, if it is judged that any of the child processes issues a data transmission request in step S2540, the communication control program 2402 receives transmission data from a corresponding child process using an interprocess communication path and transmits the transmission data (an HTTP request) to the HTTP server program 851 over the continuous connection (step S2550). Then, the communication control program 2402 increments the response waiting counter (step S2560).

By utilizing the pipeline processing function, the communication control program 2402 checks whether there is issued any other data transmission request before preceding to step S2580 (step S2570). If another data transmission request has been issued, the processing returns to step S2550.

On the other hand, if the judgement result in step S2570 is negative, it is checked whether the value of any HTTP time-out timer has reached the predetermined period of time-out period (step S2580). If the judgement result is affirmative, an error process is performed (step S2660), the child processes are terminated by performing interruption processing or the like (step S2670), the continuous connection with the HTTP server program 851 is closed (step S2680), and the processing of the communication control program 2402 is ended.

On the other hand, if the judgement result in step S2580 is negative, it is judged whether response data is sent from the HTTP server program 851 (step S2590). If response data is received, it is checked which child process is waiting for data reading and the received data is transferred to the child process (step S2600). In brief, during the operation in step S2600, the value of the reception waiting flag is checked and the received data is transferred to the child process having the process ID represented by the value of this flag. This operation will be described in more detail in the description of the operation information exchange program 2401.

Then, the response waiting counter is decremented (step S2610) and it is judged whether the value of this counter becomes "0" (step S2620). If the value of the response waiting counter becomes "0", there remains no HTTP request waiting for a response, so that the processing returns to step S2530 and the pipeline processing is once ended here. On the other hand, if it is not judged that the value of the response waiting counter becomes "0" in step S2620, the processing returns to step S2570 to continuously perform the pipeline processing. Also, if no response data has been received in step S2590, the processing returns to step S2570.

(Operation Information Exchange Program 2401)

The processing of the operation information exchange program 2401 is basically the same as that of the operation information exchange program 8411 of the fifth embodiment except for operations related to the communication control program 2402. Therefore, the same steps as in the fifth embodiment are not described in this embodiment.

The operation information exchange program 2401 includes two counters, two queues, and two state flags that are stored in a shared memory area accessible by the programs.

The first counter is shared by child processes (the operation information exchange program 2401) that are performed in parallel. This counter counts the number of child processes that have issued state notification/operation communication requests but have not yet received responses. The initial value of this counter is "0". This counter is hereinafter referred to as "request counter".

The second counter is also shared by the child processes that are performed in parallel. This counter counts the number of state notifications transmitted up to this time. The initial value of this counter is the same as the initial value of a reception counter of the operation display response CGI program 2411. This counter is hereinafter referred to as "transmission counter".

The first queue is also shared by the child processes that are performed in parallel. This queue stores process IDs of child processes waiting for state changes. This queue initially stores no data. This queue is hereinafter referred to as "state change waiting queue".

The second queue is shared between the control program 843 and the child processes and is used to transfer operation information data therebetween. This queue is hereinafter referred to as "operation data queue".

The two state flags are respectively a transmission waiting flag and a reception waiting flag that are the same as those of the communication control program 2402.

Figure 27:
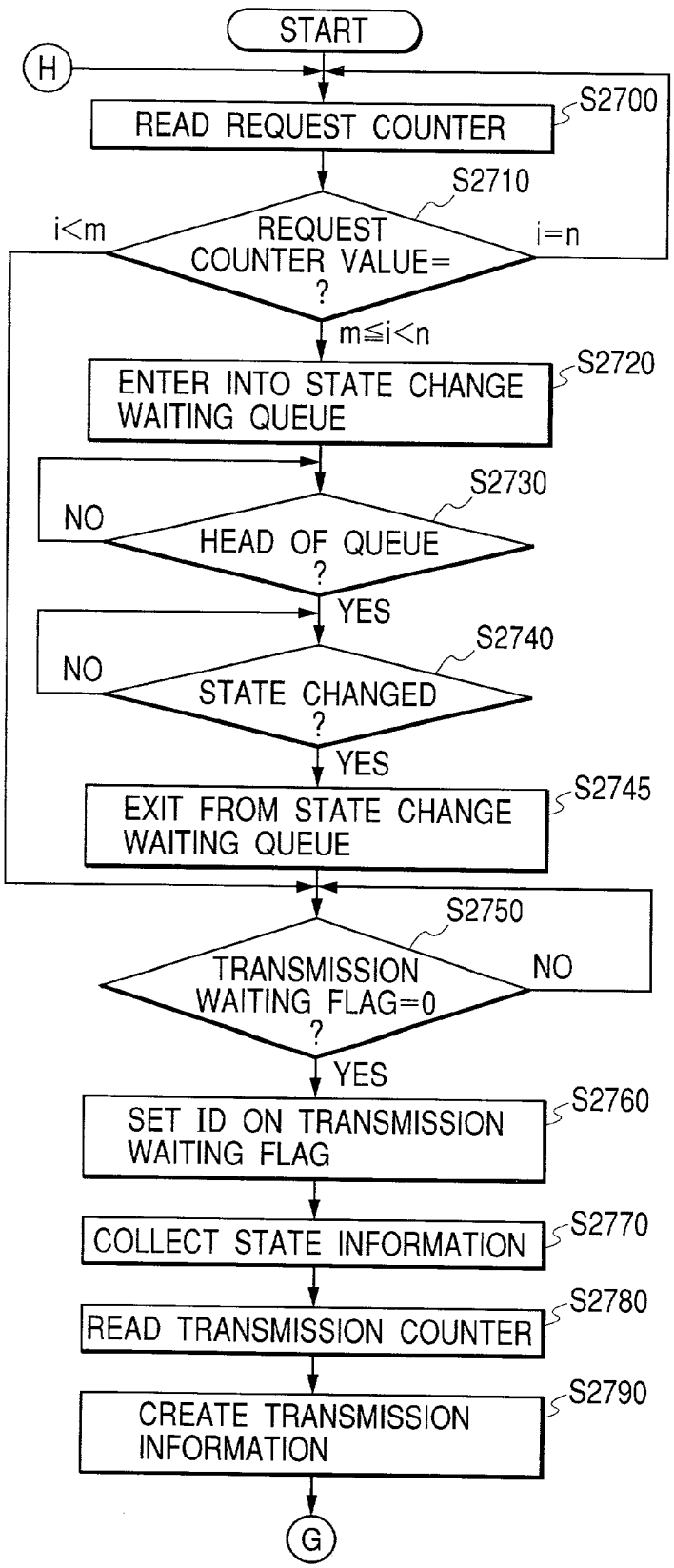
FIG. 27 is the first half of a flowchart showing a processing procedure of an operation information exchange program according to the seventh embodiment.
Figure 28:
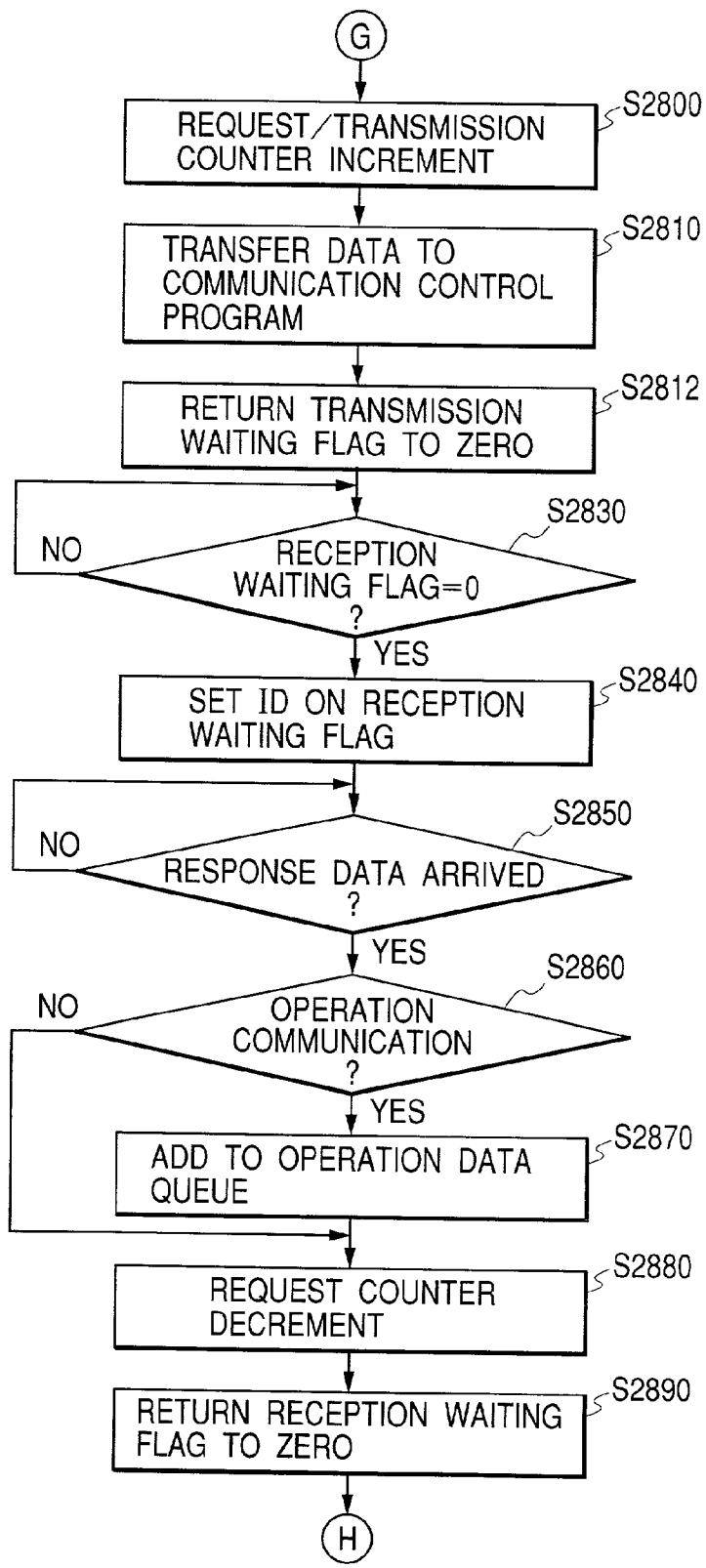
FIG. 28 is the latter half of the flowchart showing the processing procedure of the operation information exchange program according to the seventh embodiment.

FIGS. 27 and 28 are a flowchart showing the processing procedure of the operation information exchange program 2401. The processing shown in these drawings are performed by a CPU (not shown) that is provided in the operated apparatus 820 and executes the operation information exchange program 2401 stored in a ROM (not shown) that is also provided in the operated apparatus 820.

The operation information exchange program 2401 is activated a predetermined number of times by the communication control program 2402. In this embodiment, the operation information exchange program 2401 is activated "n" times. After being activated, the communication control program 2402 first reads the value of the request counter (step S2700) and checks the value "i" of this request counter (step S2710).

Here, in the case where "m" child processes are waiting for operation events (where m is an integer that is at least equal to 1 but is below n) and the value "i" of the request counter is in a range of from "0" to "m-1", even if there is no state change, the processing proceeds to step S2750 to transmit a state notification.

On the other hand, if the value "i" of the request counter is "n", the processing returns to step S2700 to wait for any request to receive a response. Also, if the value "i" of the request counter is in a range of from "m" to "n-1", the current child process places the process ID assigned thereto in the state change waiting queue and waits for any state change to be made (step S2720).

Then, the child process waits for the process ID thereof to be placed at the head of the queue (step S2730). When the process ID is placed at the head of the queue, the child process waits for a state change to be made (step S2740). When a state change is made, the child process extracts its process ID from the state change waiting queue (step S2745).

To perform exclusive control, the child process waits for the transmission waiting flag to be set as "0" (step S2750). The child process then sets the value of the transmission waiting flag at the process ID assigned thereto (the transmission waiting flag is set as a value other than "0") to realize the exclusive control (step S2760).

After the exclusive control is started, state information is collected (step S2770), the value of the transmission counter is read (step S2780), and transmission information is created (step S2790). These steps S2770, S2780, and S2790 respectively correspond to steps S1504, S1505, and S1506 shown in FIG. 15 described above.

Then, the request counter and the transmission counter are incremented (step S2800), the created transmission information is transferred to the communication control program 2402 and a transmission request is issued to the HTTP sever program 851 (step S2810), and the transmission waiting flag is reset to "0" and the exclusive control is ended (step S2820).

When response data is received from the HTTP server program 851, exclusive control is performed. During this exclusive control, the current child process waits for the reception waiting flag to be set as "0" (step S2830). Then, the child process set the value of the reception waiting flag at the process ID thereof (this flag is set as a value other than "0") to realize the exclusive control (step S2840).

During the exclusive control, the child process waits for response data from the HTTP server program 851 to be transferred from the communication control program 2402 (step S2850). Note that only one connection is shared by a plurality of child processes and the HTTP server program 851 returns responses corresponding to requests in the order of receipt of the requests, so that a situation is prevented where reception data is received out of sequence. Accordingly, the reception counter operation described in the fifth embodiment is unnecessary in this embodiment. Also, the time-out operation is unnecessary in this embodiment because this operation is performed by the communication control program 2402.

If response data is received, it is judged whether the received data is operation information (step S2860), as step S1516 shown in FIG. 16 described above. If the judgement result is affirmative, the operation information is added to the operation data queue (step S2870), as in step S1517 shown in FIG. 16 described above. Then, the request counter is decremented (step S2880), the reception waiting flag is reset to "0" and the exclusive control is ended (step S2890), and the processing returns to step S2700 to repeat the operations described above.

Note that when the communication control program 2402 (parent process) performs interruption processing or the like, the operation information exchange program 2401 performs post-processing at an arbitrary timing and the processing shown in these drawings is ended.

(Operation Display Response CGI Program 2411)

The processing of the operation display response CGI program 2411 is basically the same as that of the operation display response CGI program 8521 of the fifth embodiment. However, a plurality of execution processes of the operation display response CGI program 2411 are performed in parallel. Therefore, in step S1808 shown in FIG. 18 concerning the fifth embodiment, the processing waits for an operation event to take place if the value of the request counter is below "m", and the processing exits from the operation waiting loop if the value of the request counter value is at least equal to "m". Also, during the operations before and after the operation event detection in step S1809, the execution processes detect operation events in turn, similar to the processing of the operation information exchange program 2401 using the state change waiting queue.

In this embodiment, as described above, the processing is performed by observing the order of receipt of responses from the operation display response CGI program 2411, so that the transmission counter operation is not required. Accordingly, the operations related to the transmission counter in steps S1811 and 1812 shown in FIG. 19 are eliminated and the operation in step S1813 for adding transmission counter information to transmission information is deleted.

Also, as described above, in the seventh embodiment, HTTP continuous connections are established and a pipeline processing function is used. Therefore, with less communication resource (communication connections), it is possible to perform communications with efficiency by eliminating delay in opening the connections. This improves the communication performance of the remote operating system.

Also, the remote operating system of the present embodiment uses the communication control program that is separately and independently executed, so that it is not difficult to have the operation information exchange program and the operation display response CGI program support continuous connections and pipeline processing. Note that the technique of using the separate communication control program may be easily applied to the fourth embodiment where the state notification program and the operation data collecting program are used as separate programs.

To do so, one communication control program may be prepared for each of the state notification program and the operation data collecting program and each communication control program may control communications. Alternatively, a common communication control program shared by these programs may control communications of both of these programs. In the latter case, the common communication control program may establish one communication connection for each of the state notification program and the operation data collecting program and data of these programs may be transmitted as internally separated data. It is apparent that the continuous connections and the pipeline processing function are also applicable to these communication control programs.

(Eighth Embodiment)

In an eighth embodiment, there is intentionally caused a delay in returning operation information to the operated apparatus as a response. If a plurality of operation designations are inputted during the delay, these operation designations are transmitted as a single piece of operation information. In this manner, the operation information transmission is performed with efficiency.

Note that the system construction of a remote operating system according to this embodiment is the same as that described with reference to FIG. 8 in the fourth embodiment, and therefore is not described in this embodiment.

Figure 29:
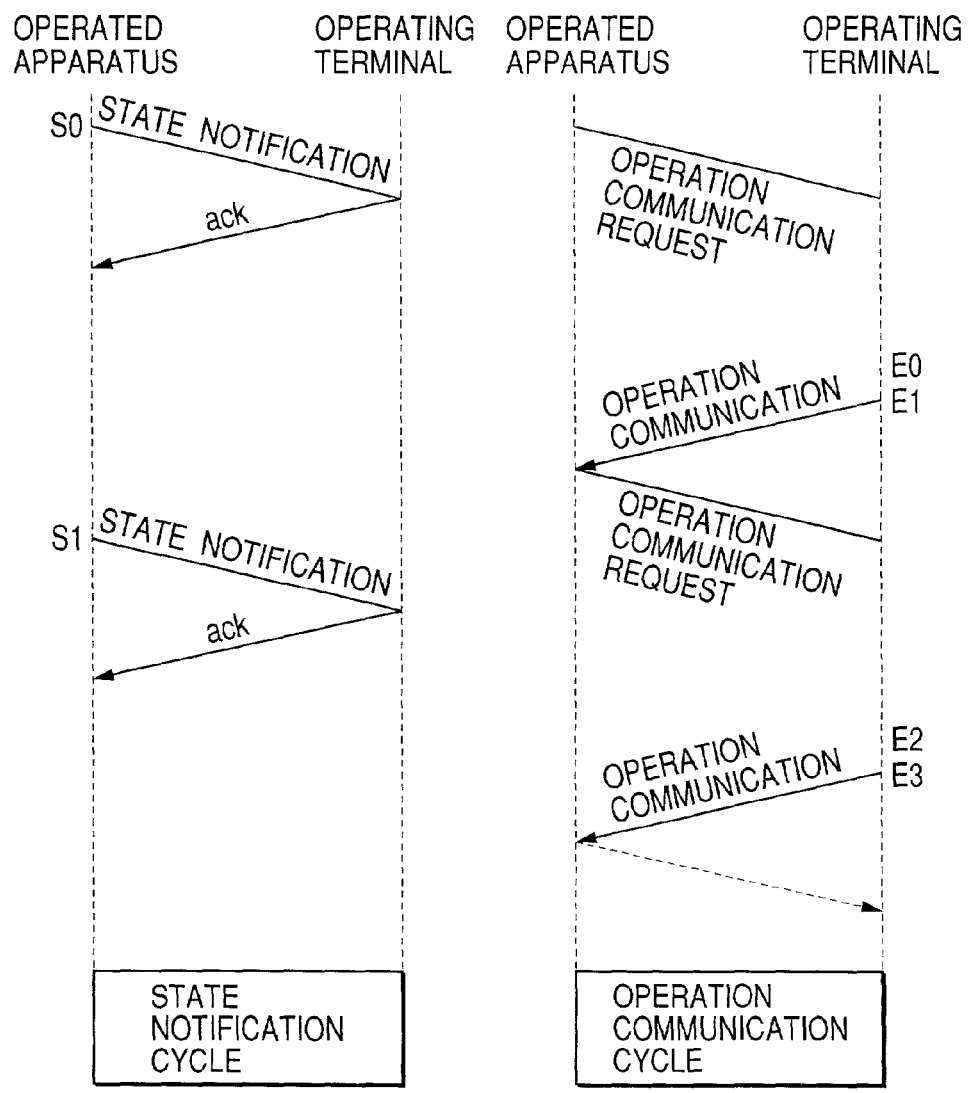
FIG. 29 is a sequence diagram showing an operation flow of a remote operating system according to an eighth embodiment of the present invention.

The operation of the remote operating system according to the present embodiment is described below with reference to FIG. 29. This drawing is a sequence diagram showing the operation flow of the present remote operating system. As in the fourth embodiment, two communication connections are established and are respectively assigned to the state notification cycle and the operation communication cycle. The notification of states of the light 122 and the blind 123 is performed using one of the communication connections and the collection of operation information from the operating terminal 830 is performed using the other of the communication connections.

In the state notification cycle, the state notification program 841 running on the operated apparatus 820 accesses the operation display CGI program 852 running on the operating terminal 830, thereby issuing a state notification. For instance, if state information S0 and S1 is transmitted from the operated apparatus 820 to the operating terminal 830, an operation screen is displayed at the operating terminal 830 based on these transmitted state information.

Meanwhile, in the operation communication cycle, the operation data collecting program 842 running on the operated apparatus 820 accesses the operation CGI program 853 running on the operating terminal 830, thereby issuing an operation communication request from the operated apparatus 820 to the operating terminal 830. Then, if operation communication information E0 and E1 are generated, for instance, the operating terminal 830 transmits these operation communication information to the operated apparatus 820 by one operation. After collecting the operation communication information E0 and E1 from the operating terminal 830, the operated apparatus 820 operates the operation target equipment based on the collected operation communication information. The processing in the state notification cycle and the operation communication cycle are performed in parallel.

Figures 30A, 30B:
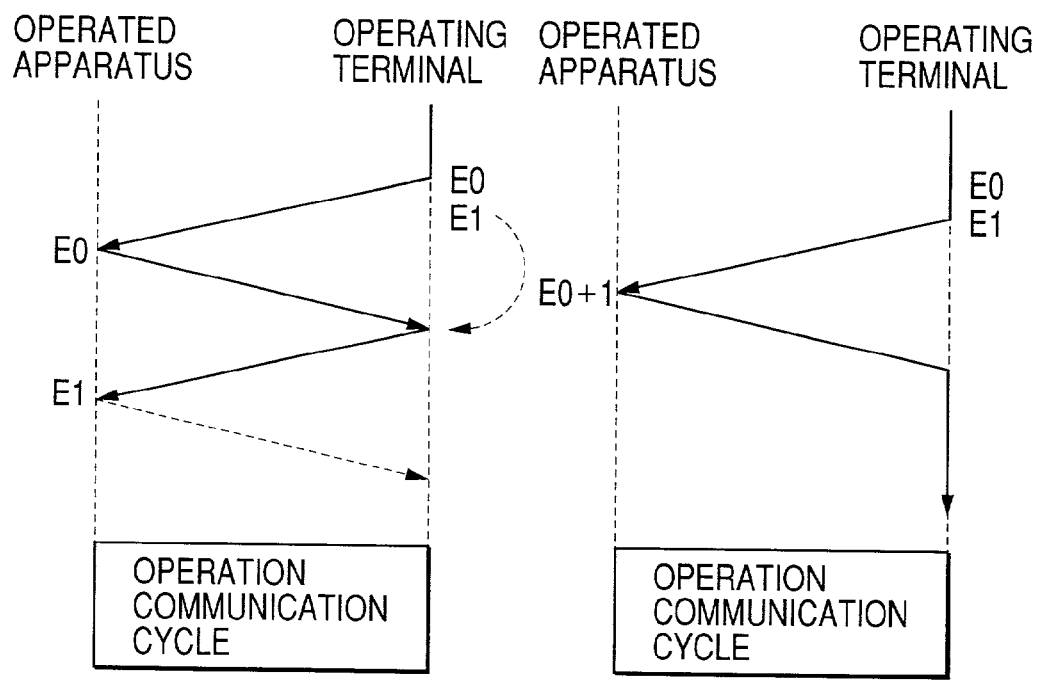
FIGS. 30A and 30B are each a sequence diagram showing an operation flow in an operation communication cycle.

FIGS. 30A and 30B are each a sequence diagram showing the operation flow in the operation communication cycle. As in FIG. 30A, if the operation information E0 is generated on the operating terminal 830 side and the operation communication is performed, there occurs a delay in the transmission of the succeeding operation information E1. In view of this problem, in this embodiment (see FIG. 30B), after the operation information E0 is generated at the operating terminal 830, there is intentionally caused a short delay in performing the next operation. If the next operation information E1 is generated during this short delay, these operation communication information E0 and E1 are converted into a single piece of operation information E0+1 and this operation information E0+1 is transmitted.

The processing of the state notification program 841 and the operation display CGI program 852 in the state notification cycle is the same as that described in the fourth embodiment and therefore is not described in this embodiment. Also, the processing of the operation data collecting program 842 in the operation communication cycle is the same as that described in the fourth embodiment and therefore is not described in this embodiment.

(Operation CGI Program 853)

The following is a description of the processing performed in the operation communication cycle at the operating terminal 830. Similar to the state notification cycle, a setting was made in advance so that the operation CGI program 853 is activated when the HTTP server program 851 running on the operating terminal 830 receives a request designating a URL path "/CGI-bin/getoperation". Consequently, when this request is received from the operated apparatus 820, the operation CGI program 853 is activated.

Figure 31:
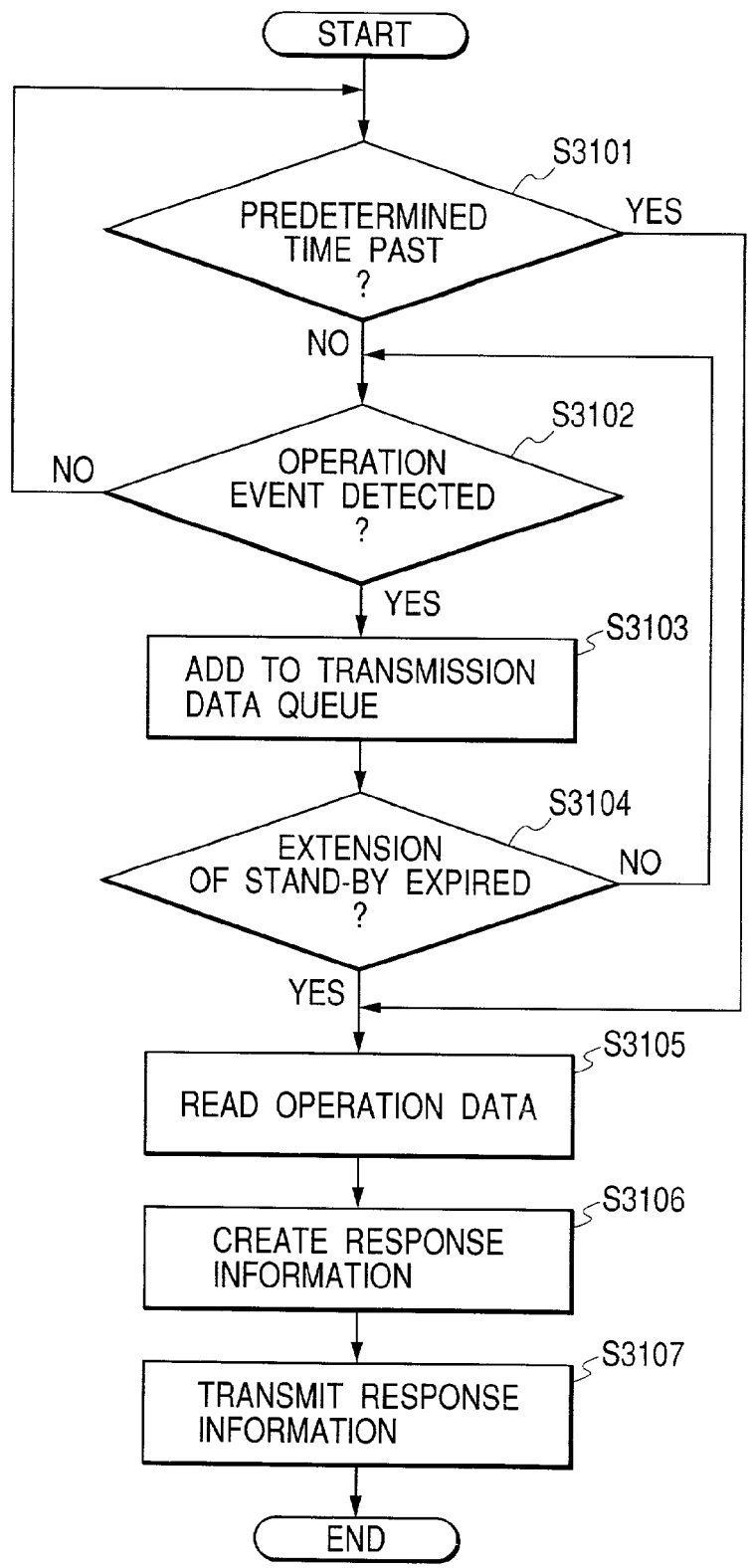
FIG. 31 is a flowchart showing a processing procedure of an operation CGI program according to the eighth embodiment.

FIG. 31 is a flowchart showing the processing procedure of the operation CGI program 853. The processing shown in this drawing is performed by a CPU (not shown) that is provided in the operating terminal 830 and executes the operation CGI program 853 stored in a ROM (not shown) that is also provided in the operating terminal 830.

The operation display CGI program 852 returns a response to the operated apparatus 820 immediately. However, the operation CGI program 853 does not return a response immediately after an operation event takes place, thereby waiting for any other operation event to take place for a predetermined period of time. This predetermined period of time is set with reference to the maximum time before a line is closed due to the time out of an HTTP request in the state notification cycle.

First, the operation CGI program 853 waits for the predetermined period of time has passed (step S3101), or until any operation event takes place and information in the request fields of the information exchange table is updated (step S3102). For instance, the operation CGI program 853 waits for an operation event to take place for a time shorter than a time obtained by subtracting a round-trip network delay time from the time-out period of an HTTP request.

If an operation event is detected, the updated request in the request fields of the information exchange table is read and is added to a transmission data queue (not shown) (step S3103). Then, the next operation for transmitting the read information is delayed for a predetermined stand-by time (step S3104). For instance, the stand-by time is set so as to be equal to a network delay time. When the stand-by time has passed, the operation request information are read from the transmission data queue in an order as they were entered thereinto (step S3105). In step S3105, if there are a plurality of pieces of operation request in the transmission data queue, these information are converted into a single piece of information.

For instance, if operation information designating the turning on of the light 122 and the changing of the open/close degree of the blind 123 to 70% is first inputted and then operation information designating the changing of the open/close degree of the blind 123 to 80% is inputted, these operation request information is converted into a single piece of operation information designating the turning on of the light 122 and the changing of the open/close degree of the blind 123 to 80%.

Then, response information is created based on the read operation request information and is outputted to a standard output (step S3106), and the HTTP server program 851 returns the response to the operation data collecting program 842 running on the operated apparatus 820 (step S3107). For instance, the response information given below is outputted to the standard output.
Content-Type: application/x-getoperation
¥r¥n
light=ON¥r¥n
blind=80¥r¥n The HTTP server program 851 adds other necessary information to the response information and returns the information.

On the other hand, if the predetermined period of time has passed in step S3101, that is, if there has been no operation by the user, response information given below is outputted to the standard output.
Content-Type: application/x-getoperation
¥r¥n
none¥r¥n The remote operating system in this embodiment has the construction described above. Therefore, in this embodiment, even if the operated apparatus 820 is installed inside of the firewall, it is possible to remotely operate the equipment to be operated from the operating terminal 830 connected to the Internet 100.

Also, in this embodiment, a response to a state notification is returned immediately to prepare for the next state change notification. Also, in the operation communication request by waiting an operation event, after the operation event is detected, there occurs no delay in the transmission of operation information concerning the succeeding operation designation.

Further, in this embodiment, even if a plurality of operation events successively take place within a short time, it is possible to transmit operation information concerning these operation events with efficiency. Note that, in this embodiment, event detection is successively performed for every operation designation. However, priorities may be assigned to operation designations and operation information may be transmitted based on the priorities. In this case, operation information that concerns an operation designation assigned a high priority and should be immediately transmitted is instantly returned without waiting for the next operation designation to be inputted, while operation information that concerns an operation designation assigned a low priority and does not require immediate transmission is returned after waiting for other operation designations to be inputted. In this case, the conversion into a single piece of operation information is performed only for operation information that concerns operation designations assigned low priorities. Also, in this case, it may be judged that if an operation designation is assigned a priority higher than a predetermined value, operation information concerning this operation designation needs to be immediately transmitted.

(Ninth Embodiment)

A ninth embodiment relates to a case where a communication connection used to transmit a state notification is also used to wait for an operation event to take place, as in the fifth embodiment.

The system construction of a remote operating system according to the present embodiment is the same as that described in the fifth embodiment.

Figure 32:
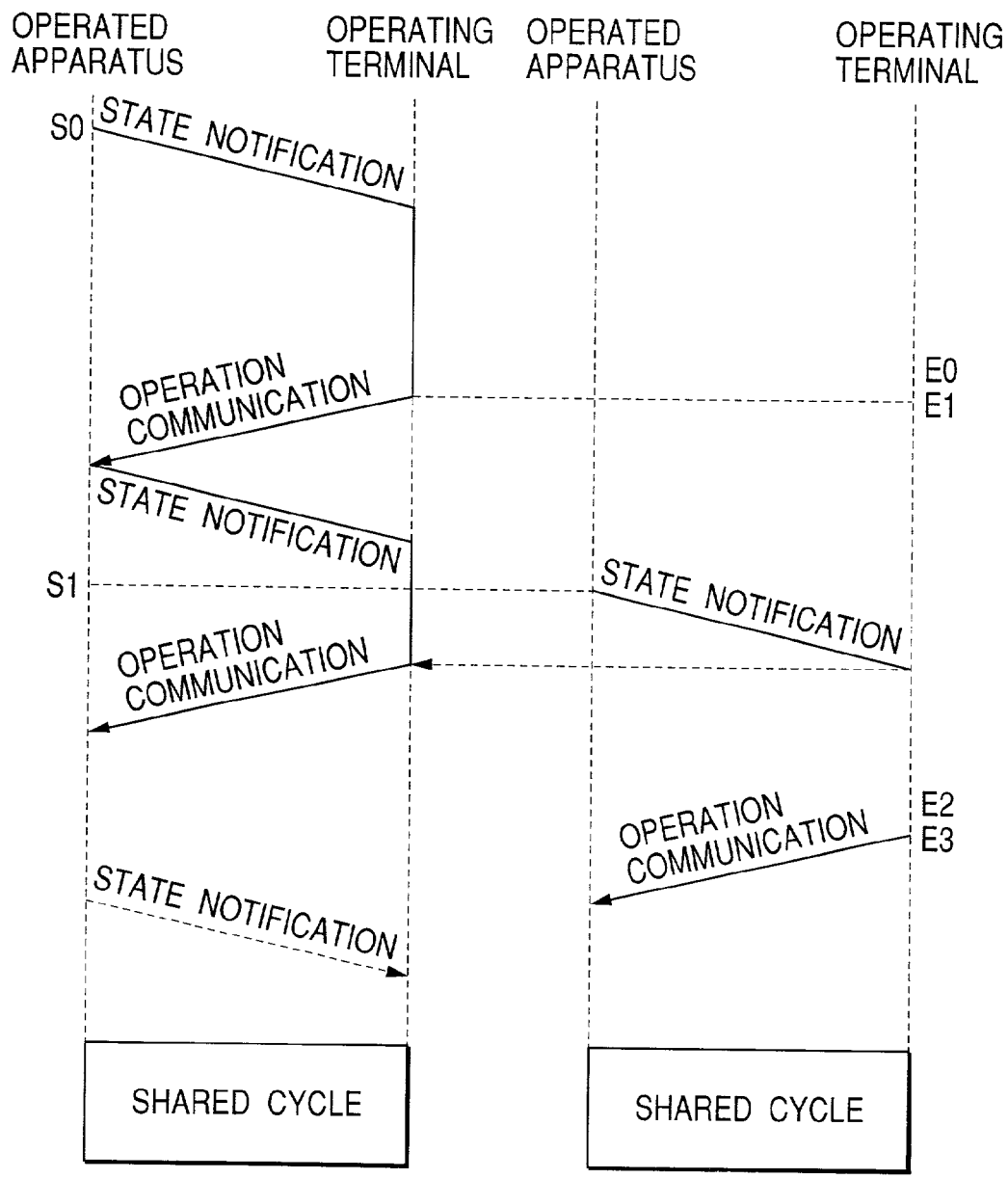
FIG. 32 is a sequence diagram showing an operation flow of a remote operating system according to a ninth embodiment of the present invention.

FIG. 32 is a sequence diagram showing the operation flow in the present embodiment. There are established two communication connections that are each shared by the state notification processing and the operation communication processing. That is, each of these shared communication connect is used for both of the transmission of a state notification concerning the operation target equipment and the collection of operation information from the operating terminal 830.

In this embodiment, both of the state notification processing and the operation communication processing can be performed even if only one communication connection is established. That is, as in the fifth embodiment, if a state change (S0, for instance) is detected at the operated apparatus 820, a state notification is transmitted to the operating terminal 830 using a communication connection (hereinafter referred to as "first communication connection") that is currently waiting for any state change to be made. Then, this first communication connection waits for an operation to be made at the operating terminal 830. If an operation event is detected, operation information is returned using the first communication connection.

In the case where operation information concerning an operation designation EO is transmitted immediately after the operation designation E0 is inputted at the operating terminal 830, if another operation designation E1 is inputted immediately after the operation designation E0, there occurs a delay in transmission of operation information concerning the operation designation E1. In view of this problem, as in the eighth embodiment, when the operation designation E0 is inputted at the operating terminal 830, it is waited for the next operation designation to be inputted for a short time. If the operation designation E1 is inputted within the short time, the operation information concerning the operation designations E0 and E1 is converted into a single piece of operation information E0+1 and this operation information is returned. At the operated apparatus 820, after the operation information is received, if any communication connection is waiting for a state change to be made, a state notification is transmitted. If there occurs no state change, a state notification showing that "no state change occurs" is transmitted. Then, the operation target equipment is operated based on the collected operation information.

If a new state change (S1, for instance) is detected at the operated apparatus 820 while the first communication connection is waiting for operation designation to be inputted, a new communication connection (hereinafter referred to as "second communication connection") is established and a state notification concerning the new state change is transmitted using the second communication connection. At the operating terminal 830, after the new state notification is received, operation information showing that "no operation designation is inputted" is returned using the first communication connection, and the second communication connection is used to continuously wait for an operation designation to be inputted. The first communication connection then waits for a state change to be made until the second communication connection receives non-operation information or any other operation information.

The processing of the operation information exchange program 8411 is the same as that described in the fifth embodiment and therefore is not described in this embodiment.

(Operation Display Response CGI Program 8521)

The following is a description of the processing performed at the operating terminal 830 in this embodiment. A setting was made in advance so that the operation display response CGI program 8521 is activated when the HTTP server program 851 running on the operating terminal 830 receives a request designating a URL path "/CGI-bin/new-status". Consequently, when this request is received from the operated apparatus 820, the operation display response CGI program 8521 is activated.

In this embodiment, the operation information exchange program 8411 starts a plurality of execution processes to be performed in parallel. Therefore, there may be cases where the operation display response CGI program 8521 receives two requests at a time. In such cases, the operation display response program 8521 is activated each time a request is received, thereby starting two execution processes to be performed in parallel.

Figure 33:
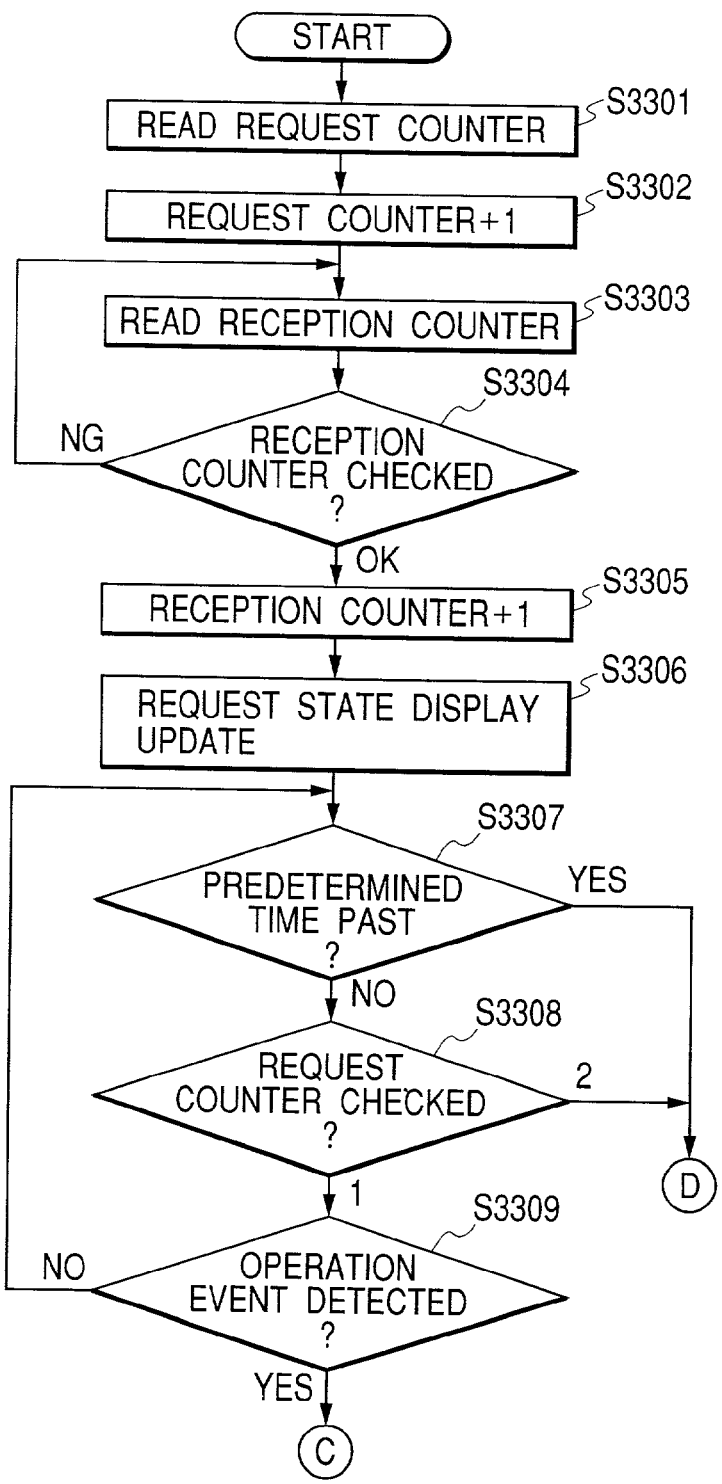
FIG. 33 is the first half of a flowchart showing a processing procedure of an operation display response CGI program according to the ninth embodiment.
Figure 34:
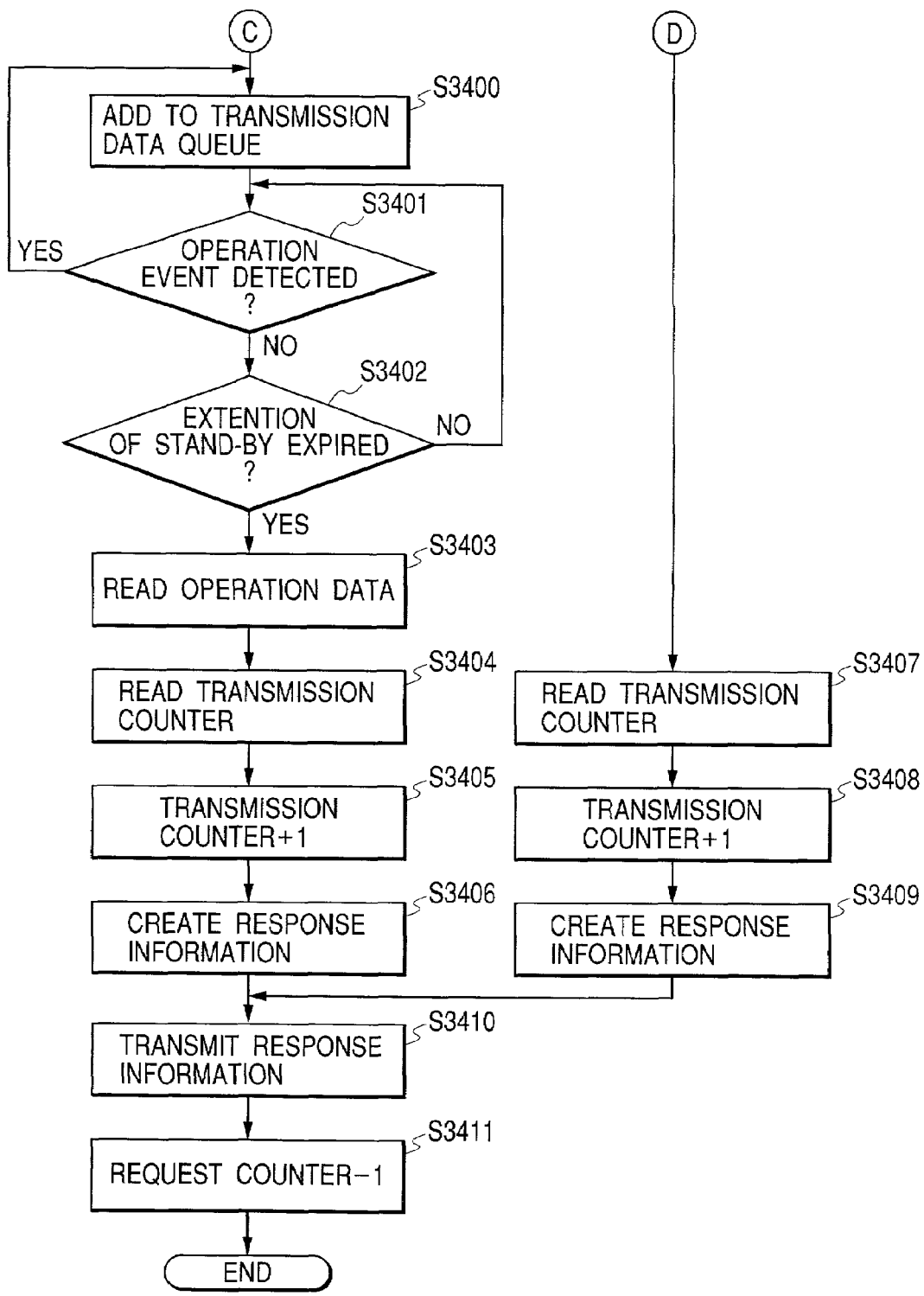
FIG. 34 is the latter half of the flowchart showing the processing procedure of the operation display response CGI program according to the ninth embodiment.

FIGS. 33 and 34 are a flowchart showing the processing procedure of the operation display response CGI program 8521. This operation display response CGI program 8521 includes three counters (not shown).

The first counter is used to count the number of execution processes of the operation display response CGI program 8521 activated by HTTP requests sent from the operation information exchange program 8411. The initial value of this counter is "0". This counter is hereinafter referred to as "request counter".

The second counter is used to check the processing order of state information received from the operated apparatus 820, and is paired with the transmission counter of the operation information exchange program 8411. The initial value of this counter is "0" and a data number related to this counter is embedded in each piece of request data. This counter is hereinafter referred to as "reception counter".

The third counter is used to control the processing order of HTTP responses to be transmitted, and is paired with the reception counter of the operation information exchange program 8411. The initial value of this counter is "0" and a data number related to this counter is embedded in each piece of response data. This counter is hereinafter referred to as "transmission counter".

First, the value of the request counter is read from a counter table (not shown) that is equivalent to the counter table 801 and is stored in a shared memory area (step S3301). Like the counter table 801, in addition to the value of the request counter, this counter table gives values of the transmission counter and reception counter to be described later. The number of execution processes of the operation display response CGI program 8521 that are currently running is written in the request field of the counter table. Then, the value of the request counter is incremented by one (step S3302).

Following this, the value of the reception counter is read (step S3303) and it is judged whether the state information sent from the operated apparatus 820 should be processed by comparing the data number embedded in the state information with the value of the reception counter (step S3304). If the judgement result is affirmative, the value of the reception counter is incremented by one (step S3305).

Then, as in the eighth embodiment, an operation display update request is issued to the operation display GUI program 854 (step S3306). Note that during the operations in steps S3305 and S3306, the exclusive control described above is performed, thereby preventing a situation where the same step of the execution processes of the operation information exchange program 8421 that are running in parallel is performed at the same time during the processing. Also, the processing of the operation display GUI program is the same as that described in the eighth embodiment.

Following this, it is judged whether a predetermined period of time has passed (step S3307). If it is judged that the predetermined period of time has passed, the processing proceeds to step S3407. On the other hand, if it is not judged that the predetermined period of time has passed, the value of the request counter is checked (step S3308). If the value of the request counter is "2", the processing proceeds to step S3407. On the other hand, if the value of the request counter is "1", it is judged whether any operation event is detected (step S3309). If no operation event is detected, the processing returns to step S3307; if any operation event is detected, the processing proceeds to step S3400.

By checking the value of the request counter until the predetermined period of time has passed in this manner, the processing waits for an operation designation to be inputted, that is, waits for the information in the request field of an information exchange table (not shown) to be updated.

If an operation event is detected in step S3309, updated request information is read from the request field of the information exchange table and the read information is added to a transmission data queue (not shown) (step S3400). Note that if no operation event takes place, non-operation information is generated.

Then, by performing an operation detection operation that is the same as that performed in step S3309, the processing waits for the next operation designation to be inputted for a predetermined stand-by time (step S3402). For instance, the stand-by time is set so as to be equal to a network delay time. When the stand-by time has passed, operation request information is read from the transmission data queue in an order that they were entered thereinto (step S3403). If there are a plurality of pieces of operation information, these read operation request information are converted into a single piece of information.

Then, the value of the transmission counter is read (step S3404) and the value of the transmission counter is incremented by one (step S3405). Note that during the operations in steps S3400 to S3405, the exclusive control described above is performed.

Then, response information is created based on the read operation information and is outputted to a standard output (step S3406), and the HTTP server program 851 returns a response to the operation information exchange program 841 running on the operated apparatus 820 (step S3410). For instance, the response information given below is outputted to the standard output.
Content-Type: application/x-getoperation
¥r¥n
receive_counter=1¥r¥n
light=ON¥r¥n
blind=80¥r¥n On the other hand, if it is judged that the predetermined period of time has passed in step S3307 (that is, if no operation designation is inputted by the user within the predetermined period of time) or if a plurality of operation waiting states are detected in step S3308, a counter operation that is the same as that performed in steps S3404 and 3405 is performed (steps S3407 and S3408). Then, response information given below (giving "none" which means that no operation designation is inputted) is outputted to the standard output (step S3409).
Content-Type: application/x-getoperation
¥r¥n
receive_counter=1¥r¥n
none¥r¥n Note that during the operations in steps S3407 to S3409, the exclusive control described above is performed. The HTTP server program 851 adds other necessary information to the outputted operation information to create response information. In this case, the created response information is the same as the foregoing response information received by the operation information exchange program 841. Following this, the value of the request counter is decremented by one (step S8411).

It should be noted that although this embodiment concerns the case where there are established two communication connections as in the fifth embodiment, three or more communication connections may be used.

In this embodiment, even if the operated apparatus 820 is installed inside of the firewall, it is possible to remotely operate the operated apparatus 820 (the remote operation target device in this embodiment) from the operating terminal 830 connected to the Internet 100.

Also, in this embodiment, even with a single communication connection, it is possible to perform both of the state notification processing and the operation communication processing. Further, even if two or more communication connections are used, each communication connection other than the communication connection that was first established (the first communication connection in the above description) is established only when the communication connection is required. This reduces the load on the network.

Further, in this embodiment, even if a plurality of operation events successively take place in a short time, it is possible to transmit operation information concerning these operation events with efficiency. Note that in this embodiment, event detection is successively performed for every operation designation. However, priorities may be assigned to operation designations and operation information may be transmitted based on the priorities. In this case, operation information that concerns an operation designation assigned a high priority and should be immediately transmitted is instantly returned without waiting for the next operation designation to be inputted, while operation information that concerns an operation designation assigned a low priority and does not require immediate transmission is returned after waiting for other operation designations to be inputted. In this case, the conversion into a single piece of operation information is performed only for operation information that concerns operation designations assigned low priorities.

(Tenth Embodiment)

In a tenth embodiment, as in the sixth embodiment, a plurality of communication connections are assigned to either or both of the state notification cycle and the operation communication cycle. This makes it possible to deal with successive state changes quickly made or operation requests that are continuously issued.

A remote operating system according to the present embodiment has a construction that is the same as that of the remote operating system according to the sixth embodiment.

Also, the processing of the state notification program 841, the operation display CGI program 852, and the operation data collecting program 842 of this embodiment is the same as that described in the sixth embodiment, and therefore is not described in this embodiment.

(Operation CGI Program 853)

Next, the processing performed in the operation communication cycle at the operating terminal 830 is described. In this embodiment, as in the above embodiments, a setting was made in advance so that the operation CGI program 853 is activated when the HTTP server program 851 running on the operating terminal 830 receives a request designating a URL path "/CGI-bin/getoperation". Consequently, when the request described above is received from the operated apparatus 820, the operation CGI program 853 is activated.

Figure 35:
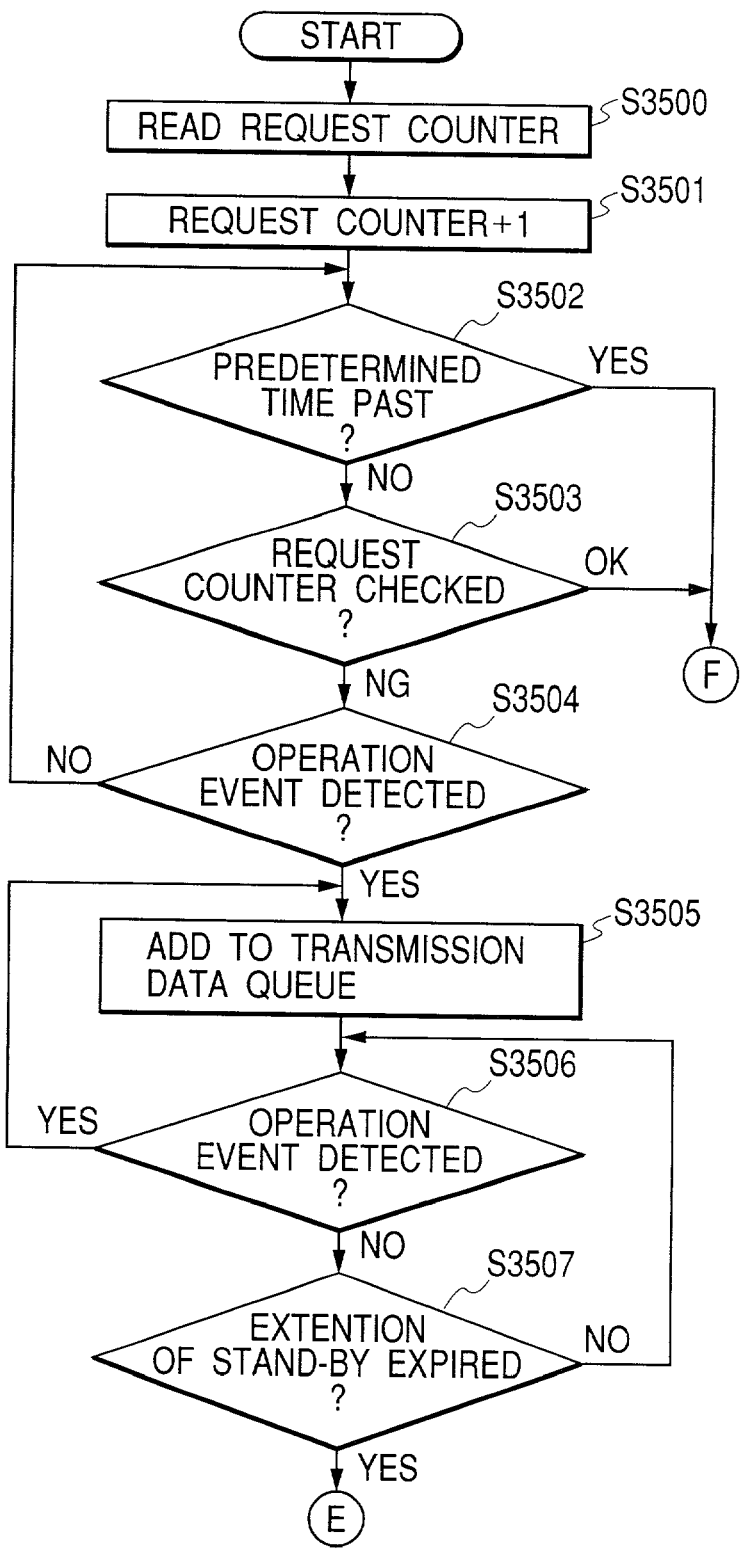
FIG. 35 is the first half of a flowchart showing the processing procedure of an operation CGI program according to a tenth embodiment of the present invention.
Figure 36:
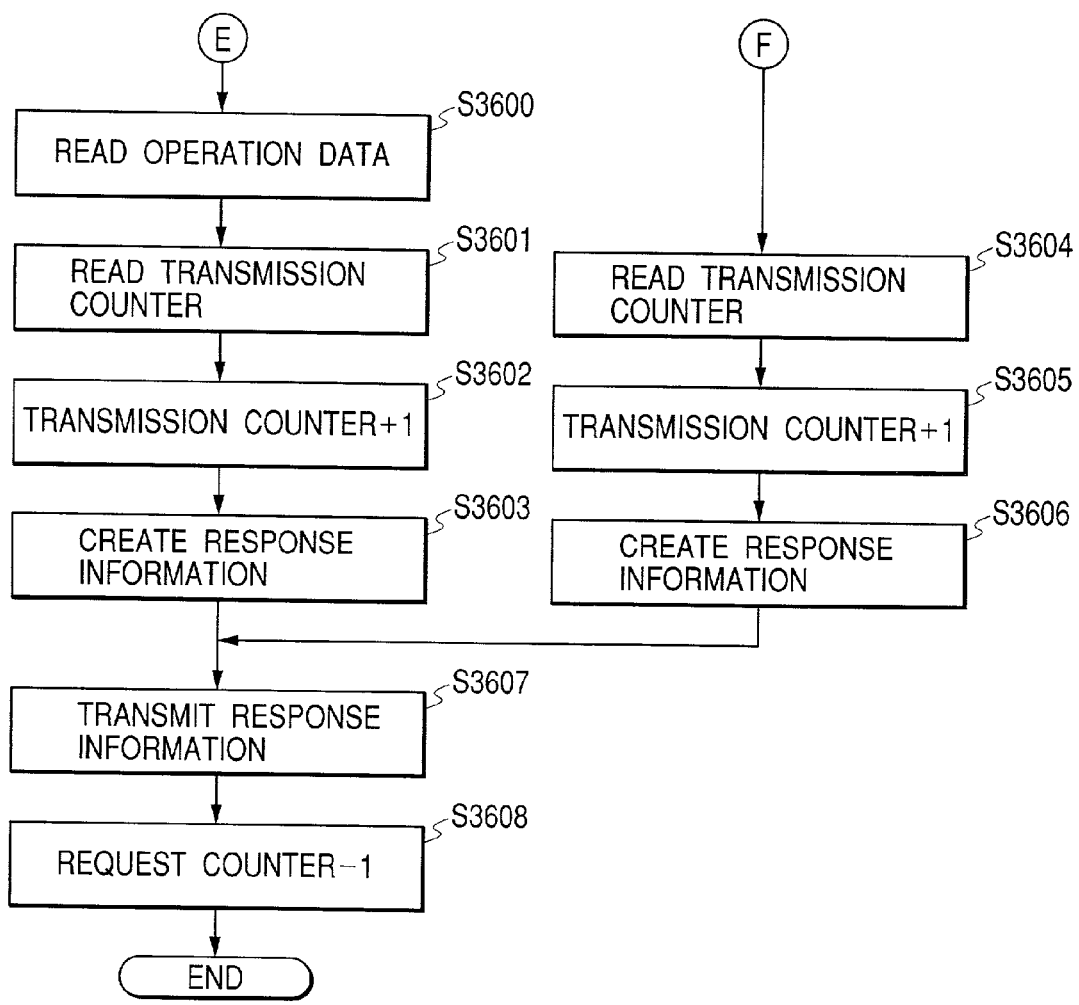
FIG. 36 is the latter half of the flowchart showing the processing procedure of the operation CGI program according to the tenth embodiment.

FIGS. 35 and 36 a flowchart showing a processing procedure of the operation CGI program 853 of the present embodiment. The processing shown in these drawings is performed by a CPU (not shown) that is provided in the operating terminal 830 and executes the operation CGI program 853 stored in a ROM (not shown) that is also provided in the operating terminal 830.

In this embodiment, the operation data collecting program 842 starts a plurality of execution processes that are performed in parallel. Therefore, there may be cases where the operation CGI program 853 receives two or more requests at a time. In such cases, the operation CGI program 853 is activated each time a request is received, thereby starting a plurality of execution processes to be performed in parallel.

The operation CGI program 853 is the same as that of the eighth embodiment except for that the present operation CGI program 853 additionally performs a request counter reading operation (step S3500), a request counter incrementing operation (step S3501), a request counter check operation (step S3503), an operation event detecting operation (step S3506), a transmission counter reading operation (steps S3601 and S3604), a transmission counter incrementing operation (steps S3602 and 3605), a response information creating operation (steps S3603 and S3606), and a request counter decrementing operation (step S3608) that are respectively similar to the operations in steps S3301, S3302, S3308, S3401, S3404, S3405, S3409, and S3411 of the ninth embodiment. Note that in this embodiment, during the operations in steps S3505 to S3602 and S3604 to S3606, the exclusive control described in the ninth embodiment is performed.

As a result of this exclusive control, even if the operation CGI program 853 performs a plurality of execution processes in parallel, there occurs no problem during the processing. That is, each piece of transmission data is given a data number, so that even if a plurality of pieces of transmission data reach the operated apparatus 820 in inverse order, it is possible for the operation data collecting program 842 to process these transmission data in a correct order.

The remote operating system of this embodiment has the construction as described above. Therefore, in this embodiment, it is possible to use a plurality of communication connections in either or both of the state notification cycle and the operation communication cycle. As a result, even if state changes are successively made in a short period of time or even if operation requests are continuously issued in a short period of time, it is possible to perform the state notification processing and the operation communication processing immediately.

Note that in this embodiment, event detection is successively performed for every operation designation. However, priorities may be assigned to the operation designations and operation information may be transmitted based on the priorities. In this case, operation information that concerns an operation designation assigned a high priority and should be immediately transmitted is instantly returned without waiting for the next operation designation to be inputted, while operation information that concerns an operation designation assigned a low priority and does not require immediate transmission is returned after waiting for other operation designations to be inputted. In this case, the conversion into a single piece of operation information is performed only for operation information that concerns operation designations assigned low priorities.

(Eleventh Embodiment)

An eleventh embodiment differs from the ninth embodiment in that a program for performing communications with the operating terminal is installed as a separate program in the operated apparatus and processing is performed using continuous communication connections.

The system construction of a remote operating system according to the present embodiment is the same as that of the remote operating system according to the seventh embodiment (see FIG. 24). Here, the HTTP server program of this embodiment corresponds to continuous communication connections and pipeline processing. In particular, the HTTP server program has a function of ensuring, during the pipeline processing, that responses to requests are returned in the order of receipt of the requests according to the HTTP specification.

Also, an operation information exchange program having a function unique to this embodiment is used in place of the operation information exchange program of the ninth embodiment. This operation information exchange program is installed in the operated apparatus 820 and runs thereon. A communication control program is additionally installed in the operated apparatus 820 and runs thereon.

On the other hand, the construction of the operating terminal 830 is changed as follows. In the present embodiment, an operation display response CGI program having a function unique to this embodiment is used in place of the operation display response CGI program of the ninth embodiment. This operation display response CGI program is installed in the operating terminal 830 and runs thereon. The processing of the operation information exchange program, the communication control program, and the operation display response CGI program of this embodiment is the same as that described in the seventh embodiment and therefore is not described in this embodiment.

With this construction, in the eleventh embodiment, HTTP continuous connections are established and a pipeline processing function is used. Therefore, with less communication resource (communication connections), it is possible to perform communications with efficiency without delay in opening the connections. This improves the communication performance of the remote operating system.

Also, the remote operating system of the present embodiment uses the communication control program that is separately and independently executed, so as to easily make the operation information exchange program and the operation display response CGI program corresponds to continuous connections and pipeline processing. Note that the technique of using the separate communication control program may be easily applied to the first embodiment where the state notification program and the operation data collecting program are used as separate programs.

In this case, one communication control program may be prepared for each of the state notification program and the operation data collecting program, and each communication control program may control communications. Alternatively, a common communication control program shared by these programs may also be prepared to control communications of both programs. Further, in the latter case, the common communication control program may establish one communication connection for each of the state notification program and the operation data collecting program, and data of these respective programs may be transmitted as internally separated data. It is apparent that, in each of the above cases, the continuous connections and the pipeline processing function are also applicable to these communication control programs.

It should be noted that, in each embodiment described above, it is assumed that the remote-operating terminal or the remote operation relay apparatus is assigned a fixed name or address and the remote-operated apparatus is informed of the assigned name or address in advance. However, the remote-operating terminal or the remote operation relay apparatus may transmit its name or address to the remote-operated apparatus by electronic mail or the like when using them, and the remote-operated apparatus may specify a connection destination using the transmitted name or address. In this case, it is possible for the remote-operated apparatus to access the remote-operating terminal or the remote operation relay apparatus even if a temporary address is automatically assigned to the remote-operating terminal or the remote operation relay apparatus each time a connection is established. As a result, it is possible to apply the technique of the present invention to a case where a dial-up connection is used.

Also, in each embodiment described above, the remote-operated apparatus periodically establishes a connection with the remote-operating terminal or the like. However, the remote-operating terminal or the like may issue a connection request to the remote-operated apparatus on a regular basis or on an as needed basis, and the remote-operated apparatus may establish a connection based on the connection request.

Further, although the HTTP protocol is used in the above description, the present invention is not limited to this. For instance, the technique of the present invention can be used so long as a proxy server is used in a remote operating system and the remote operating system adopts a protocol that enables the passing of data through a firewall under predetermined setting conditions.

Also, a WWW server program is used in each embodiment described above, although any other program achieving the aforementioned functions of the WWW server program, such as the activation of a program corresponding to a WWW request and the return of an output from the corresponding program as a WWW response, may be used in place of the WWW server program.

Further, if it is desirable to achieve a higher level of security, the HTTP protocol may be combined with a secure protocol such as the SSL (Secure Socket Layer) protocol. In this case, the remote-operated apparatus first issues a communication start request to the remote-operating terminal using the SSL protocol.

Also, each embodiment described above concerns a case where a light and a blind are operated by the remote-operated apparatus. However, the technique of the present invention is applicable to remote operation of a surveillance camera, remote maintenance of a printer or a copying machine, or remote control of other network devices.

Also, the present invention is not limited to the construction described in each of the aforementioned embodiments. The technique of the present invention is applicable to any other construction in which the functions defined in the appended claims or functions of the construction elements described in the embodiments are achieved.

For instance, each of the embodiments described above concerns a case where a firewall imposes limitations on the passing of packets through the firewall and includes a relay program. However, the present invention is not limited to this. For instance, the technique of the present invention is applicable to a case where the functions of a firewall are realized by assigning addresses called "private addresses" that are locally used in a LAN to devices connected to the LAN, providing at the connection point between the LAN and the Internet an NAT (Network Address Translation) function of converting the private addresses into global addresses that are used on the Internet, performing the address conversion only for communication requests issued from the LAN to enable communications, and not performing the address conversion for communication requests issued from the Internet. In this case, it is possible to use the technique of the present invention as it is.

Also, it is needless to say that the present invention includes a case where a software program code achieving the functions described in the above embodiments is generated and is supplied to a system or an apparatus using a recording medium in which the program code is recorded. In this case, the functions unique to the present invention are realized by the program code read from the recording medium. As a result, the present invention may be realized by the program itself and the recording medium in which the program is recorded.

In each embodiment described above, the program code performing the processing shown in each flowchart is stored in a ROM that is a recording medium. The recording medium used to supply the program code is not limited to the ROM. For instance, a floppy disk, a hard disk, a CD-ROM, a CD-R, a DVD, or a nonvolatile memory card may be used in place of the ROM.

With the technique of the present invention, even if an operated apparatus is installed inside of a firewall, it is possible to remotely operate the operated apparatus from an operating terminal connected to the Internet by crossing the firewall. Also, if there occurs an operation event, a preparation for the occurrence of the next operation event is made. This shortens a delay time that occurs during the overall processing and improves the communication performance of a remote operating system.

What is claimed is:

1. A remote-operating apparatus for remotely operating a first apparatus in a network protected by a firewall from outside of the firewall, comprising:
    a reception device configured to receive predetermined information from the first apparatus;
    a determination device configured to determine operation information for remotely operating the first apparatus based on the received predetermined information; and
    a transmission device configured to transmit the operation information to the first apparatus as a response to the predetermined information received by the reception device.

2. A remote-operating apparatus according to claim 1, wherein the first apparatus monitors a state of a second apparatus, and wherein the predetermined information includes information concerning the state of the second apparatus.

3. A remote-operating apparatus according to claim 1, wherein the predetermined information includes request information for requesting establishment of a stream connection.

4. A remote-operating apparatus according to claim 1, wherein the predetermined information is transmitted using HTTP (HyperText Transfer Protocol).

5. A remote-operating apparatus according to claim 4, wherein SSL (Secure Socket Layer) is used to transmit the predetermined information.

6. A remote-operating apparatus according to claim 1, wherein the transmission device transmits the operation information when a predetermined period of time has passed since the reception of the predetermined information.

7. A remote-operating apparatus according to claim 1, wherein the first apparatus monitors a state of a second apparatus and operates the second apparatus, and wherein the predetermined information is one of state information showing the state of the second apparatus and request information for requesting transmission of the operation information, the first apparatus operating the second apparatus according to the operation information.

8. A remote-operating apparatus according to claim 7, wherein the transmission device also transmits a response to the state information.

9. A remote-operating apparatus according to claim 8, wherein when transmitting the operation information, the transmission device transmits the operation information when a predetermined period of time has passed since the reception of the predetermined information, and wherein when transmitting the response, the transmission device transmits the response immediately after the reception of the predetermined information.

10. A remote-operating apparatus according to claim 1, wherein the transmission device transmits the operation information when a predetermined period of time has passed since the reception of the predetermined information, and wherein if a plurality of pieces of operation information are generated during the predetermined period of time, the transmission device transmits the plurality of pieces of operation information by one operation.

11. An information processing apparatus in a network protected by a firewall, comprising:
    transmission means for transmitting predetermined information, upon which operation information for remotely operating the information processing apparatus is based, to a remote-operating apparatus outside of the firewall;
    reception means for receiving the operation information transmitted from the remote-operating apparatus as a response to the predetermined information; and
    control means for performing control based on the operation information received by the reception means.

12. An information processing apparatus according to claim 11, wherein the control means operates a second apparatus based on the operation information.

13. An information processing apparatus according to claim 11, wherein the information processing apparatus monitors a state of a second apparatus, and wherein the predetermined information includes information concerning the state of the second apparatus.

14. An information processing apparatus according to claim 11, wherein the predetermined information includes information for requesting establishment of a stream connection.

15. An information processing apparatus according to claim 11, wherein the predetermined information is transmitted using HTTP (HyperText Transfer Protocol).

16. An information processing apparatus according to claim 11, wherein the predetermined information is transmitted using the HTTP on an SSL (Secure Socket Layer).

17. An information processing apparatus according to claim 11, wherein the information processing apparatus monitors a state of a second apparatus and operates the second apparatus, and wherein the predetermined information is one of state information showing the state of the second apparatus and request information requesting information for operating the second apparatus.

18. An information processing apparatus according to claim 17, wherein the reception means also transmits a response to the state information.

19. A method of remotely operating a first apparatus in a network protected by a firewall using a remote-operating apparatus from outside the firewall, comprising the steps of:
    transmitting predetermined information from the first apparatus to the remote-operating apparatus;
    determining operation information for remotely operating the first apparatus based on the predetermined information; and
    transmitting the operation information from the remote-operating apparatus to the first apparatus as a response to the predetermined information.

20. A method of remotely operating a first apparatus in a network protected by a firewall from a remote-operating apparatus outside of the firewall, comprising:
    a reception step for receiving predetermined information from the first apparatus;
    a determination step for determining operation information for remotely operating the first apparatus based on the received predetermined information; and
    a transmission step for transmitting the operation information to the first apparatus as a response to the predetermined information received in the reception step.

21. A method of controlling an information processing apparatus in a network protected by a firewall, comprising:
    a transmission step for transmitting predetermined information, upon which operation information for remotely operating the information apparatus is based, to a remote-operating apparatus outside of the firewall;
    a reception step for receiving the operation information transmitted from the remote-operating apparatus as a response to the predetermined information; and
    a control step for performing control based on the operation information received in the reception step.

* * * * *

UNITED STATES PATENT AND TRADEMARK OFFICE
CERTIFICATE OF CORRECTION

PATENT NO. : 7,003,798 B2
APPLICATION NO. : 09/978214
DATED : February 21, 2006
INVENTOR(S) : Tadashi Yamakawa et al.

It is certified that error appears in the above-identified patent and that said Letters Patent is hereby corrected as shown below:

COLUMN 2:
Line 1, "the" should be deleted.

COLUMN 9:
Line 32, "is" should read -- are --.

COLUMN 12:
Line 50, "a" (second occurrence) should be deleted.

COLUMN 13:
Line 18, "these" should read -- this --.

COLUMN 14:
Line 35, "other" should read -- another --.

COLUMN 16:
Line 56 "waits" should read -- waits for --; and
Line 64, "request" should read -- request information --.

COLUMN 19:
Line 24, "programs" should read -- program --.

COLUMN 21:
Line 23, "a flowchart" should read -- flowcharts --.

COLUMN 23:
Line 22, "request" should read --requests --.

COLUMN 27:
Line 55, "a flowchart" should read -- flowcharts --

COLUMN 30:
Line 8, "a flowchart" should read -- flowcharts --;
Line 59, "sever" should read -- server --; and
Line 67, "set" should read -- sets --.

UNITED STATES PATENT AND TRADEMARK OFFICE
CERTIFICATE OF CORRECTION

PATENT NO. : 7,003,798 B2
APPLICATION NO. : 09/978214
DATED : February 21, 2006
INVENTOR(S) : Tadashi Yamakawa et al.

It is certified that error appears in the above-identified patent and that said Letters Patent is hereby corrected as shown below:

COLUMN 33:
Line 51, "for" should read -- until --.

COLUM 34:
Line 10, "these" should read -- this --; and
Line 45, "waiting" should read -- waiting for --.

COLUMN 35:
Line 17, "connect" should read -- connections --; and
Line 42, "is waited" should read -- waits --.

COLUMN 36:
Line 27, "a flowchart" should read -- flowcharts --.

COLUMN 39:
Line 17, "a flowchart" should read -- are flowcharts --.

COLUMN 40:
Line 64, "corresponds" should read -- correspond --.

Signed and Sealed this

Twenty-sixth Day of December, 2006

JON W. DUDAS
*Director of the United States Patent and Trademark Office*